(12) United States Patent
Nelson et al.

(10) Patent No.: US 7,867,592 B2
(45) Date of Patent: Jan. 11, 2011

(54) METHODS, COMPOSITIONS AND DEVICES, INCLUDING ELECTROOSMOTIC PUMPS, COMPRISING COATED POROUS SURFACES

(75) Inventors: Darcee Deschamp Nelson, Madison, WI (US); Klaus Joachim Dahl, Dublin, CA (US)

(73) Assignee: Eksigent Technologies, Inc., Dublin, CA (US)

( * ) Notice: Subject to any disclaimer, the term of this patent is extended or adjusted under 35 U.S.C. 154(b) by 976 days.

(21) Appl. No.: 11/669,022

(22) Filed: Jan. 30, 2007

(65) Prior Publication Data

US 2008/0179188 A1 Jul. 31, 2008

(51) Int. Cl.
*B32B 9/00* (2006.01)
*B32B 27/40* (2006.01)
*A61F 2/06* (2006.01)

(52) U.S. Cl. .................... 428/40.1; 428/423.1; 623/1.46
(58) Field of Classification Search .............. 428/304.4, 428/423.1; 623/1.46
See application file for complete search history.

(56) References Cited

U.S. PATENT DOCUMENTS

| | | |
|---|---|---|
| 1,063,204 A | 6/1913 | Kraft |
| 2,615,940 A | 10/1952 | Williams |
| 2,644,900 A | 7/1953 | Hardway, Jr. |
| 2,644,902 A | 7/1953 | Hardway, Jr. |
| 2,661,430 A | 12/1953 | Hardway, Jr. |
| 2,841,324 A | 7/1958 | Santeler |
| 2,995,714 A | 8/1961 | Hannah |
| 3,143,691 A | 8/1964 | Hurd |
| 3,209,255 A | 9/1965 | Estes et al. |
| 3,298,789 A | 1/1967 | Mast |
| 3,427,978 A | 2/1969 | Hanneman et al. |
| 3,544,237 A | 12/1970 | Walz |
| 3,630,957 A | 12/1971 | Rey et al. |
| 3,682,239 A | 8/1972 | Abu-Romia |
| 3,714,528 A | 1/1973 | Vail |
| 3,739,573 A | 6/1973 | Giner |
| 3,923,426 A | 12/1975 | Theeuwes |
| 3,952,577 A | 4/1976 | Hayes et al. |
| 4,043,895 A | 8/1977 | Gritzner |
| 4,140,122 A | 2/1979 | Kuhl et al. |

(Continued)

FOREIGN PATENT DOCUMENTS

CN 2286429 Y 7/1998

(Continued)

OTHER PUBLICATIONS

Caruso, et al., "Investigation of Electrostatic Interactions in Polyelectrolyte Multilayer Films: Binding of Anionic Fluorescent Probes to Layers Assembled onto Colloids," Macromolecules 32:2317-2328 (1999).

(Continued)

*Primary Examiner*—Victor S Chang
(74) *Attorney, Agent, or Firm*—Shay Glenn LLP

(57) ABSTRACT

Methods are disclosed for modifying at least a portion of a porous polymeric surface. Such methods include contacting the porous polymeric surface with at least one polyelectrolyte, resulting in the physical adsorption of at least one polyelectrolyte onto the porous polymeric surface to form a charge modified surface. Such coated surfaces may be part of a device or apparatus, including electroosmotic pumps.

27 Claims, 26 Drawing Sheets

U.S. PATENT DOCUMENTS

| | | | |
|---|---|---|---|
| 4,240,889 A | 12/1980 | Yoda et al. |
| 4,383,265 A | 5/1983 | Kohashi |
| 4,396,925 A | 8/1983 | Kohashi |
| 4,402,817 A | 9/1983 | Maget |
| 4,639,244 A | 1/1987 | Rizk et al. |
| 4,687,424 A | 8/1987 | Heimes |
| 4,789,801 A | 12/1988 | Lee |
| 4,839,203 A * | 6/1989 | Davis et al. .................. 427/244 |
| 4,886,514 A | 12/1989 | Maget |
| 4,908,112 A | 3/1990 | Pace |
| 4,921,041 A | 5/1990 | Akachi |
| 4,999,069 A | 3/1991 | Brackett et al. |
| 5,004,543 A | 4/1991 | Pluskal et al. |
| 5,037,457 A | 8/1991 | Goldsmith et al. |
| 5,087,338 A | 2/1992 | Perry et al. |
| 5,116,471 A | 5/1992 | Chien et al. |
| 5,126,022 A | 6/1992 | Soane et al. |
| 5,137,633 A | 8/1992 | Wang |
| 5,219,020 A | 6/1993 | Akachi |
| 5,260,855 A | 11/1993 | Kaschmitter et al. |
| 5,296,115 A | 3/1994 | Rocklin et al. |
| 5,351,164 A | 9/1994 | Grigortchak et al. |
| 5,418,079 A | 5/1995 | Diethelm |
| 5,534,328 A | 7/1996 | Ashmead et al. |
| 5,573,651 A | 11/1996 | Dasgupta et al. |
| 5,581,438 A | 12/1996 | Halliop |
| 5,628,890 A | 5/1997 | Carter et al. |
| 5,632,876 A | 5/1997 | Zanzucchi et al. |
| 5,658,355 A | 8/1997 | Cottevieille et al. |
| 5,683,443 A | 11/1997 | Munshi et al. |
| 5,766,435 A | 6/1998 | Liao et al. |
| 5,858,193 A | 1/1999 | Zanzucchi et al. |
| 5,862,035 A | 1/1999 | Farahmandi et al. |
| 5,888,390 A | 3/1999 | Craig |
| 5,891,097 A | 4/1999 | Saito et al. |
| 5,942,093 A | 8/1999 | Rakestraw et al. |
| 5,958,203 A | 9/1999 | Parce et al. |
| RE36,350 E | 10/1999 | Swedberg et al. |
| 5,961,800 A | 10/1999 | McBride et al. |
| 5,964,997 A | 10/1999 | McBride |
| 5,989,402 A | 11/1999 | Chow et al. |
| 5,997,708 A | 12/1999 | Craig |
| 6,007,690 A | 12/1999 | Nelson et al. |
| 6,012,902 A | 1/2000 | Parce |
| 6,013,164 A | 1/2000 | Paul et al. |
| 6,019,882 A | 2/2000 | Paul et al. |
| 6,045,933 A | 4/2000 | Okamoto |
| 6,054,034 A | 4/2000 | Soane et al. |
| 6,068,752 A | 5/2000 | Dubrow et al. |
| 6,068,767 A | 5/2000 | Garguilo et al. |
| 6,074,725 A | 6/2000 | Kennedy |
| 6,086,243 A | 7/2000 | Paul et al. |
| 6,090,251 A | 7/2000 | Sundberg et al. |
| 6,100,107 A | 8/2000 | Lei et al. |
| 6,106,685 A | 8/2000 | McBride et al. |
| 6,113,766 A | 9/2000 | Steiner et al. |
| 6,126,723 A | 10/2000 | Drost et al. |
| 6,129,973 A | 10/2000 | Martin et al. |
| 6,137,501 A | 10/2000 | Wen et al. |
| 6,150,089 A | 11/2000 | Schwartz |
| 6,156,273 A | 12/2000 | Regnier et al. |
| 6,159,353 A | 12/2000 | West et al. |
| 6,167,910 B1 | 1/2001 | Chow |
| 6,176,962 B1 | 1/2001 | Soane et al. |
| 6,210,986 B1 | 4/2001 | Arnold et al. |
| 6,224,728 B1 | 5/2001 | Oborny et al. |
| 6,238,538 B1 | 5/2001 | Parce et al. |
| 6,255,551 B1 | 7/2001 | Shapiro et al. |
| 6,257,844 B1 | 7/2001 | Stern |
| 6,267,858 B1 | 7/2001 | Parce et al. |
| 6,274,089 B1 | 8/2001 | Chow et al. |
| 6,277,257 B1 | 8/2001 | Paul et al. |
| 6,287,438 B1 | 9/2001 | Knoll |
| 6,287,440 B1 | 9/2001 | Arnold et al. |
| 6,290,909 B1 | 9/2001 | Paul et al. |
| 6,319,476 B1 | 11/2001 | Victor, Jr. et al. |
| 6,320,160 B1 | 11/2001 | Eidsnes et al. |
| 6,344,120 B1 | 2/2002 | Haswell et al. |
| 6,379,402 B1 | 4/2002 | Suhara et al. |
| 6,406,605 B1 | 6/2002 | Moles |
| 6,409,698 B1 | 6/2002 | Robinson et al. |
| 6,418,966 B2 | 7/2002 | Loo |
| 6,418,968 B1 | 7/2002 | Pezzuto et al. |
| 6,444,150 B1 | 9/2002 | Arnold |
| 6,460,420 B1 | 10/2002 | Paul et al. |
| 6,472,443 B1 | 10/2002 | Shepodd |
| 6,477,410 B1 | 11/2002 | Henley et al. |
| 6,495,015 B1 | 12/2002 | Schoeniger et al. |
| 6,529,377 B1 | 3/2003 | Nelson et al. |
| 6,561,208 B1 | 5/2003 | O'Connor et al. |
| 6,605,472 B1 | 8/2003 | Skinner et al. |
| 6,619,925 B2 | 9/2003 | Ohkawa |
| 6,620,625 B2 | 9/2003 | Wolk et al. |
| 6,689,373 B2 | 2/2004 | Johnson et al. |
| 6,709,559 B2 | 3/2004 | Sundberg et al. |
| 6,719,535 B2 | 4/2004 | Rakestraw et al. |
| 6,729,352 B2 | 5/2004 | O'Connor et al. |
| 6,733,244 B1 | 5/2004 | Fritsch et al. |
| 6,766,817 B2 | 7/2004 | da Silva |
| 6,770,182 B1 | 8/2004 | Griffiths et al. |
| 6,770,183 B1 | 8/2004 | Hencken et al. |
| 6,814,859 B2 | 11/2004 | Koehler et al. |
| 6,832,787 B1 | 12/2004 | Renzi |
| 6,878,473 B2 | 4/2005 | Yamauchi et al. |
| 6,918,404 B2 | 7/2005 | Dias da Silva |
| 6,942,018 B2 | 9/2005 | Goodson et al. |
| 6,952,962 B2 | 10/2005 | Hasselbrink et al. |
| 6,994,151 B2 | 2/2006 | Zhou et al. |
| 7,050,660 B2 | 5/2006 | Cyr et al. |
| 7,094,464 B2 | 8/2006 | Mao et al. |
| 7,101,947 B2 | 9/2006 | Schlenoff et al. |
| 7,147,955 B2 | 12/2006 | Adams |
| 7,217,351 B2 | 5/2007 | Krumme |
| 7,235,164 B2 | 6/2007 | Anex et al. |
| 7,258,777 B2 | 8/2007 | Paul et al. |
| 7,399,398 B2 | 7/2008 | Rakestraw et al. |
| 7,429,317 B2 | 9/2008 | Paul |
| 7,517,440 B2 | 4/2009 | Anex et al. |
| 7,521,140 B2 | 4/2009 | Arnold et al. |
| 7,559,356 B2 | 7/2009 | Paul et al. |
| 7,575,722 B2 | 8/2009 | Arnold |
| 2001/0008212 A1 | 7/2001 | Shepodd et al. |
| 2001/0052460 A1 | 12/2001 | Chien et al. |
| 2002/0043805 A1 | 4/2002 | Charles et al. |
| 2002/0048425 A1 | 4/2002 | McBride et al. |
| 2002/0056639 A1 | 5/2002 | Lackritz et al. |
| 2002/0066639 A1 | 6/2002 | Taylor et al. |
| 2002/0070116 A1 | 6/2002 | Ohkawa |
| 2002/0076598 A1 | 6/2002 | Bostaph et al. |
| 2002/0089807 A1 | 7/2002 | Bluvstein et al. |
| 2002/0125134 A1 | 9/2002 | Santiago et al. |
| 2002/0166592 A1 | 11/2002 | Liu et al. |
| 2002/0187074 A1 | 12/2002 | O'Connor et al. |
| 2002/0187197 A1 | 12/2002 | Caruso et al. |
| 2002/0187557 A1 | 12/2002 | Hobbs et al. |
| 2002/0189947 A1 | 12/2002 | Paul et al. |
| 2002/0195344 A1 | 12/2002 | Neyer et al. |
| 2003/0044669 A1 | 3/2003 | Hidaka et al. |
| 2003/0052007 A1 | 3/2003 | Paul et al. |
| 2003/0061687 A1 | 4/2003 | Hansen et al. |
| 2003/0116738 A1 | 6/2003 | O'Connor et al. |
| 2003/0138678 A1 | 7/2003 | Preidel |
| 2003/0173781 A1 | 9/2003 | Dodgson et al. |
| 2003/0190514 A1 | 10/2003 | Okada et al. |

| | | | |
|---|---|---|---|
| 2003/0198130 A1 | 10/2003 | Karp et al. | |
| 2003/0198576 A1 | 10/2003 | Coyne et al. | |
| 2003/0206806 A1 | 11/2003 | Paul et al. | |
| 2003/0215686 A1 | 11/2003 | DeFilippis et al. | |
| 2003/0226754 A1 | 12/2003 | Le Febre | |
| 2003/0232203 A1 | 12/2003 | Mutlu et al. | |
| 2004/0011648 A1 | 1/2004 | Paul et al. | |
| 2004/0070116 A1 | 4/2004 | Kaiser et al. | |
| 2004/0074784 A1 | 4/2004 | Anex et al. | |
| 2004/0087033 A1 | 5/2004 | Schembri | |
| 2004/0101421 A1 | 5/2004 | Kenny et al. | |
| 2004/0106192 A1 | 6/2004 | Jeon et al. | |
| 2004/0115731 A1 | 6/2004 | Hansen et al. | |
| 2004/0118189 A1 | 6/2004 | Karp et al. | |
| 2004/0129568 A1 | 7/2004 | Seul et al. | |
| 2004/0163957 A1 | 8/2004 | Neyer et al. | |
| 2004/0238052 A1 | 12/2004 | Karp et al. | |
| 2004/0241004 A1 | 12/2004 | Goodson et al. | |
| 2004/0241006 A1 | 12/2004 | Taboryski et al. | |
| 2004/0247450 A1 | 12/2004 | Kutchinsky et al. | |
| 2004/0248167 A1 | 12/2004 | Quake et al. | |
| 2005/0161326 A1 | 7/2005 | Morita et al. | |
| 2005/0166980 A1 | 8/2005 | Unger et al. | |
| 2005/0252772 A1 | 11/2005 | Paul et al. | |
| 2007/0066939 A1 | 3/2007 | Krulevitch et al. | |
| 2007/0129792 A1* | 6/2007 | Picart et al. | 623/1.46 |
| 2007/0144909 A1 | 6/2007 | Anex et al. | |
| 2007/0148014 A1 | 6/2007 | Anex et al. | |
| 2007/0224055 A1 | 9/2007 | Anex et al. | |
| 2008/0173545 A1 | 7/2008 | Anex et al. | |
| 2009/0148308 A1 | 6/2009 | Saleki et al. | |
| 2009/0185916 A1 | 7/2009 | Anex et al. | |

FOREIGN PATENT DOCUMENTS

| | | |
|---|---|---|
| EP | 0421234 A2 | 4/1991 |
| EP | 1063204 A2 | 12/2000 |
| JP | H02-229531 | 9/1990 |
| JP | 03-087659 A | 4/1991 |
| JP | 07269971 A | 10/1995 |
| JP | 09270265 | 10/1997 |
| JP | 02-265598 | 9/2002 |
| WO | WO 96/39252 A1 | 12/1996 |
| WO | WO 98/25065 A1 | 6/1998 |
| WO | WO 98/33001 A1 | 7/1998 |
| WO | WO 99/16162 A1 | 4/1999 |
| WO | WO 00/04832 A1 | 2/2000 |
| WO | WO 00/52376 A1 | 9/2000 |
| WO | WO 00/55502 A1 | 9/2000 |
| WO | WO 00/79131 A1 | 12/2000 |
| WO | WO 01/25138 A1 | 4/2001 |
| WO | WO 01/86155 A1 | 11/2001 |
| WO | WO 02/068821 A2 | 9/2002 |
| WO | WO02/070942 A1 | 9/2002 |
| WO | WO 02/086332 A1 | 10/2002 |
| WO | WO 2004/007348 A1 | 1/2004 |

OTHER PUBLICATIONS

Jenkins, D. et al., "Viscosity β-Coefficients of Ions in Solution," Chem. Rev. 95:2695-2724 (1995).

Kou et al., "Surface Modification of Microporous Polypropylene Membranes by Plasma-Induced Graft Polymerization of α-Allyl Glucoside," Langmuir 19:6869-6875 (2003).

Losche et al., "Detailed Structure of Molecularly Thin Polyelectrolyte Multilayer Films on Solid Substrates as Revealed by Neutron Reflectometry," Macromolecules 31:8893-8906 (1998).

Park et al., "Polyelectrolyte Multilayer Formation on Neutral Hydrophobic Surfaces," Macromolecules 38:10542-10550 (2003).

Schlenoff et al., "Mechanism of Polyelectrolyte Multilayer Growth: Charge Overcompensation and Distribution," Macromolecules 34:592-598 (2005).

Schweiss, R. et al., "Dissociation of Surface Functional Groups and Preferential Adsorption of Ions on Self-Assembled Monolayers Assessed by Streaming Potential and Streaming Current Measurements," Langmuir 17:4304-4311 (2001).

Tusek et al., "Surface characterisation of NH3 plasma treated polyamide 6 foils," Colloids and Surfaces A 195:81-95 (2001).

Yesek, L.P., "Bulk Conductivity of Soft Surface Layers: Experimental Measurement and Electrokinetic Implications," Langmuir 21:10054-10060 (2005).

Anex et al.; U.S. Appl. No. 12/728,844 entitled "Electrokinetic Pump Designs And Drug Delivery Systems," filed Mar. 22, 2010.

Adamson et al., Physical Chemistry of Surfaces, pp. 185-187 (Wiley, NY 1997).

Ananthakrishnan et al., Laminar Dispersion in capillaries; A.I. Ch.E. Journal, 11(6):1063-1072 (Nov. 1965).

Aris, R.; On the dispersion of a solute in a fluid flowing through a tube. Proceedings of the Royal Society of London; Series A, Mathematical and Physical Sciences; vol. 235(1200); pp. 67-77; 1956.

Baquiran et al.; Lippincott's Cancer Chemotherapy Handbook; 2nd Ed; Lippincott; Philadelphia; 2001.

Becker et al; Polymer microfabrication methods for microfluidic analytical applications; Electrophoresis; vol. 21; pp. 12-26; 2000.

Belfer et al.; Surface Modification of Commercial Polyamide Reverse Osmosis Membranes; J. Membrane Sci.; 139; pp. 175-181; 1998.

Bello et al; Electroosmosis of polymer solutions in fused silica capillaries; Electrophoresis; vol. 15; pp. 623-626; 1994.

Bings et al.; Microfluidic devices connected to fused-silica capillaries with minimal dead volume; Anal. Chem.; vol. 71; pp. 3292-3296 (1999).

Boerman et al.; Pretargeted radioimmunotherapy of cancer: progress step by step; J. Nucl. Med.; vol. 44; No. 3; pp. 400-411; Mar. 2003.

Boger, D.; Demonstration of upper and lower Newtonian fluid behaviour in a pseudoplastic fluid; Nature; vol. 265; pp. 126-128 (1977).

Braun et al.; Small-angle neutron scattering and cyclic voltammetry study on electrochemically oxidized and reduced pyrolytic carbon; Electrochimica Acta; vol. 49; pp. 1105-1112; 2004.

Buchholz et al.; Microchannel DNA sequencing matrices with switchable viscosities; Electrophoresis; vol. 23; pp. 1398-1409; 2002.

Burgreen et al.; Electrokinetic flow in ultrafine capillary slits; The Journal of Physical Chemistry, 68(95): pp. 1084-1091 (May 1964).

Chaiyasut et al.; Estimation of the dissociation constants for functional groups on modified and unmodified gel supports from the relationship between electroosmotic flow velocity and pH; Electrophoresis; vol. 22; pp. 1267-1272; 2001.

Chatwin et al.; The effect of aspect ratio on longitudinal diffusivity in rectangular channels; J. Fluid Mech.; vol. 120; pp. 347-358 (1982).

Chu et al.; Physicians Cancer Chemotherapy Drug Manual 2002; Jones and Bartlett Publisheer; Massachusetts; 2002.

Churchill et al.; Complex Variables and Applications; McGraw-Hill, Inc. New York; 1990.

Collins, Kim; Charge density-dependent strength of hydration and biological structure; Biophys. J.; vol. 72; pp. 65-76; Jan. 1997.

Conway, B.E.; Electrochemical Capacitors Their Nature, Function, and Applications; Electrochemistry Encyclopedia. 2003. (Available at http://electrochem.cwru.edu/ed/encycl/art-c03-elchem-cap.htm. Accessed May 16, 2006).

Conway, B.E.; Electrochemical Supercapacitors Scientific Fundamentals and Technological Applications; Kluwer Academic/Plenum Publishers; pp. 12-13, pp. 104-105, and pp. 192-195; 1999.

Cooke Jr., Claude E.; Study of electrokinetic effects using sinusoidal pressure and voltage; The Journal of Chemical Physics; vol. 23; No. 12; pp. 2299-2300; Dec. 1955.

Dasgupta et al.; Electroosmosis: a reliable fluid propulsion system for flow injection analysis; Anal. Chem.; vol. 66; pp. 1792-1798; 1994.

Wijnhoven et al.; Preparation of photonic crystals made of air spheres in titania; Science; 281; pp. 802-804 (Aug. 7, 1998).

DeGennes; Scaling Concepts in Polymer Physics; Cornell U. Press; p. 223; 1979.

Kou et al.; Surface modification of microporous polypropylene membranes by plasma-induced graft polyerization of ?-allyl glucoside;Langmuir; vol. 19; pp. 6869-6875; 2003.

Doshi et al.; Three dimensional laminar dispersion in open and closed rectangular conduits; Chemical Engineering Science, 33; pp. 795-804 (1978).

Drott et al.; Porous silicon as the carrier matrix in microstructured enzyme reactors yielding high enzyme activities; J. Micromech. Microeng; vol. 7; pp. 14-23 (1997).

Yazawa, T., Present status and future potential of preparation of porous glass and its application; Key Engineering Materials; 115; pp. 125-146 (1996).

Gan et al.; Mechanism of porous core electroosmotic pump flow injection system and its application to determination of chromium(VI) in waste-water; Talanta; vol. 51; pp. 667-675 (2000).

Gennaro, A.R.; Remington: The Science and Practice of Pharmacy (20th ed.); Lippincott Williams & Wilkins. Philadelphia; 2000.

Gleiter et al.; Nanocrystalline Materials: A Way to Solids with Tunable Electronic Structures and Properties?; Acta Mater; 49; pp. 737-745; 2001.

Gongora-Rubio et al.; The utilization of low temperature co-fired ceramics (LTCC-ML) technology for meso-scale EMS, a simple thermistor based flow sensor; Sensors and Actuators; vol. 73; pp. 215-221; 1999.

Gonzalez et al.; Fluidic interconnects for modular assembly of chemical microsystems; Sensors and Actuators B; vol. 49; pp. 40-45 (1998).

Goodman and Gilman's "The Pharmacological Basis of Therapeutics;" (10th Ed.); Hardman et al. (editors); 2001.

Gritsch et al.; Impedance Spectroscopy of Porin and Gramicidin Pores Reconstituted into Supported Lipid Bilayers on Indium-Tin-Oxide Electrodes; Langmuir; 14; pp. 3118-3125; 1998.

Gurau et al.; On the mechanism of the hofmeister effect; J. Am. Chem. Soc.; 2005; vol. 126; pp. 10522-10523.

Haisma; Direct Bonding in Patent Literature; Philips. J. Res.; vol. 49, pp. 165-170; 1995.

Hunter; Foundations of Colloid Science vol. II (Oxford Univ. Press, Oxford) pp. 994-1002; (1989).

Jackson, J. D.; Classical Electrodynamics 2nd Ed. John Wiley & Sons, Inc. New York. 1962.

Jarvis et al.; Fuel cell / electrochemical capacitor hybrid for intermittent high power applications; J. Power Sources; vol. 79; pp. 60-63; 1999.

Jessensky et al.; Self-organized formation of hexagonal pore structures in anodic alumina; J. Electrochem. Soc.; vol. 145; (11); pp. 3735-3740 (Nov. 1998).

Jimbo et al.; Surface Characterization of Poly(acrylonitrite) Membranes: Graft-Polymerized with Ionic Monomers as Revealed by Zeta Potential Measurements; Macromolecules; vol. 31; pp. 1277-1284; 1998.

Johnson et al.; Dependence of the conductivity of a porous medium on electrolyte conductivity; Physical Review Letters; 37(7); pp. 3502-3510 (Mar. 1, 1988).

Johnson et al.; New pore-size parameter characterizing transport in porous media; Physical Review Letter; 57(20); pp. 2564-2567 (Nov. 17, 1986).

Johnson et al.; Theory of dynamic permeability and tortuosity in fluid-saturated porous media; J. Fluid Mech; 176; pp. 379-402 (1987).

Jones et al.; The viscosity of aqueous solutions of strong electrolytes with special reference to barium chloride; J. Am. Chem. Soc.; vol. 51; pp. 2950-2964; 1929.

Klein, F.; Affinity Membranes: a 10 Year Review; J. Membrance Sci.; vol. 179; pp. 1-27; 2000.

Kobatake et al.; Flows through charged membranes. I. flip-flop current vs voltage relation; J. Chem. Phys.; 40(8); pp. 2212-2218 (Apr. 1964).

Kobatake et al.; Flows through charged membranes. II. Oscillation phenomena; J. Chem. Phys.; 40(8); pp. 2219-2222 ( Apr. 1964).

Kopf-Sill; Successes and challenges of lab-on-a-chip; Lab-on-a-Chip 2; pp. 42N-47N (2002).

Kotz et al.; Principles and applications of electrochemical capacitors; Electrochimica Acta; 45; pp. 2483-2498; 2000.

Li et al., Studies on preparation and performances of carbon aerogel electrodes for the application of supercapacitor; Journal of Power Sources; vol. 158; pp. 784-788; 2006.

Liu et al.; Electroosmotically pumped capillary flow-injection analysis; Analytica Chimica Acta; vol. 283; pp. 739-745; 1993.

Liu et al.; Flow-injection analysis in the capillary format using electroosmotic pumping; Analytica Chimica Acta; vol. 268; pp. 1-6; 1992.

Ma et al.; A review of zeolite-like porous materials; Microporous and Mesoporous Materials; 37; pp. 243-252 (2000).

Manz et al.; Electroosmotic pumping and electrophoretic separations for miniaturized chemical analysis systems; J. Micromach. Microeng.; vol. 4; pp. 257-265; 1994.

Martin et al.; Laminated Plastic Microfluidic Components for Biological and Chemical Systems; J. Vac. Sci. Technol.; vol. A 17; pp. 2264-2269; 1999.

Morrison et al.; Electrokinetic energy conversion in ultrafine capillaries; J. Chem. Phys.; 43; pp. 2111-2115 (1965).

Mroz et al.; Disposable Reference Electrode; Analyst; vol. 123; pp. 1373-1376; 1998.

Nakanishi et al.; Phase separation in silica sol-gel system containing polyacrylic acid; Journal of Crystalline Solids; 139; pp. 1-13 (1992).

Nittis et al.; A high-pressure interconnect for chemical microsystem applications; Lab-on-a-Chip 1; pp. 148-152 (2001).

Ocvirk et al.; High performance liquid chromatography partially integrated onto a silicon chip; Anal. Methods Instrum.; vol. 2; pp. 74-82 (1995).

Paul et al., Electrokinetic pump application in micro-total analysis systems mechanical actuation to HPLC; Micro Total Analysis Systems, pp. 583-590 (2000).

Paul et al.; Electrokinetic generation of high pressures using porous microstructures; Micro Total Analysis Systems, pp. 49-52 (1998).

Peters et al.; Molded rigid polymer monoliths as separation media for capillary electrochromatography; Anal. Chem.; 69; pp. 3646-3649 (1997).

Philipse, A.P., Solid opaline packings of colloidal silica spheres; Journal of Materials Science Letters; 8; pp. 1371-1373 (1989).

Pretorius et al.; Electro-osmosis: a new concept for high-speed liquid chromatography; Journal of Chromatography; vol. 99; pp. 23-30; 1974.

Ye et al.; Capillary electrochromatography with a silica column with dynamically modified cationic surfactant; Journal of Chromatography A; vol. 855; pp. 137-145; 1999.

Rastogi, R.P.; Irreversible thermodynamics of electro-osmotic effects; J. Scient. Ind. Res.; (28); pp. 284-292 (Aug. 1969).

Rice et al.; Electrokinetic flow in a narrow cylindrical capillary; J. Phys. Chem.; 69(11); pp. 4017-4024 (Nov. 1965).

Roberts et al.; UV Laser Machined Polymer Substrates for the Development of Microdiagnostic Systems; Anal. Chem.; vol. 69; pp. 2035-2042; 1997.

Salabat et al.; Thermodynamic and transport properties of aqueous trisodium citrate system at 298.15 K; J. Mol. Liq.; vol. 118; pp. 67-70; 2005.

Sankaranarayanan et al.; Chap. 1: Anatomical and pathological basis of visual inspection with acetic acid (VIA) and with Lugol's iodine (VILI); A Practical Manual on Visual Screening for Cervical Neoplasia; IARC Press; 2003.

Schmid et al.; Electrochemistry of capillary systems with narrow pores V. streaming potential: donnan hindrance of electrolyte transport; J. Membrane Sci.; 150; pp. 197-209 (1998).

Schmid, G.; Electrochemistry of capillary systems with narrow pores. II. Electroosmosis; J. Membrane Sci.; 150; pp. 159-170 (1998).

Skeel, Ronald T. (editor); Handbook of Chemotherapy (6th Ed.); Lippincott Williams & Wilkins; 2003.

Stokes, V. K.; Joining Methods for Plastics and Plastic Composites: An Overview; Poly. Eng. and Sci.; vol. 29; pp. 1310-1324; 1989.

Takamura, Y., et al., "Low-Voltage Electroosmosis Pump and Its Application to On-Chip Linear Stepping Pneumatic Pressure Source," Abstract, Micro Total Analysis Systems, 2001, pp. 230-232.

Takata et al.; Modification of Transport Properties of Ion Exchange Membranes; J. Membrance. Sci.; vol. 179; pp. 101-107; 2000.

Taylor, G.; Dispersion of soluble matter in solvent flowing slowly through a tube; Prox. Roy. Soc. (London); 21; pp. 186-203; Mar. 31, 1953.

Tuckerman et al.; High-performance heat sinking for VLSI; IEEE Electron Dev. Letts., vol. EDL-2, pp. 126-129; May 1981.

Uhlig et al.; The electro-osmotic actuation of implantable insulin micropumps; Journal of Biomedical Materials Research; vol. 17; pp. 931-943; 1983.

Van Brunt, Jennifer; Armed antibodies; Signals (online magazine); 11 pgs.; Mar. 5, 2004.

Vinson, J.; Adhesive Bonding of Polymer Composites; Polymer Engineering and Science; vol. 29; No. 19; pp. 1325-1331; Oct. 1989.

Watson et al.; Recent Developments in Hot Plate Welding of Thermoplastics; Poly. Eng. and Sci.; vol. 29; pp. 1382-1386; 1989.

Zeng, S. et al., "Fabrication and characterization of electroosmotic micropumps," Sensors and Actuators, B 79: pp. 107-114 (2001).

Weidenhammer, Petra et al., Investigation of Adhesion Properties of Polymer Materials by Atomic Force Microscopy and Zeta Potential Measurements, Journal of Colloid and Interface Science 180, 232-236 (1996).

Park, Juhyun et al., Polyelectrolyte Multilayer Formation on Neutral Hydrophobic Surfaces, Macromolecules 2005, 38, 10542-10550.

Kiriy, Anton et al., Cascade of Coil-Globule Conformational Transitions of Single Flexible Polyelectrolyte Molecules in Poor Solvent, J. Am. Chem. Soc. 2002, 124, 13454-13462.

Jenkins, Donald et al., Viscosity B-Coefficients of Ions in Solution, Chem. Rev. 1995, 95, 2695-2724.

Jacobasch, J.J., Adsorption of ions onto polymer surfaces and its influence on zeta potential and adhesion phenomena, Colloid Polym Sci. 276: 434-442 (1998).

Greene, George et al., Deposition and Wetting Characteristics of Polyelectrolyte Multilayers on Plasma-Modified Porous Polyethylene, Langmuir 2004, 20, 2739-2745.

Adamczyk, Z., et al., Characterization of Polyelectrolyte Multilayers by the Streaming Potential Method, Langmuir, 2004, 20, 10517-10525.

Klitzing et al., Swelling Behavior of Polyelectrolyle Multilayers in Saturated Water Vapor, American Chemical Society 2004, 37, 7285.

Hammond et al., Polyelectrolyte Multilayer Formation on Neutral Hydrophobic Surfaces, American Chemical Society 2005, 38, 10542.

Cremer at al., Specific Ion Effects on the Water Solubility of Macromolecules: PNIPAM and the Hofmeister Series, J. Am. Chem. Soc. 2005, 127, 14505.

Stamm et al, Cascade of Coil-Globule Conformational Transitions of Single Flexible Polyelectrolyte Molecules in Poor Solvent, J. Am. Chem. Soc. 2002, 124, 13454.

Salomaeki et al., The Hofmeister Anion Effect and the Growth of Polyelectrolyte Multilayers, American Chemical Society 2004, 20, 3679.

Schlenoff et al., Salt-Induced Interdiffusion in Multilayers Films: A Neutron Reflectivity Study, American Chemical Society 2005, 38, 8473.

Schweiss et al., Dissociation of Surface Functional Groups and Preferential Adsorption of Ions on Self-Assembled Monolayers Assessed by Streaming Potential and Streaming Current Measurements, American Chemical Society 2001, 17, 4304-4311.

Decher, Fuzzy Nanoassemblies: Toward Layers Polymeric Multicomposites, Science 1997, 277, 1232.

Mika et al., A new class of polyelectrolyte-filled microfiltration membranes with environmentally controlled porosity, Journal of Membrane Science 1995, 108, 37-56.

Schoenhoff, J., Layered polyelectrolyte complexes: physics of formation and molecular properties, Journal of Physics Condensed Matter 203, 15, R 1781.

Rubner, Controlling Bilayer Composition and Surface Wettability of Sequentially Adsorbed Multilayers of Weak Polyelectrolytes, American Chemical Society 1998, 31, 4309.

Rosen, M.J.; Ch.2 - Adsorption of surface-active agents at interfaces: the electrical double layer; Surfactants and Interfacial Phenomena, Second Ed., John Wiley & Sons, pp. 32-107; 1989.

Weston et al.; Instrumentation for high-performance liquid chromatography; HPLC and CE, Principles and Practice, Academic Press; (Chp. 3) pp. 82-85; 1997.

US 6,406,905, 06/2002, Parce et al. (withdrawn)

* cited by examiner

Poly(sodium 4-styrenesulfonate)
NaPSS

Poly(diallyldimethylammonium chloride)
PDADMA-Cl

Didodecyldimethylammonium bromide
DDDMA-Br

Poly(vinylamine) (MW ~ 340,000 kDa)
PVAH

Poly(allylamine) (MW ~ 65,000 kDa)
PAH

Direction of liquid and current flow is shown for a membrane with a negative zeta potential

METHODS, COMPOSITIONS AND DEVICES, INCLUDING ELECTROOSMOTIC PUMPS, COMPRISING COATED POROUS SURFACES

STATEMENT AS TO FEDERALLY SPONSORED RESEARCH

The invention described herein was made with United States Government support under 70NANB3H3048 awarded by the National Institute of Standards and Technology (NIST). The United States Government has certain rights in this invention.

FIELD OF THE INVENTION

Described herein are polyelectrolyte-adsorbed membranes, methods of producing such membranes and the use of such membranes.

BACKGROUND OF THE INVENTION

Electroosmotic pumps drive polar liquids with flow rates in the range from nL/min to mL/min and pressures of up to ~680 atm using electric fields. Having no moving parts and being completely silent, these pumps have applications in medical and biological fields including drug delivery, artificial organs, biochemical analysis or bioanalytical applications; in active water management; in hydrogen fuel cells or proton exchange membrane (PEM) fuel cells, including air delivery/displacement in PEM fuel cells, miniature fuel cells and for methanol/water mixture delivery in direct methanol fuel cells (DMFCs); as fluid-driving units for micro-fluid injection analysis (µ-FIA); and for cooling in microchip/microelectronics devices.

SUMMARY OF THE INVENTION

Described herein are modified membrane surfaces comprising a membrane onto which at least one monolayer of a polyelectrolyte polymer (referred to as a "polyelectrolyte") has been adsorbed. Typically, the membrane is a polymeric, porous membrane; however, packed beds of inorganic particles or monolithic inorganic membranes are equally suitable substrates. In some embodiments the membrane is a charge-neutral, polymeric, hydrophobic, porous membrane. In other embodiments the membrane comprises covalently linked ionic groups. In some embodiments the polyelectrolyte is a polycation. In other embodiments the polyelectrolyte is a polyanion. In some embodiments a single polyelectrolyte layer (referred to as a "monolayer") is adsorbed onto the membrane surface. In other embodiments, more than one polyelectrolyte layer of alternating charges (referred to as a "multilayer") is adsorbed onto the membrane surface. In some embodiments the polyelectrolyte(s) are physically adsorbed via ionic and/or hydrophobic interactions, although other interactions may be involved. In other embodiments, the polyelectrolyte(s) are physically adsorbed via predominantly electrostatic interactions, although other interactions may be involved. In yet other embodiments, separate polyelectrolyte layers are physically adsorbed via different non-covalent forces. Thus, in some embodiments, the membrane is charge-neutral and hydrophobic, and the first polyelectrolyte monolayer is adsorbed via predominantly hydrophobic interactions, and each subsequent polyelectrolyte monolayer is adsorbed on the underlying polyelectrolyte monolayer via predominantly electrostatic interactions. While, in other embodiments, the membrane comprises covalently linked ionic groups, and the polyelectrolyte(s) is (are) physically adsorbed via predominantly electrostatic interactions. In further or additional embodiments, the end-to-end distance of the adsorbing polyelectrolyte can be substantially greater than the average diameter of the pores of the membrane.

Also described herein are polyelectroyte-adsorbed membranes having a surface zeta potential that is at least about +50 mV or at least about −50 mV. In further or additional embodiments, the polyelectrolyte-adsorbed membranes maintain the aforementioned zeta potential for at least 48 hours of continuous electroosmotic use. In further or additional embodiments, the anion to the cationic polyelectrolyte is a kosmotrope (also spelled as cosmotrope). In further or additional embodiments, the anion to the cationic polyelectrolyte has a Jones-Dole B coefficient greater than zero. In further or additional embodiments, the anion to the cationic polyelectrolyte is preferably a Hofmeister ion located to the left of the chloride anion as shown in the series below, which lists the extent of hydration of the anions:

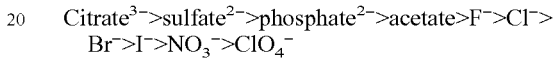

Citrate$^{3-}$>sulfate$^{2-}$>phosphate$^{2-}$>acetate>F$^-$>Cl$^-$>Br$^-$>I$^-$>NO$_3^-$>ClO$_4^-$ In further or additional embodiments, the end-to-end distance of the adsorbing polyelectrolyte can be substantially greater than the average diameter of the pores of the membrane.

Also described herein are methods for modifying polymeric membranes. In some embodiments, methods for preparing the above described modified membrane surfaces are described. In some embodiments, these methods involve selecting a polymeric, porous, membrane and contacting this membrane with a solution of at least one polyelectrolyte, such that the polyelectrolyte(s) is (are) physically adsorbed onto the membrane surface. In some embodiments, the membrane is successively contacted with solutions comprising at least one polyelectrolyte. In further or additional embodiments, the end-to-end distance of the adsorbing polyelectrolyte is substantially greater than the average diameter of the pores of the membrane.

Also described herein are electroosmotic pumps comprising a porous membrane onto which has been adsorbed at least one layer of a polyelectrolyte. In further embodiments, the porous membrane has been adsorbed with alternating layers of oppositely charged polyelectrolytes. In further embodiments, the surface zeta potential of the polyelectrolyte-adsorbed membrane is at least about +50 mV or at least about −50 mV. In further or additional embodiments, the polyelectrolyte-adsorbed membrane maintains the aforementioned zeta potential for at least 48 hours of continuous electroosmotic use. In further or additional embodiments, the anion to the cationic polyelectrolyte layer is a kosmotrope (also spelled as cosmotrope). In further or additional embodiments, the anion to the cationic polyelectrolyte layer has a Jones-Dole B coefficient greater than zero. An anion characterized in this manner should be present both during the polyelectrolyte adsorption process and in the buffer solution of the electroosmotic pump. The anions in both situations can be different as long as their Jones Dole coefficient is greater than zero. In further or additional embodiments, the pumping efficiency of the electroosmotic pump increases as the buffer concentration of the pumping solution decreases. In further or additional embodiments, the pumping efficiency of the electroosmotic pump depends upon the buffer composition, and is further dependent upon whether the topmost layer of the adsorbed polyelectrolyte multilayers is a polyanion or a polycation. For example, if the topmost layer is a polycationic polyelectrolyte, then the counter anion should be a kosmotrope. In further or alternative embodiments, the pore diameter of a charge-modified membrane can be reduced in step of more than 2 nm without affecting the zeta potential of the membrane or its stability (with pumping time), thus allowing for the production of modified membrane surfaces with pore diameters having optimal electroosmotic pumping. In further or additional embodiments, the end-to-end distance of the adsorbing polyelectrolyte is substantially greater than the average diameter of the pores of the membrane.

In further embodiments, the solubility of the polyion adsorbate is minimized by use of a kosmotrope counterion. In further embodiments, the rate of desorption of the polyion adsorbate is minimized by use of a kosmotrope counterion. In further embodiments, the counterion to the polycationic or polyanionic polyelectrolyte is a kosmotrope to provide a high pumping efficiency and a high zeta potential over a long period of time.

In one aspect are surfaces comprising the structure A/B, wherein A is a polymeric, porous membrane having an average pore diameter between about 100 nm to about 500 nm; B comprises at least one layer of a polyelectrolyte physically adsorbed on A, wherein the polyelectrolyte in the monolayer has an average molecular weight of from about 50 kDa to about 1,000 kDa and the anion to the cationic polyelectrolyte has a positive Jones-Dole B viscosity coefficient; and wherein A has a zeta potential of |20-25| mV in the absence of B, and A/B has a zeta potential of at least |50| mV.

In one embodiment B comprises a multilayer of polyelectrolytes. In a further or alternative embodiment, B comprises alternating monolayers of cationic and anionic polyelectrolytes. In a further or alternative embodiment, the alternating monolayers of cationic and anionic polyelectrolytes are formed by contacting an adsorbed cationic polyelectrolyte monolayer with an aqueous solution of an anionic polyelectrolyte or by contacting an adsorbed anionic polyelectrolyte monolayer with an aqueous solution of a cationic polyelectrolyte.

In a further or alternative embodiment, each solution comprises a polyelectrolyte at a concentration of at least 2 mM with respect to the repeating unit of the polyelectrolyte. In a further or alternative embodiment, each adsorption solution has a pH from about 3.5 to about 8.5. In a further or alternative embodiment, each solution is a buffered solution with an ionic strength between about 25 to about 250 mM. In a further or alternative embodiment, the contacting occurs from about 1 hour to about 7 days.

In a further or alternative embodiment, the B layer does not vary in thickness by >50%. In a further or alternative embodiment, the average thickness of each polyelectrolyte monolayer is between about 1 nm to about 6 nm.

In a further or alternative embodiment, A/B is hydrophilic. In a further or alternative embodiment, A/B has a zeta potential of |≧50| mV for at least two days during which pumping is continuously applied across the surface.

In a further or alternative embodiment, A is selected from the group consisting of poly(olefins), halogenated poly(olefins), poly(cylco olefins), halogenated poly(cylco olefins), poly(styrenes), halogenated poly(styrenes), poly(propylenes), poly(ethylenes), halogenated poly(ethylenes), poly(tetrafluoroethylenes), poly(sulfones), poly(ether sulfones), poly(arylsulfones), poly(phenylene ether sulfones), poly(imides), poly(etherimides), poly(vinylidene fluorides), poly(esters), halogenated poly(esters), poly(ethylene terephthalates), poly(butylene terephthalates), poly(carbonates), poly(vinyl halides), poly(acrylics), poly(acrylates), halogenated poly(acrylates), poly(methacrylics), poly(methacrylates), poly(anhydrides), poly(acrylonitriles), poly(ethers), poly(arylene ether ketones), poly(phenylene sulfides), poly(arylene oxides), poly(siloxanes), cellulose acetates, cellulose nitrates, poly(amides), nylon, ceramics and mixtures and co-polymers thereof. In a further or alternative embodiment, A is poly(vinylidene fluoride) (PVDF) or nylon.

In a further or alternative embodiment, B comprises a monolayer of a weak polyelectrolyte. In a further or alternative embodiment, B comprises a monolayer of a strong polyelectrolyte.

In a further or alternative embodiment, B comprises at least one monolayer of cationic polyelectrolyte.

In a further or alternative embodiment, the cationic polyelectrolyte is a polyamine, an alkylated polyamine, a polyammonium salt, a poly(quaternary ammonium salt), a poly(alkyleneimine) or mixtures thereof.

In a further or alternative embodiment, the cationic polyelectrolyte is selected from Poly(diallyldimethylammonium chloride) (PDADMA-Cl); Poly(N,N-dimethyl-3,5-dimethylene piperidinium chloride); Poly(ethylenimine) (PEI); Poly(vinylamine) (PVAH); Poly(N-methyl vinylamine); Poly(allylamine) (PAH); Poly(4-vinyl-1-methylpyridinium bromide); Poly(allylammonium fluoride); Poly(dimethylamine-co-epichlorohydrin), quaternized; Poly(lysine); Poly(N,N,N',N'-tetramethyl-N-trimethylenehexamethylenediammonium dibromide); Poly(2-(Dimethylamino-ethyl) methacrylate); Poly(2-methacryloyloxy-ethyl-trimethylammonium chloride); Poly(2-hydroxy-3-methacryloxypropyl-trimethylammonium chloride); Poly(3-chloro-2-hydroxypropyl-2-methacryloxyethyl-dimethylammonium chloride) (PCHPMEDMAC); Poly(N-[3-(dimethylamino)-propyl] methacrylamide]); and Poly([3-methacryloylamino-propyl]-trimethylammonium chloride). In a further or alternative embodiment, the counterion to the cationic polyelectrolyte is selected from the group consisting of aliphatic, aromatic or heteroaromatic carboxylates, chromate, bicarbonate, sulfate, phosphate, and fluoride. In a further or alternative embodiment, the counterion to the cationic polyelectrolyte is sulfate, acetate, propionate, benzoate, or salicylate. In a further or alternative embodiment, the counterion to the cationic polyelectrolyte is univalent.

In a further or alternative embodiment, B comprises at least one monolayer of an anionic polyelectrolyte. In a further or alternative embodiment, the anionic polyelectrolyte is a poly acid or a polysulfonic acid. In a further or alternative embodiment, the anionic polyelectrolyte is selected from the group consisting of Poly(acrylic acid) (PAA); Poly(methacrylic acid) (PMA); Poly(itaconic acid); Poly(4-styrenesulfonic acid) (PSS); Poly(vinylphosphonic acid); Poly(vinylsulphonic acid); Poly(aspartic acid); Poly(glutamic acid); Poly(sodium 4-styrenesulfonate) (NaPSS); Poly(anetholesulfonic acid); Poly(3-sulfopropyl methacrylate); Poly(1,4-phenylene ether-sulfone sulfonic acid); and Poly(1,4-phenylene ether ether ketone sulfonic acid). In a further or alternative embodiment, the counterion to the anionic polyelectrolyte is $Li^+$, $Na^+$, tris(hydroxymethyl)methyl ammonium or bis(2-hydroxyethyl)ammonium-tris(hydroxymethyl)methane. In a further or alternative embodiment, the counterion to the anionic polyelectrolyte is univalent.

In a further or alternative embodiment, B comprises at least one cationic polyelectrolyte monolayer and at least one anionic polyelectrolyte monolayer. In a further or alternative embodiment, the average pore diameter of A is from about 100 nm to about 300 nm.

In a further or alternative embodiment of any of the aforementioned embodiments, A is a charge-neutral, polymeric, microporous membrane; and B comprises one or more polyelectrolyte monolayers, wherein the first polyelectrolyte monolayer is adsorbed onto A via hydrophobic interactions, and wherein each subsequent polyelectrolyte monolayer is adsorbed on the underlying polyelectrolyte monolayer via electrostatic interactions.

In a further or alternative embodiment of any of the aforementioned embodiments, A comprises covalently linked ionic groups, and the first polyelectrolyte monolayer of B is physically adsorbed onto A via electrostatic interactions.

A porous polymeric membrane and at least one polyelectrolyte physically adsorbed thereon, wherein the porous polymeric membrane has an average pore diameter of from about 100 nm to about 500 nm and a zeta potential of |20-25| mV; the B layer comprises at least one polyelectrolyte that has a molecular weight between about 50 kDa to about 1,000 kDa and the counterion to the polyelectrolyte has a positive Jones-Dole B viscosity coefficient; and the porous polymeric membrane with at least one polyelectrolyte physically adsorbed thereon has a zeta potential of |50| mV.

In a further or alternative embodiment, the physically adsorbed polyelectrolyte forms a monolayer on the porous polymeric membrane. In a further or alternative embodiment, there are alternating monolayers of cationic and anionic polyelectrolytes physically adsorbed on the porous polymeric membrane. In a further or alternative embodiment, the alternating monolayers of cationic and anionic polyelectrolytes are formed by contacting an adsorbed cationic polyelectrolyte monolayer with an aqueous solution of an anionic polyelectrolyte or contacting an adsorbed anionic polyelectrolyte monolayer with an aqueous solution of a cationic polyelectrolyte. In a further or alternative embodiment, each solution comprises a polyelectrolyte at a concentration of at least 2 mM in terms of repeat unit of the polyelectrolyte.

In a further or alternative embodiment, each solution has a pH from about 3.5 to about 8.5. In a further or alternative embodiment, each solution is a buffered solution with an ionic strength between about 25 to about 250 mM. In a further or alternative embodiment, the average thickness of each polyelectrolyte layer is between about 1 nm to about 6 nm. In a further or alternative embodiment, the membrane has a zeta potential that shows <25% variation after heating at 50° C., at pH 8.2 for at least 10 days.

In a further or alternative embodiment, the membrane is hydrophilic. In a further or alternative embodiment, the membrane has a zeta potential |≧50| mV for at least seven days. In a further or alternative embodiment, the membrane has a zeta potential |≧50| mV for at least seven days during which pumping is continuously applied across the surface.

In a further or alternative embodiment, the porous polymeric membrane is selected from the group consisting of poly(olefins), halogenated poly(olefins), poly(cylco olefins), halogenated poly(cylco olefins), poly(styrenes), halogenated poly(styrenes), poly(propylenes), poly(ethylenes), halogenated poly(ethylenes), poly(tetrafluoroethylenes), poly(sulfones), poly(ether sulfones), poly(arylsulfones), poly(phenylene ether sulfones), poly(imides), poly(etherimides), poly (vinylidene fluorides), poly(esters), halogenated poly(esters), poly(ethylene terephthalates), poly(butylene terephthalates), poly(carbonates), poly(vinyl halides), poly(acrylics), poly (acrylates), halogenated poly(acrylates), poly(methacrylics), poly(methacrylates), poly(anhydrides), poly(acrylonitriles), poly(ethers), poly(arylene ether ketones), poly(phenylene sulfides), poly(arylene oxides), poly(siloxanes), cellulose acetates, cellulose nitrates, poly(amides), nylon, ceramics and mixtures and co-polymers thereof.

In a further or alternative embodiment, the porous polymeric membrane is polyvinylidene fluoride (PVDF) or nylon. In a further or alternative embodiment, at least one polyelectrolyte is a weak polyelectrolyte. In a further or alternative embodiment, at least one polyelectrolyte is a strong polyelectrolyte.

In a further or alternative embodiment, at least one polyelectrolyte is a cationic polyelectrolyte. In a further or alternative embodiment, the cationic polyelectrolyte is a polyamine, an alkylated polyamine, a polyammonium salt, a poly(quaternary ammonium salt), a poly(alkylenimine) or mixtures thereof. In a further or alternative embodiment, the cationic polyelectrolyte is selected from Poly(diallyldimethylammonium chloride) (PDADMA-Cl); Poly(N,N-dimethyl-3,5-dimethylene piperidinium chloride); Poly(ethylenimine) (PEI); Poly(vinylamine) (PVAH); Poly(N-methyl vinylamine); Poly(allylamine) (PAH); Poly(4-vinyl-1-methylpyridinium bromide); Poly(allylammonium fluoride); Poly (dimethylamine-co-epichlorohydrin), quaternized; Poly (lysine); Poly(N,N,N',N'-tetramethyl-N-trimethylenehexamethylenediammonium dibromide); Poly (2-(Dimethylamino-ethyl) methacrylate); Poly(2-methacryloyloxy-ethyl-trimethylammonium chloride); Poly (2-hydroxy-3-methacryloxypropyl-trimethylammonium chloride); Poly(3-chloro-2-hydroxypropyl-2-methacryloxy-ethyl-dimethylammonium chloride) (PCHPMEDMAC); Poly(N-[3-(dimethylamino)-propyl methacrylamide]); and Poly([3-methacryloylamino-propyl]-trimethylammonium chloride). In a further or alternative embodiment, the counterion to the cationic polyelectrolyte is selected from the group consisting of aliphatic, aromatic or heteroaromatic carboxylates, chromate, bicarbonate, sulfate, phosphate, and fluoride. In a further or alternative embodiment, the counterion to the cationic polyelectrolyte is sulfate, acetate, propionate, sorbate, benzoate or salicylate. In a further or alternative embodiment, the counterion to the cationic polyelectrolyte is univalent.

In a further or alternative embodiment, at least one polyelectrolyte is an anionic polyelectrolyte. In a further or alternative embodiment, the anionic polyelectrolyte is a polycarboxylic acid or a polysulfonic acid. In a further or alternative embodiment, the anionic polyelectrolyte is selected from the group consisting of Poly(acrylic acid) (PAA); Poly(methacrylic acid) (PMA); Poly(itaconic acid); Poly(4-styrenesulfonic acid) (PSS); Poly(vinylphosphonic acid); Poly(vinylsulphonic acid); Poly(aspartic acid); Poly(glutamic acid); Poly(sodium 4-styrenesulfonate) (NaPSS); Poly(anetholesulfonic acid); Poly(3-sulfopropyl methacrylate); Poly(1,4-phenylene ether-sulfone sulfonic acid); and Poly(1,4-phenylene ether ether ketone sulfonic acid). In a further or alternative embodiment, the counterion to the anionic polyelectrolyte is $Li^+$, $Na^+$, tris(hydroxymethyl)methyl ammonium or bis(2-hydroxyethyl)ammonium-tris(hydroxymethyl)methane. In a further or alternative embodiment, the counterion to the anionic polyelectrolyte is univalent.

In a further or alternative embodiment, at least one cationic polyelectrolyte and at least one anionic polyelectrolyte can be used. In a further or alternative embodiment, the average pore diameter of the membrane is between about 100 nm to about 300 nm.

In a further or alternative embodiment of any of the aforementioned embodiments, the membrane is a component of an electroosmotic pump.

A method of modifying a surface, comprising selecting a polymeric, microporous, membrane with an average pore diameter of from about 100 nm to about 300 nm and a zeta potential of |20-25| mV; contacting the surface with at least one polyelectrolyte, wherein each polyelectrolyte has a molecular weight of from about 50 kDa to about 1,000 kDa and the counterion to the polyelectrolyte has a positive Jones- Dole B viscosity coefficient, wherein the polyelectrolyte is physically adsorbed onto the membrane surface, and the modified surface has a zeta potential of |≧50| mV.

In a further or alternative embodiment, the membrane is successively contacted with solutions comprising a polyelectrolyte. In a further or alternative embodiment, each solution comprises a polyelectrolyte at a concentration of from about 2 to 100 mM in terms of repeat unit of the polyelectrolyte. In a further or alternative embodiment, each solution has a pH from about 3.5 to about 8.5. In a further or alternative embodiment, each solution is a buffered solution with an ionic strength between about 25 to about 250 mM. In a further or alternative embodiment, the average thickness of each polyelectrolyte layer is from about 1 nm to about 6 nm. In a further or alternative embodiment, the modified surface shows <25% variation in zeta potential after heating at 50° C., at pH 8.2 for at least 10 days.

In a further or alternative embodiment, the unmodified surface is charge-neutral. In a further or alternative embodiment, the unmodified surface is ionic. In a further or alternative embodiment, the modified surface is hydrophilic. In a further or alternative embodiment, the modified surface has a zeta potential |≧50| mV for at least seven days during which pumping is continuously applied across the surface.

In a further or alternative embodiment, the membrane is selected from the group consisting of poly(olefins), halogenated poly(olefins), poly(cylco olefins), halogenated poly(cylco olefins), poly(styrenes), halogenated poly(styrenes), poly(propylenes), poly(ethylenes), halogenated poly(ethylenes), poly(tetrafluoroethylenes), poly(sulfones), poly(ether sulfones), poly(arylsulfones), poly(phenylene ether sulfones), poly(imides), poly(etherimides), poly(vinylidene fluorides), poly(esters), halogenated poly(esters), poly(ethylene terephthalates), poly(butylene terephthalates), poly(carbonates), poly(vinyl halides), poly(acrylics), poly(acrylates), halogenated poly(acrylates), poly(methacrylics), poly(methacrylates), poly(anhydrides), poly(acrylonitriles), poly(ethers), poly(arylene ether ketones), poly(phenylene sulfides), poly(arylene oxides), poly(siloxanes), cellulose acetates, cellulose nitrates, poly(amides), nylon, ceramics and mixtures and co-polymers thereof. In a further or alternative embodiment, the membrane is poly(vinylidene fluoride) (PVDF) or nylon.

In a further or alternative embodiment, at least one polyelectrolyte is a weak polyelectrolyte. In a further or alternative embodiment, at least one polyelectrolyte a strong polyelectrolyte.

In a further or alternative embodiment, at least one polyelectrolyte is a cationic polyelectrolyte. In a further or alternative embodiment, the cationic polyelectrolyte is a polyamine, an alkylated polyamine, a polyammonium salt, a poly(quaternary ammonium salt), a poly(alkylenimine) or mixtures thereof. In a further or alternative embodiment, the cationic polyelectrolyte is selected from Poly(diallyldimethylammonium chloride) (PDADMA-Cl); Poly(N,N-dimethyl-3,5-dimethylene piperidinium chloride); Poly(ethylenimine) (PEI); Poly(vinylamine) (PVAH); Poly(N-methyl vinylamine); Poly(allylamine) (PAH); Poly(4-vinyl-1-methylpyridinium bromide); Poly(allylammonium fluoride); Poly(dimethylamine-co-epichlorohydrin), quaternized; Poly(lysine); Poly(N,N,N',N'-tetramethyl-N-trimethylenehexamethylenediammonium dibromide); Poly(2-(Dimethylamino-ethyl) methacrylate); Poly(2-methacryloyloxy-ethyl-trimethylammonium chloride); Poly(2-hydroxy-3-methacryloxypropyl-trimethylammonium chloride); Poly(3-chloro-2-hydroxypropyl-2-methacryloxy-ethyl-dimethylammonium chloride) (PCHPMEDMAC); Poly(N-[3-(dimethylamino)-propyl methacrylamide]); and Poly([3-methacryloylamino-propyl]-trimethylammonium chloride). In a further or alternative embodiment, the counterion to the cationic polyelectrolyte is citrate, tartrate, chromate, bicarbonate, sulfate, phosphate, acetate, benzoate, salicylate, or fluoride. In a further or alternative embodiment, the counterion to the cationic polyelectrolyte is univalent.

In a further or alternative embodiment, at least one polyelectrolyte is an anionic polyelectrolyte. In a further or alternative embodiment, the anionic polyelectrolyte is a poly acid or a polysulfonic acid. In a further or alternative embodiment, the anionic polyelectrolyte is selected from the group consisting of Poly(acrylic acid) (PAA); Poly(methacrylic acid) (PMA); Poly(itaconic acid); Poly(4-styrenesulfonic acid) (PSS); Poly(vinylphosphonic acid); Poly(vinylsulphonic acid); Poly(aspartic acid); Poly(glutamic acid); Poly(sodium 4-styrenesulfonate) (NaPSS); Poly(anetholsulfonic acid); Poly(3-sulfopropyl methacrylate); Poly(1,4-phenylene ethersulfone sulfonic acid); and Poly(1,4-phenylene ether ether ketone sulfonic acid). In a further or alternative embodiment, the counterion to the anionic polyelectrolyte is univalent.

In a further or alternative embodiment of any of the aforementioned embodiments, the membrane is used as a filtration material.

In a further or alternative embodiment of any of the aforementioned embodiments, the membrane is a fabric.

In a further or alternative embodiment of any of the aforementioned embodiments, the membrane is a material used in photocopying. In a further or alternative embodiment, the material used in photocopying is paper. In a further or alternative embodiment, the material is a toner material.

In a further or additional embodiments of any of the aforementioned embodiments or aspects, the zeta potentials described herein are measured in 5 mM NaOH/10 mM acetic acid at pH 4.7 or 10 mM tris(hydroxymethyl)aminomethane (TRIS) and 5 mM sorbic acid at pH 8.2.

Also described herein are methods that permit polyelectrolyte adsorption and, hence, charge modification of the surface of porous media (e.g., membranes) that have confined spaces (voids) whose dimensions are of the same order of magnitude as the longest dimension of the macroions that are adsorbed and which provide modified porous media with high and stable zeta potentials that enable long-term electroosmotic pumping at constant rates. Also described herein are methods for making charge modified membranes that can undergo electroosmotic pumping at rates at least two times higher than prior membranes or packed particle beds over a pH range of 4 to 9. Also described herein are charge modified membranes that, in conjunction with an appropriate buffer solution that contains radical scavenging small molecule counterions and (charge neutral) alcohols or sugars, retain high electroosmotic pumping rates after sterilization with gamma radiation, and as a result charge modified membranes for use in medical devices. Also described herein are method for charge modifying (a) charged hydrophilic membranes and (b) charged or uncharged hydrophobic membranes, by polyelectrolyte adsorption so as to reduce the membrane pore diameter in a step-wise, controlled manner to achieve maximum pumping efficiency (expressed in units of nL/μC).

The term "bond" or "single bond" refers to a chemical bond between two atoms, or two moieties when the atoms joined by the bond are considered to be part of larger substructure.

The term "buffer" refers to a solution, which resists change in hydronium and hydroxide ion concentration (and thus pH) upon addition of small amounts of acid or base, or upon dilution. A buffer is typically prepared at a given pH. Buffer solutions consist of a weak acid and its conjugate base or a weak base and its conjugate acid. The concentrations of the weak acid/conjugate base or weak base/conjugate acid may vary. In some embodiments the concentrations of the buffer components are from about 0.5 mM to about 30 mM, in others from about 0.5 mM to about 10 mM and in yet others from about 0.5 mM to about 5 mM.

The term "end-to-end distance" or square root of the mean-square end-to-end distance of a linear polymer chain averaged over all conformations of the chain is designated "r". It is calculated, for a freely jointed chain as follows:

$$\sqrt{\langle r^2 \rangle} = \sqrt{N}.L$$

r=end-to-end distance
N=no of monomers
L=length of each monomer.

The term "monolayer" refers to a layer of polyelectrolyte that has been physically adsorbed onto a polymeric porous membrane substrate. A monolayer does not imply that the thickness of the layer is uniform or that all portions of the substrate have been covered. The term does imply that substantially all of the substrate has been covered with a polyelectrolyte and that the average thickness of the layer is between about 1 nm to about 6 nm. That is, the monolayer may also be at least 1 nm in thickness, at least 2 nm in thickness, at least 3 nm in thickness or more than 4 nm in thickness. The polyelectrolyte may be polyanionic, polycationic and may further comprise hydrophobic groups. In some embodiments, a monolayer covers at least 60% of the substrate; at least 65% of the substrate; at least 70% of the substrate; at least 75% of the substrate; at least 80% of the substrate; at least 85% of the substrate; at least 90% of the substrate; and at least 95% of the substrate. A monolayer is considered to exist if portions of the underlying substrate are covered with more than a monolayer of polyelectrolyte provided that on average, the coverage of the substrate is equal to or less than a single monolayer of polyelectrolyte. Preferably, the monolayer is coherent and conformal, so as to substantially cover the substrate.

The term "bilayer" refers to two different polyelectrolyte monolayers, sequentially adsorbed onto a polymeric porous membrane substrate, each of which has an average thickness of from about 1 nm to about 6 nm. That is, each monolayer may be of a different thickness and each monolayer may also be at least 1 nm in thickness, at least 2 nm in thickness, at least 3 nm in thickness or more than 4 nm in thickness. One polyelectrolyte is polyanionic; the other is polycationic, and they may be adsorbed in any order; either polyelectrolyte may further comprise hydrophobic groups. Each monolayer of a bilayer may be interpenetrated with portions of the adjacent monolayer.

The term "trilayer" refers to three single polyelectrolyte monolayers, sequentially adsorbed onto a polymeric porous membrane substrate, each of which has an average thickness of from about 1 nm to about 6 nm. That is, each monolayer may be of a different thickness and each monolayer may also be at least 1 nm in thickness, at least 2 nm in thickness, at least 3 nm in thickness or more than 4 nm in thickness. Two of the three polyelectrolytes may be polyanions (which may be the same or different) with the third being a polycation, or, two of the three polyelectrolytes may be polycations (which may be the same or different) with the third being a polyanion, such that they are sequentially adsorbed in the order polyanion-polycation-polyanion or polycation-polyanion-polycation. Each individual polyelectrolyte may further comprise hydrophobic groups. Each monolayer of a trilayer may be interpenetrated with portions of the adjacent monolayers.

The term "multilayer" refers to multiple polyelectrolyte monolayers, sequentially adsorbed onto a polymeric porous membrane substrate, wherein the sequential adsorption alternates polycations and polyanions or polyanions and polycations (i.e., a bilayer, trilayer, etc.). Each layer has an average thickness from about 1 nm to about 6 nm. That is, each monolayer may be of a different thickness and each monolayer may also be at least 1 nm in thickness, at least 2 nm in thickness, at least 3 nm in thickness or more than 4 nm in thickness. The individual layers of a multilayer may be interpenetrated with portions of either adjacent monolayer; to some extent they may be ionically crosslinked.

The term "ester" refers to a chemical moiety with formula —COOR, where R is selected from the group consisting of alkyl, cycloalkyl, aryl, heteroaryl (bonded through a ring carbon) and heteroalicyclic (bonded through a ring carbon).

Broadly speaking, surfaces or regions interact with water in one of two ways. If the surface or region is resistant to wetting, or is not readily wet by water, the interaction is termed hydrophobic. Such surfaces or regions have a lack of affinity for water. On the other hand, if the surface or region is readily wetted by, or readily adsorbs, water, the interaction is termed hydrophilic. Such surfaces or regions have an affinity for water. One common technique for determining whether, and to what degree, a surface is hydrophobic or hydrophilic is by contact angle measurements. In this technique, a drop of water is deposited on a test surface and the angle of the receding and advancing edges of the droplet with the surface are measured. The term "hydrophobic" is used to describe a surface or coating, which forms a contact angle of greater than 60° when a droplet of water is deposited thereon. The term "hydrophilic" is used to describe a surface or coating, which forms a contact angle of less than 60° when a droplet of water is deposited thereon.

The term "moiety" refers to a specific segment or functional group of a molecule. Chemical moieties are often recognized chemical entities embedded in or appended to a molecule.

The term "optionally substituted" means that the referenced group may be substituted with one or more additional group(s) individually and independently selected from alkyl, cycloalkyl, aryl, heteroaryl, heteroalicyclic, hydroxy, alkoxy, aryloxy, mercapto, alkylthio, arylthio, cyano, halo, carbonyl, thiocarbonyl, isocyanato, thiocyanato, isothiocyanato, nitro, perhaloalkyl, perfluoroalkyl, silyl, and amino, including mono- and di-substituted amino groups, and the protected derivatives thereof.

The terms "physical adsorption" and "physically adsorbed" refer to interactions including, but not limited to ionic bonding, hydrogen bonding, hydrophobic interactions, hydrophilic interactions, electrostatic interactions, Van de Waals interactions, physisorption, intercalation, entanglement, and combinations thereof.

The terms "polymer" or "polymeric" refer to a molecule composed of smaller monomeric subunits covalently linked together. The term polymer encompasses the term homopolymer, which refers to a polymer made of only one type of monomer, as well as the term copolymer, which refers to a polymer made up of two or more types of monomer. Examples of copolymers encompassed within the term "polymer," as well as the shorthand terminology used within, are presented in the following table:

| Type | Shorthand | Example |
|---|---|---|
| Homopolymer | None | Poly(A) |
| Unspecified | -co- | Poly(A-co-B) |
| Statistical | -stat- | Poly(A-stat-B) |
| Random | -ran- | Poly(A-ran-B) |
| Alternating | -alt- | Poly(A-alt-B) |
| Periodic | -per- | Poly(A-per-B-per-C) |
| Network | net- net- | PolyA |
| Polymer blend | -blend- | PolyX-blend-polyY |
| Block copolymer | -block- | PolyX-block-polyY |
| Graft copolymer | -graft- | PolyX-graft-polyY |
| Interpenetrating polymer network | -ipn- | net-polyX-ipn-net-polyY |
| AB-crosslinked | -net- | PolyX-net-polyY |
| Starblock | star- | star-(polyX-block-polyY) |
| Segregated star | star- | star-(polyX; polyY) |

The term "polyelectrolyte" refers to a polymer having monomers comprising anions, cations, or both. A polyelectrolyte is a macromolecular substance which, on dissolving in water or another ionizing solvent, dissociates to give polyions (polycations or polyanions)—multiply charged macroions—together with an equivalent amount of (counter) ions of opposite sign. The counterions are monovalent, possibly divalent; trivalent counterions and counterions with still higher valence usually crosslink polyelectrolytes and make them insoluble in water. A polyelectrolyte can be a poly(acid), a poly(base), or a poly(salt).

The terms "polyanion" and "anionic polymer" refer to a polymer having an overall negative charge within a certain pH range.

The terms "polycation" and "cationic polymer" refer to a polymer having an overall positive charge within a certain pH range.

The term "substrate" refers to the body or base porous polymer, onto which at least one polyelectrolyte layer is adsorbed.

While preferred embodiments have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments described herein may be employed in practicing the invention. It is intended that the following claims define the scope of the invention and that methods and structures within the scope of these claims and their equivalents be covered thereby.

INCORPORATION BY REFERENCE

All publications and patent applications mentioned in this specification are herein incorporated by reference to the same extent as if each individual publication or patent application was specifically and individually indicated to be incorporated by reference.

BRIEF DESCRIPTION OF THE DRAWINGS

A better understanding of the features and advantages of the present invention will be obtained by reference to the following detailed description that sets forth illustrative embodiments, in which the principles of the invention are utilized, and the accompanying drawings of which.

DETAILED DESCRIPTION OF THE INVENTION

Figure 1:
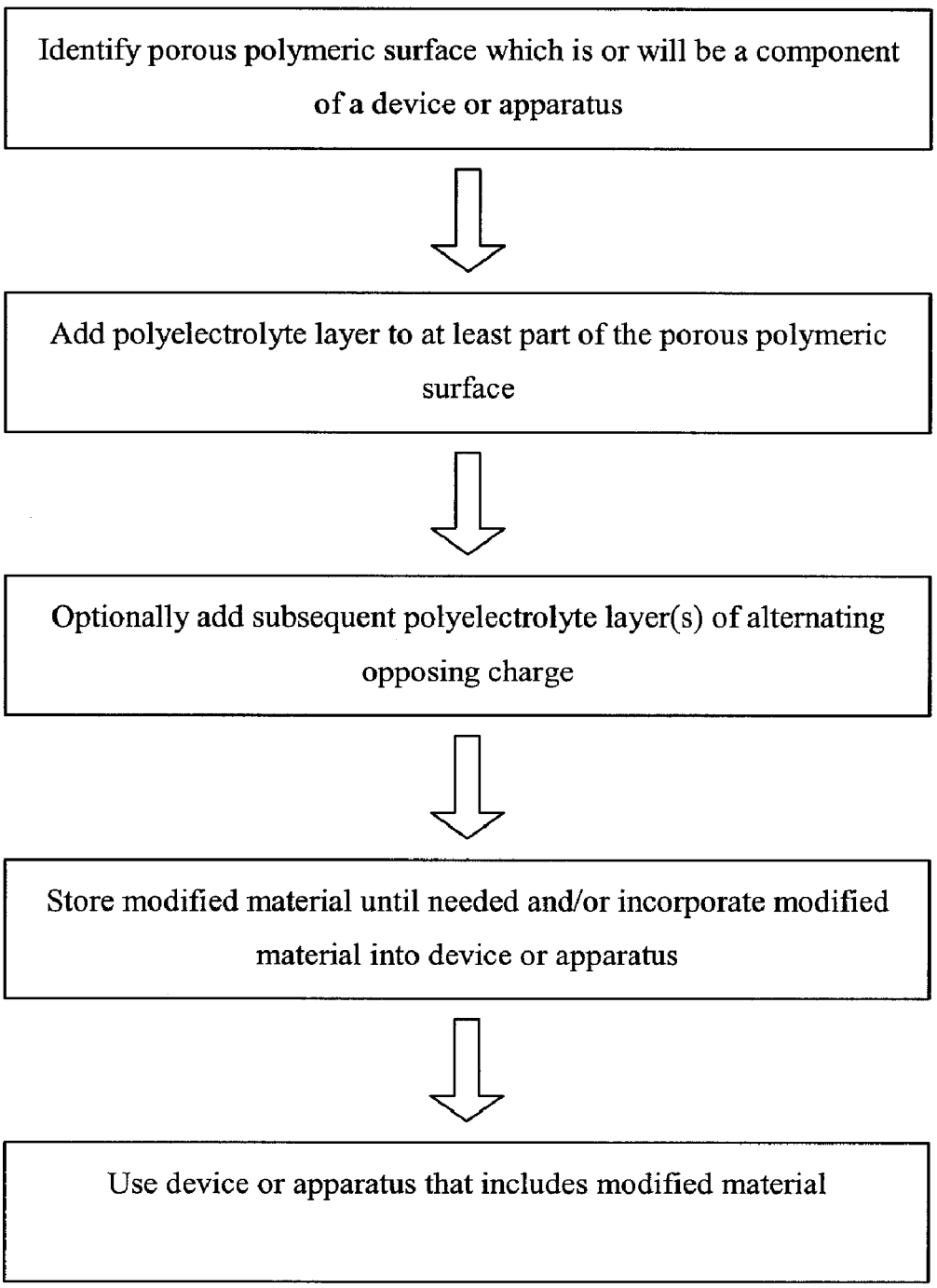
FIG. 1 presents an illustrative, non-limiting example of the preparation and uses of the coated membranes described herein.

Many materials have at least one porous surface. Examples include the surfaces of plastics and other polymeric materials. These porous surfaces can be present on or components of a device or apparatus. However, the requirements of the device or apparatus may dictate modification of at least one property of at least a portion of such porous surfaces. Many types of modifications can be envisioned; by way of example only, high and stable zeta potentials might be desirable or surfaces that also resist electromigration. One way to accomplish this modification would be to add at least one additional material onto (i.e., coat) at least a portion of the porous surface. Multiple materials may be added to create more complex surfaces or surfaces with properties tuned to a user's needs. Generally, such coatings should be stable and/or the stability controllable by the fabricator or user of the device or apparatus.

Methods for stably modifying a surface are needed in many different applications, including applications in the medical, biotechnology, pharmaceutical and other life sciences industries. Typically, applications in these industries utilize apparatuses/devices manufactured/fabricated from a polymer, glass, silicon, metal, or other inorganic or organic material. However, the initial surfaces of these apparatuses/devices may not have properties that are desired for a particular end user. For example, if the initial surface has a low or unstable zeta potential, and the end user requires a surface with a high and stable zeta potential, then the original surface must be modified. Preferably, such modifications should be stable for the desired use, and even more preferably, such modifications should be stable for prolonged or multiple uses. Furthermore, if such modifications are to be incorporated into a device or apparatus, then such modifications are preferably amenable to efficient, cost-effective and reproducible production. As used herein, coating refers to any means of modifying at least part of an exposed surface with another material in the form of a new region and/or layer. As described herein, the interactions between the original surface and the new region and/or layer can include hydrophobic interactions, covalent interactions, electrostatic interactions, hydrogen-bond interactions, non-covalent interactions as well as any combination of these interactions. As a result of such a coating, the properties of the new surface differ from the properties of the original surface.

One particular end use for a modified surface is in the field of electroosmotic pumps. Electroosmotic pumps incorporating modified surfaces may be used in a variety of applications, including, for example, cooling computer chips, fuel delivery to direct methanol fuel cells, as portable medical pumps to administer pharmaceuticals at controlled rates, as biosensor and "Lab-on-a-Chip" applications (e.g. PCR chip for DNA amplification), in separation and purification technologies, including water sampling and purification, and purification of biomaterials. The surfaces typically used in electroosmotic pumps are those of columns packed with inorganic particles (e.g. silica, alumina, and zirconia) or of monolithic inorganic membranes (e.g. silica, alumina, and zirconia). Such inorganic porous media present significant manufacturing and performance limitations. Polymeric membranes, on the other hand, charge-modified by the methods described herein, can overcome many of these limitations. The methods described herein, however, can, also be applied to the above-mentioned inorganic surface to effect improved electrokinetic performance. Compared to prior art described membranes, the polymeric membranes described herein provide more stable and more efficient performance over many days of pumping, and permit inexpensive manufacture of portable pumps driven by battery power.

Efficient electroosmotic pumping utilizes a porous dielectric substrate (i.e., a membrane) with pores of diameter substantially within a range of about 100 to about 500 nm and whose surfaces are highly charged when immersed in an aqueous electrolyte solution. In other embodiments, efficient electroosmotic pumping utilizes a membrane with pores of diameter substantially within a range of about 100 to about 300 nm and whose surfaces are highly charged when immersed in an aqueous electrolyte solution. In other embodiments, efficient electroosmotic pumping utilizes a membrane with pores of diameter substantially within a range of about 100 to about 200 nm and whose surfaces are highly charged when immersed in an aqueous electrolyte solution. Upon application of an electrical field parallel to the membrane surface, electroosmotic flow occurs. The state of charge at the membrane/liquid interface (as measured by its zeta potential) must remain constant over many days of pumping. Previously, polymeric membranes either permit low flow rates and stable pumping or high flow rates that decrease with pumping time. The membranes described herein, after surface modification, give high and stable electroosmotic flow rates.

Polymeric Materials; Porous Polymeric Substrates

Examples of porous polymers that may be used as surface substrates as described herein, include, by way of example only (note that the categories presented below are provided for organizational purposes only and not to imply that a particular polymer may not fall within more than one subcategory) the following:

(a) polyolefins, including, by way of example only, poly(ethylene), poly(butylene), poly(isobutene), poly(isoprene), poly(4-methyl-1-pentene), poly(propylene), ethylene-propylene copolymers, ethylene-propylene-hexadiene copolymers, and ethylene-vinyl acetate copolymers;

(b) styrene polymers, including by way of example only, poly(styrene), poly(2-methylstyrene), styrene-acrylonitrile copolymers having less than about 20 mole-percent acrylonitrile, and styrene-2,2,3,3,-tetrafluoropropyl methacrylate copolymers;

(c) halogenated hydrocarbon polymers, including by way of example only, poly(chlorotrifluoroethylene), chlorotrifluoroethylene-ethylene copolymers, poly(hexafluoropropylene), poly(tetrafluoroethylene), tetrafluoroethylene-ethylene copolymers, poly(trifluoroethylene), poly(vinyl fluoride), and poly(vinylidene fluoride);

(d) vinyl polymers, including by way of example only, poly(vinyl butyrate), poly(vinyl decanoate), poly(vinyl dodecanoate), poly(vinyl hexadecanoate), poly(vinyl hexanoate), poly(vinyl propionate), poly(vinyl octanoate), poly(heptafluoroisopropoxyethylene), poly(heptafluoroisopropoxypropylene), and poly(methacrylonitrile);

(e) acrylic and acrylate polymers, including poly(acrylonitriles) and poly(acrylamides), and by way of example only, poly(n-butyl acetate), poly(ethyl acrylate), poly[(1-chlorodifluoromethyl)tetrafluoroethyl acrylate], poly[(1-chlorodifluoromethyl)tetrafluoroethyl acrylate], poly[di(chlorofluoromethyl)fluoromethyl acrylate], poly(1,1-dihydroheptafluorobutyl acrylate), poly(1,1-dihydropentafluoroisopropyl acrylate), poly(1,1-dihydropentadecafluorooctyl acrylate), poly(heptafluoroisopropyl acrylate), poly[5-(heptafluoroisopropoxy)pentyl acrylate], poly[11-(heptafluoroisopropoxy)undecyl acrylate], poly[2-(heptafluoropropoxy)ethyl acrylate], and poly(nonafluoroisobutyl acrylate);

(f) methacrylic and methacrylate polymers, including by way of example only, poly(benzyl methacrylate), poly(n-butyl methacrylate), poly(isobutyl methacrylate), poly(t-butyl methacrylate), poly(t-butylaminoethyl methacrylate), poly(dodecyl methacrylate), poly(ethyl methacrylate), poly(2-ethylhexyl methacrylate), poly(n-hexyl methacrylate), poly(methyl methacrylate), poly(phenyl methacrylate), poly(n-propyl methacrylate), poly(octadecyl methacrylate), poly(1,1-dihydropentadecafluorooctyl methacrylate), poly(heptafluoroisopropyl methacrylate), poly(heptadecafluorooctyl methacrylate), poly(1-hydrotetrafluoroethyl methacrylate), poly(1,1-dihydrotetrafluoropropyl methacrylate), poly(1-hydrohexafluoroisopropyl methacrylate), and poly(t-nonafluorobutyl methacrylate);

(g) polyesters including by way of example only, poly(ethylene terephthalate), poly(butylene terephthalate), poly(ethylene terenaphthalate), and poly(carbonate);

(h) anhydride based polymers, including by way of example only, poly(styrene-alt-maleic anhydride) (PSMAA), poly(ethylene-alt-maleic anhydride), poly(styrene-co-maleic anhydride);

(i) poly(amides) and poly(imides), including linear poly(imides) and aromatic heterocyclic poly(imides), including by way of example only, nylon;

(j) poly(ethers) and poly(ether imides), including by way of example only, poly(etherimides) (PEI);

(k) poly(sulfones), poly(sulfides), poly(ketones), including by way of example only, poly(phenylene ether sulfone), poly(phenylene ether ketone), poly(arylsulfones), poly(phenylene sulfide) and poly(phenylene ether ether ketones);

(l) cellulose based polymers, including by way of example only, cellulose acetates and cellulose nitrates;

(m) cyclo-olefin polymers including by way of example only, Zeonor™ and Topas™;

(n) poly(siloxanes), including by way of example only, poly(dimethylsiloxane) (PDMS); and (o) copolymers comprising at least two different monomeric subunits of any of the aforementioned homopolymers.

Polymeric Materials; Polyelectrolytes and Surfactants

Polyelectrolytes are polymers comprising ionically dissociable groups, which can be a component or substituent of the polymer chain. An ionically dissociated polyelectrolyte may be referred to as a polyion. A negatively charged polyion is a polyanion; a positively charged polyion is a polycation. Polyelectrolytes dissociate into polyions and an equivalent amount of oppositely charged, typically, (though not always) small ions, or counterions. Usually, the number of these ionically dissociable groups in polyelectrolytes is sufficient, such that the polymers in dissociated form are water-soluble. Depending on the kind of dissociable groups, polyelectrolytes can be poly(acids), poly(bases), or poly(salts).

Poly(bases) contain groups which are capable of accepting protons, e.g. by reaction with acids, to form a salt. Examples of poly(bases) having dissociable groups within their backbone and/or side groups are poly(allylamine), poly(ethylenimine), poly(vinylamine) and poly(vinylpyridine). By accepting protons poly(bases) form polycations.

Cationic polyelectrolytes that may be physically adsorbed onto porous polymeric membrane substrates, as described herein, include, by way of example only (note that the categories presented below are provided for organizational purposes only and not to imply that a particular polymer may not fall within more than one sub-category) those listed below and shown in the following table.

(a) poly(amines), including, by way of example only, poly(allylamine) and poly(vinylamine);

(b) poly(ammonium salts), including, by way of example only, quaternized poly(acrylamides), poly(diallyldimethylammonium chloride) (PDADMA-Cl), poly(vinylbenzyl-trimethylammonium chloride) (PVBTMA-Cl), poly(methacryloxyethyl-trimethylammonium bromide), poly(methacryloyloxyethyltrimethylammonium methyl sulfate), poly(hydroxypropylmethacryloxyethyldimethylammonium chloride), poly(N-acrylamidopropyl-3-trimethylammonium chloride), poly(acrylamide/methacryloxypropyltrimethylammonium bromide), Polybrene®, poly(ethylenimine-epichlorohydrin ammonium chloride), poly(2-dimethylaminoethyl methacrylate methylchloride quaternary salt), natural polymers having quaternized substituents containing nitrogen;

(c) poly(imines), including, by way of example only, poly(ethylenimine) (PEI);

(d) poly(acrylamides), including, by way of example only, poly(dimethylaminoethyl-acrylamide), poly(dimethylaminopropyl acrylamide), poly(methyldiethylaminoethyl acrylamide), poly(diallyldimethyl-ammonium chloride/N-isopropylacrylamide);

(e) poly(acrylates), including, by way of example only, poly(dimethylaminoethyl acrylate), poly(t-butylaminoethyl acrylate);

(f) poly(methacrylates), including, by way of example only, poly(dimethylaminoethyl methacrylate), poly(t-butylaminoethyl methacrylate), poly(methyldiethylaminoethyl methacrylate);

(g) poly(cyclicamines), including, by way of example only, poly(imidazoline), poly(vinylpyridine), poly(vinylpyrrolidones), poly(vinylimidazoline) (PVI), poly(methylvinylpyridinium bromide), poly(methylvinylpyridinium chloride);

(h) poly(sulfonium salts) and poly(phosphonium salts), including, by way of example only, poly(acryloxyethyldimethylsulfonium chloride), poly(glycidyltributylphosphonium chloride);

(i) copolymers comprising at least two different monomeric subunits of any of the aforementioned homopolymers.

Examples of cationic polyelectrolytes

| Name | Chemical Structure | Source |
|---|---|---|
| Poly(diallyldimethylammonium chloride) (PDADMA-Cl) | 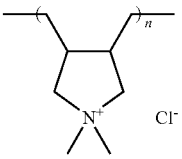 | Aldrich |
| Poly(N,N-dimethyl-3,5-dimethylene piperidinium chloride) | 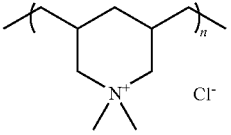 | Scientific Polymer Products |
| Poly(ethylenimine) (PEI) | 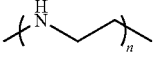 | PolySciences, Inc. |
| Poly(vinylamino) (PVAH) | 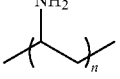 | PolySciences, Inc. |
| Poly(N-methyl vinylamine) | 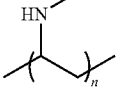 | PolySciences, Inc. |
| Poly(allylamine) (PAH) | 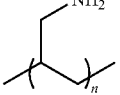 | PolySciences, Inc. |
| Poly(4-vinyl-1-methylpyridinium bromide) | 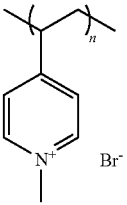 | PolySciences, Inc. |

-continued

| Name | Chemical Structure | Source |
|---|---|---|
| Poly(allylammonium fluoride) | | |
| Poly(dimethylamine-co-epichlorohydrin), quaternized | | Scientific Polymer Products |
| Poly(lysine) | | Sigma |
| Polybrene, Poly(N,N,N',N'-tetramethyl-N-trimethylenehexamethylenediammonium dibromide) | | Sigma |
| Poly(2-(Dimethylamino-ethyl) methacrylate) | | |
| Poly(2-methacryloyloxy-ethyl-trimethylammonium chloride) | | |
| Poly(2-hydroxy-3-methacryloxypropyl-trimethylammonium chloride) | | PolySciences, Inc. |

-continued

| Name | Chemical Structure | Source |
|---|---|---|
| Poly(3-chloro-2-hydroxypropyl-2-methacryloxyethyl-dimethylammonium chloride) (PCHPMEDMAC) | | PolySciences, Inc. |
| Poly(N-[3-(dimethylamino)-propyl]methacrylamide]) | | |
| Poly([3-methacryloylamino-propyl]-trimethylammonium chloride) | | |

When dissociated, poly(acids) form polyanions, with protons being split off, which can be inorganic, organic and biopolymers. Examples of poly(acids) include, but are not limited to poly(phosphoric acid), poly(vinylsulfuric acid), poly(vinylsulfonic acid), poly(vinylphosphonic acid) and poly(acrylic acid). Examples of their corresponding salts (poly[salts]), are poly(phosphate), poly(sulfate), poly(sulfonate), poly(phosphonate) and poly(acrylate).

Anionic polyelectrolytes that may be physically adsorbed onto porous polymeric membrane substrates, as described herein, include, by way of example only poly(acrylic acid) (PAA), poly(methacrylic acid), poly(itaconic acid), poly(4-styrenesulfonic acid) (PSS), poly(vinylphosphonic acid), poly(vinylsulfonic acid), poly(glutamic acid), poly(aspartic acid), poly(anetholesulfonic acid), poly(3-sulfopropyl methacrylate), poly(1,4-phenylene ether-sulfone-sulfonic acids), poly(1,4-phenylene ether ether ketone sulfonic acids), including copolymers comprising at least two different monomeric subunits of any of the aforementioned homopolymers, as summarized in the table below.

They are used preferably in the form of their respective alkali salts, such as by way of example only poly(sodium 4-styrenesulfonate) (NaPSS), poly(sodium anetholesulfonate).

Examples of anionic polyelectrolytes

| Name | Chemical Structure |
|---|---|
| Poly(acrylic acid) (PAA) | —[CH₂—CH(COOH)]ₙ— |
| Poly(methacrylic acid) (PMA) | —[CH₂—C(CH₃)(COOH)]ₙ— |
| Poly(itaconic acid) | —[CH₂—C(CH₂COOH)(COOH)]ₙ— |
| Poly(4-styrenesulfonic acid) (PSS) | —[CH₂—CH(C₆H₄-SO₃H)]ₙ— |
| Poly(vinylphosphonic acid) | —[CH₂—CH(PO₃H₂)]ₙ— |
| Poly(vinylsulphonic acid) | —[CH₂—CH(SO₃H)]ₙ— |
| Poly(aspartic acid) | —[NH—CH(CH₂COOH)—C(=O)]ₙ— |

-continued

| Name | Chemical Structure |
|---|---|
| Poly(glutamic acid) | |
| Poly(sodium 4-styrenesulfonate) (NaPSS) | |
| Poly(anetholesulfonic acid) | |
| Poly(3-sulfopropyl methacrylate) | |
| Poly(1,4-phenylene ether-sulfone sulfonic acid) | |
| Poly(1,4-phenylene ether ether ketone sulfonic acid) | |

Surfactants, especially two chained and gemini ones (see Gemini Surfactants, Surfactant Science series, 2004, VOL 117, edited by Raoul Zana and Jiding Xia, Marcel Decker, Inc.) may also be physically adsorbed onto porous polymeric membrane substrates, as described herein.

Examples of suitable cationic surfactants include, but are not limited to quaternary ammonium salts ($R_4N^+X^-$), (for example alkyltrimethylammonium halides, such as didodecyldimethylammonium bromide (DDDMA-Br), palmityl trimethylammonium bromide or N-alkylpyridinium salts or tertiary amines ($R_3NH^+X^-$), (for example cholesteryl-3β-N-(dimethyl-aminoethyl)-carbamate) or any mixtures thereof, wherein $X^-$ is a counteranion, although it should be noted that single chained cationic surfactants (e.g. alkyltrimethylammonium halides) are less effective.

Examples of suitable anionic surfactants include, but are not limited to alkyl sulfonates ($RSO_3^-M^+$; R=alkyl), (for example dodecyl sulfates, such as sodium dodecyl sulfate (SDS), or lauryl sulfate), olefin sulfonates ($RSO_3^-M^+$; R=alkenyl), (for example sodium-n-dodecyl-benzene sulfonate), alkyl sulfates ($ROSO_3^-M^+$; R=alkyl) and fatty acids ($RCOO^-M^+$), (for example dodecanoic acid sodium salt or phosphoric acid, cholic acids or fluoroorganics such as lithium-3-[2-(perfluoroalkyl)ethylthio]propionate) or any mixtures thereof, wherein $M^+$ is a countercation, such as, but not limited to sodium or lithium. Preferred surfactants are those having 1 to 30 carbons in their alkyl or alkenyl groups.

Kosmotropes and Chaotropes

The term 'kosmotrope' (order-maker) denotes solutes that increase the structuring of water. It may also refer to solutes that stabilize proteins or membranes and/or decrease the solubility of such substances in water. Kosmotropes are typically small and often multiply-charged ions, with high charge density, exhibiting stronger interactions with water molecules than water with itself and therefore capable of breaking water-water hydrogen bonds. Representative salts which contain anions such as sulfate ($SO_4^{2-}$), hydroxide ($OH^-$), phosphate ($PO_4^{3-}$), hydrogen phosphate ($HPO_4^{2-}$), fluoride ($F^-$), acetate ($CH_3COO^-$), citrate ($OHC(COO)(CH_2COO)_2^{3-}$) and tartrate ($[CH(OH)(COO)]_2^{2-}$) are kosmotropic. Representative salts which contain cations such as magnesium ($Mg^{2+}$), calcium ($Ca^{2+}$), lithium ($Li^+$), sodium ($Na^+$) and hydrogen ($H^+$) are kosmotropic. Examples of more complex, neutral (or zwitterionic) kosmotropes include trimethylamine N-oxide ($Me_3N^+$—$O^-$), proline, glycine betaine and 3-dimethylsulfoniopropionate ($Me_2S^+CH_2CH_2COO^-$).

The term 'chaotrope' (disorder-maker) denotes solutes that decrease the structuring of water. It may also refer to solutes that destabilize proteins or membranes and/or increase the solubility of such substances in water. Chaotropes are typically large (the radii of singly charged chaotropic cations are >1.06 Å and >1.78 Å for anions), singly charged ions, with low charge density, exhibiting weaker interactions with water molecules than water with itself and thus interfering little in the hydrogen bonding of the surrounding water. Representative salts which contain anions such as thiocyanate ($SCN^-$), dihydrogen phosphate ($H_2PO_4^-$), hydrogen sulfate (or bisulfate, $HSO_4^-$), hydrogencarbonate (or bicarbonate, $HCO_3^-$), iodide ($I^-$), bromide ($Br^-$), chloride ($Cl^-$), bromate ($BrO_3^-$), chlorate ($ClO_3^-$), perchlorate ($ClO_4^-$), nitrate ($NO_3^-$) are chaotropic. Representative salts which contain cations such as ammonium ($NH_4^+$), cesium ($Cs^+$), potassium ($K^+$), guanidinium ($NH_2)_3C^+$) and tetramethylammonium ($CH_3)_4N^+$) are chaotropic.

Both the extent and the strength of hydrogen bonding may be changed independently by the solute but either of these may be, and have been, used as measures of order making. It is, however, the effects on the extent of quality hydrogen bonding that is of overriding importance as true kosmotropes shift the local less dense water ⇌ more dense water equilibrium to the left and chaotropes shift it to the right. Most kosmotropes do not cause a large scale net structuring in water.

Hydrogen bonding between water molecules is more broken in the immediate vicinity of ionic kosmotropes than ionic chaotropes. There are numerous means known to those skilled in the art for determining whether a particular salt is kosmotropic or chaotropic.

The Hofmeister Series

Historically, the Hofmeister series ranks various ions in their ability to precipitate a mixture of hen egg white proteins. When water molecules are bound to an ion, this has the effect of increasing the effective protein concentration in the remaining unbound water. At a certain point, the protein becomes sufficiently concentrated to precipitate.

More recently, the Hofmeister series is used to rank the ability of ions to stabilize protein structure. Strongly and weakly hydrating cations and anions show opposite trends within the series, i.e. strongly hydrated anions and weakly hydrated cations rank high in the series (i.e. stabilize proteins), while strongly hydrated cations and weakly hydrated anions rank low in the series (i.e. destabilize proteins). The series has been shown to have a much more general utility and correlates with many other observed phenomena. It should be noted however, that the relative positions in the series are indicative only, as there will be variation depending on variables such as protein, concentration, pH, temperature and ion pair effects. The complete original series (see Hofmeister, *Arch. Exp. Pathol. Pharmakol.* (*Leipzig*) 1888, 24, 247-260; translated in Kunz et al, *Curr. Opin. Coll. Interface Sci.* 2004, 9, 19-37), is given below.

Anions:citrate$^{3-}$>$SO_4^{2-}$=tartrate$^{2-}$>$HPO_4^{2-}$>$CrO_4^{2-}$>acetate$^-$>$HCO_3^-$>$Cl^-$>$NO_3^-$>$ClO_3^-$  Cations $Mg^{2+}$>$Li^+$>$Na^+$~$K^+$>$NH_4^+$ The Hofmeister series also reflects the promotion of hydrophobic associations; ions are ranked by their ability to stabilize structured low-density water that, in turn, stabilizes hydrophobic interactions. Ionic chaotropes prefer low-density water, which does not require breaking hydrogen bonds to accommodate them. Ionic kosmotropes are excluded from low-density water and prefer aqueous environments providing more available hydration sites.

| excluded from LDW | accumulate in LDW |
|---|---|
| strongly hydrated anions | weakly hydrated anions |
| citrate$^{3-}$ > sulfate$^{2-}$ > phosphate$^{2-}$ > | |
| $F^-$ > $Cl^-$ > $Br^-$ > $I^-$ > $NO_3^-$ > | |
| $ClO_4^-$ | |
| $NMe_4^+$ > $NH_4^+$ > $Cs^+$ > $Rb^+$ > | |
| $K^+$ > $Na^+$ > $H^+$ > $Ca^{2+}$ > | |
| $Mg^{2+}$ > $Al^{3+}$ | |
| weakly hydrated cations | strongly hydrated cations |
| accumulate in LDW | excluded from LDW |

Ions that have the greatest effect (exhibiting weaker interactions with water than water itself) are known as structure-breakers or chaotropes, whereas ions having the opposite effect are known as structure-makers or kosmotropes (exhibiting strong interactions with water molecules).

Anions hydrate more strongly than cations of the same ionic radius (though most anions are larger than most cations)

since the δ⁺H atoms of a water molecule can approach an anion (about 0.8 Å) more closely than the δ⁻O atom can approach a cation, giving rise to greater electrostatic potential. In addition, anions are far more polarizable than cations (cf. $Li^+$ 0.08, $Na^+$ 0.65, $Cs^+$ 6.89, $F^-$ 2.21, $Cl^-$ 8.63, $Br^-$ 12.2, $SCN^-$ 17; units=$10^{-30}$ $m^3$. Taken from Ion Properties, Y Marcus, Marcel Dekker, 1997) attributable to their more diffuse extra electron(s) and breaking hydrogen bonds round anions is relatively slow due to the difficulty in finding a new hydrogen-bonding partner.

Large singly charged ions (e.g. $I^-$, $Me_4N^+$, $Cs^+$) have more positive entropies of hydration, and act like hydrophobic molecules, binding to surfaces via not only charge interactions but also through van der Waals forces. Such large ions possess low surface charge density and easily fit within dodecahedral water clathrate shells to produce the lowest apparent density of solution water. These clathrate structures that form around the larger ions allow no rotations in the surface water surface ('hydrophobic' hydration).

Small ions (e.g. $Li^+$, $F^-$) are strongly hydrated, with small or negative entropies of hydration, creating local order and high local density. Smaller ions cause the partial collapse of clathrate structures through puckering. These ions allow rotation of the water molecule dipole toward oppositely charged ions, through weak interactions that would be prevented at truly hydrophobic surfaces and hence produce greater localized water molecule mobility ('negative' hydration).

The water clathrate structures surrounding the smallest ions (e.g. $Na^+$, $Li^+$, $F^-$) are tightly formed, as these ions hold strongly to the first shell of their hydrating water molecules. As a result, there is less localized water molecule mobility (strong or 'positive' hydration), a higher apparent density of the solution water and collapse, through puckering, of the water clathrate structure.

Thus, the hydrogen-bonding defects create a less complete cluster structure. These defects are caused by the inward-pointing primary H-bonding to anions or disoriented lone-pair electrons and electrostatic repulsion. Additionally, weakened hydrogen bonding reduces inward-pointing secondary H-bond donation near cations or acceptance near anions. Generally, the water surrounding anions tends to retain favorable water-water hydrogen bonding whereas that surrounding small cations does not.

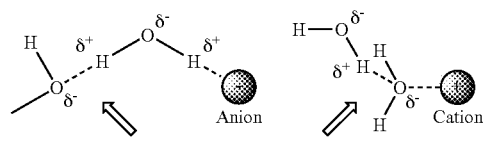

The H bonds indicated with the arrows are weaker

Cluster defects within the icosahedral cluster structure are caused by water molecules with only 3 (rather than 4) H-bonds. The fourth site cannot accept/donate a hydrogen bond to/from either (a) a bound atom that already possesses 3 hydrogen bonds such as the oxygen atoms in $SO_4^{2-}$ or (b) a water molecule already possessing 4 hydrogen bonds, as shown below:

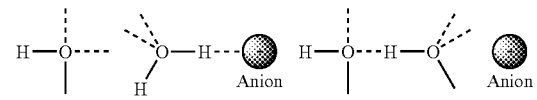

i.e. the fourth H-bonding site has the assembly illustrated on the left, rather than that on the right Strong hydration around ions costs the equivalent of two hydrogen bonds (~46 kJ $mol^{-1}$; i.e. one replaced by the ion plus one chain of H-bonding with severely reduced strength) and will only form around ions where at least this enthalpic contribution is released.

Thus, ions with high charge density bind larger water clusters more strongly, as is reflected in the molar ionic volumes listed in the table below. The hydration entropies correlate with the tendency of an ion to accumulate in low-density water (LDW, or expanded structure, ES) such that a gain in entropy of the ion on solution is countered by a loss in entropy of the water.

Another correlation is with the Jones-Dole viscosity B coefficient (see Collins, *Biophys. J.* 1997, 72, 65-76). Ions that are weakly hydrated exhibit a smaller change in viscosity with concentration, having negative B coefficients (chaotropes), than strongly hydrated ions that have positive B coefficients (kosmotropes).

Some key properties of cations and anions are given in the table below:

| Cations | Ionic volume[i] | ΔS[ii] | Jones-Dole[iii] | Anions | Ionic volume[i] | ΔS[ii] | Jones-Dole[iii] |
|---|---|---|---|---|---|---|---|
| $Al^{3+}$ | −58.7 | −396 | +0.67 | Citrate[3−] | +77[iv] | na | +0.27[v] |
| $Mg^{2+}$ | −32.2 | −174 | +0.385 | Sulfate[2−] | +25 | −126 | +0.206 |
| $Ca^{2+}$ | −28.9 | −132 | +0.298 | Phosphate[2−] | na | na | +0.382 |
| $H^+$ | −5.5 | na | +0.068 | $F^-$ | +4.3 | −70 | +0.127 |
| $Na^+$ | −6.7 | −5 | +0.085 | $Cl^-$ | +23.3 | +6 | −0.005 |
| $K^+$ | +3.5 | +34 | −0.009 | $Br^-$ | +30.2 | +28 | −0.033 |
| $Rb^+$ | +8.6 | +52 | −0.033 | $I^-$ | +41.7 | +55 | −0.073 |
| $Cs^+$ | +15.8 | +59 | −0.047 | $NO_3^-$ | +34.5 | +9 | −0.045 |
| $NH_4^+$ | +12.4 | +5 | −0.008 | $ClO_4^-$ | +49.6 | +30 | −0.061 |
| $N(CH_3)_4^+$ | +84.1 | na | +0.123 | | | | |

[i]Molar aqueous ionic volume, $cm^3$ $mol^{-1}$, 298.15 K; negative values indicates contraction in volume.
[ii]Entropy of hydration, kJ $mol^{-1}$, 298.15 K; standard molar entropy less the entropy of the primary hydrating water (i.e. its immobilization).
[iii]Viscosity Jones-Dole B-coefficient, $dm^3$ $mol^{-1}$, 298.15 K; results from the degree of water structuring. The accuracy and precision of this data may be overstated but the values are indicative.
[iv]Trisodium citrate value calculated by Salabat et al., (J. Mol. Liq. 2005, 118, 67-70), less $Na^+$ values from this table.
[v]Calculated from Salabat et al., ibid.
na not available The viscosity ($\eta$) of an aqueous salt solution, relative to the viscosity of water ($\eta_0$) (at fixed temperature and pressure), varies with the salt concentration (c) according to the Jones-Dole expression (see Jones and Dole, *J. Am. Chem. Soc.*, 1929, 51, 2950):

$$\eta/\eta_0 = 1 + Ac^{0.5} + Bc$$

By definition, $$\Psi = (\eta - \eta_0)/(\eta_0 \cdot c^{0.5})$$

Hence $$\Psi = A + B \cdot c^{0.5}$$

A plot of $\Psi$ against $c^{0.5}$ has intercept A and slope B.

The constant A is related to long-range interionic forces (charge-charge interactions), is always positive and is greater for strongly hydrated ions (except $H^+$ and $OH^-$). It only appreciably affects the viscosity at low concentrations (<0.05 M).

Coefficient B, the Jones-Dole B viscosity coefficient, characterizes the interactions between ions and water molecules and the resulting degree of water structuring (i.e. a measure of the structure-forming and structure-breaking capacity of an electrolyte in solution). In broad terms a positive B coefficient indicates a tendency for the solute to enhance water-water interactions (raising viscosity) whereas a negative coefficient indicates a tendency to induce disorder. For a 1:1 salt, the B coefficient is equal to the sum of the ionic B coefficients ($B = B^+ + B^-$). Thus, for example, for a series of salts with a common anion, the B values will change only for $B^+$; the cations. B values for the ammonium iodide salt $R_4N^+ I^-$ will be reflected by changes in B for $R_4N^+$ through the series from R=methyl to R=n-butyl. In fact the change in this case is indicative of the change in character from 'structure breaking' $Me_4N^+$ to hydrophobic 'structure forming' $Bu_4N^+$ ions. Ions with negative B coefficients have appreciably more negative B coefficients in $D_2O$ but those with positive B coefficients show little change in $D_2O$. At higher concentrations (i.e. above about 0.5M), additional terms (e.g. $Dc^2$) may be included on the right hand side of the equation.

Electroosmosis

Described herein are porous surfaces, which may or may not be present on or components of a device or apparatus. Further described herein are methods for modifying porous surfaces, to attain or improve their desirable properties, by addition of at least one material onto (i.e., coat) at least a portion of the porous surface. In some embodiments the porous surfaces are membrane surfaces. In certain of these embodiments, the membranes are components of electroosmotic pumps.

Membrane surfaces when immersed in water can become charged at the liquid/membrane interface by dissociation of surface attached ionizable groups or by adsorption of ions from the liquid phase. A surface thus charged attracts counterions whose concentration increases towards the liquid/membrane interface. Application of an electrical field parallel to that interface causes the mobile counterions to move towards the electrode of opposite sign and transport water molecules in that direction by viscous drag. If this condition exists within a porous medium with pores of diameter >50 and <500 nm, a significant unidirectional (electroosmotic) net flow of aqueous solution results. The surface charge density importantly influences the extent of electroosmotic flow. Appropriate modification of surfaces to enhance this charge density will increase the net flow through such porous medium. A figure of merit of the surface charge density is the zeta potential, which can be positive or negative. The electroosmotic pumping efficiency is also dependent on the composition of the fluid being pumped and the concentration of its constituents. Typically such fluid is an aqueous solution of a univalent electrolyte. Porous dielectric media in electroosmotic pumps have been primarily packed beds of silica particles, as described in "Interfacial Electrokinetics and Electrophoresis", surfactant science series, volume 106, edited by Angel V. Delgado, Marcel Dekker, 2002. Such beds are difficult and expensive to manufacture reproducibly. Moreover, silica particles are electroosmotically efficient only at pH 8±1. Their pumping efficiency decreases below pH 8, and above pH 9 silica dissolves at significant rates.

A polymeric membrane contains a multitude of interconnected pores and can serve as the porous medium in an electroosmotic pump. Such a membrane allows large flexibility in pump design and enables inexpensive pump manufacture. Membranes with high and stable zeta potentials are not commercially available. Some commercial hydrophilic membranes, sold as charge-neutral, can have stable zeta potentials of up to |30| mV [e.g. Durapore poly(vinylidene fluoride) membrane GVWP (Millipore Corp.)]. Higher zeta potentials, however, are desirable especially for portable pumps. Such pumps use small batteries, operate at low currents and employ capacitive electrodes (see US 2004/007478). Low currents extend the useful life of both the electroosmotic buffer and of the capacitive electrodes.

Membranes may be used in many applications, including, though not limited to biosensors, heparinized surfaces, facilitated transport membranes, targeted drug delivery systems including membrane-bound antigens, catalyst-containing membranes, treated surfaces, sharpened resolution chromatographic packing materials, narrow band optical absorbers, and in various water treatments which involve removal of a solute or contaminant, for example, dialysis, electrodialysis, microfiltration, ultrafiltration, reverse osmosis, nanofiltration and in electrolysis and in fuel cells and batteries. Membranes may be used in electroosmotic pumps, for example, in separation processes as selective barriers that allow some species to pass, while retaining others.

There are many supports or substrates available for use as membranes. Characteristics to be considered when selecting a substrate include, but are not limited to porosity, pore size and pore size distribution, tortuosity, surface area, permeability, solvent resistance, chemical stability, hydrophobicity/hydrophilicity, flexibility and mechanical integrity, although other characteristics may be important depending on the desired application.

Without surface modification, inherently hydrophilic membranes, such as poly(amides) (nylons) can be used in electroosmotic pumps. These polymers can be positively or negatively charged depending on the relative amount of amino or carboxylic acid groups in the polymeric chain. Often both groups are present in poly(amides), in which case the sign and magnitude of the zeta potential changes from positive to negative as the pH increases from 2 to 9, which can adversely affect the operational efficiency of an electroosmotic pump. Thus the zeta potential of surfaces with amino and/or carboxylic acid groups varies with the pH of the electroosmotic buffer solution by protonation of the amino group or by deprotonation of the carboxylic acid group as shown in the equilibrium reactions:

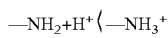

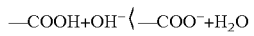

Poly(phenylene ether sulfone) membranes when cast from a blend containing poly(vinylpyrrolidone) are also hydrophilic, with the latter polymer imparting the hydrophilicity. Such membranes nominally have no surface charge, but they may exhibit zeta potentials because of ionizable structure defects.

Criteria used for determining the effectiveness of a membrane for use in electroosmotic pumps include its zeta potential (mV), its pumping efficiency (nL/μC) and the constancy of that pumping efficiency with pumping time. The zeta potential, a measure of the charge density of a surface, is given by the following relationship:

$$\zeta = \frac{Q\eta\sigma}{\epsilon I}$$

where $\zeta$ is the zeta potential (mV), Q is the flow rate (nL/min), $\eta$ is the viscosity of an aqueous solution (P), $\sigma$ is the conductivity of an aqueous solution (μS/cm), $\epsilon$ is the permittivity of water (equal to the dielectric constant of water $\epsilon_r$ multiplied by the permittivity of free space $\epsilon_o$) (F/m) and where I is current (μA). Substituting 0.0089 P for $\eta$ and 78×8.854×10$^{-12}$ F/m for $\epsilon$, the equation becomes:

$$\zeta = \frac{(2.148 \times 10^{-3})Q\sigma}{I}$$

Desirable properties of membranes to be used as components of electroosmotic pumps include, but are not limited to, some of the following:

(a) afford high (for example |≧30| mV, |≧40| mV or |≧50| mV) and stable (for example substantially constant for >1 day, >2 days, >3 days, >4 days, >5 days, >6 days or >7 days), zeta potentials;

(b) impart high pump stability (for example, zeta potentials that remain substantially constant for >1 day, for >2 days, for >3 days, for >4 days, for >5 days, for >6 days, for >7 days, of pumping);

(c) provide constant electroosmotic flow over a broad pH range;

(d) resist removal by desorption;

(e) resist electromigration;

(f) resist hydrolysis;

(g) cover the pore surface area uniformly;

(h) permit controlled reduction of membrane pore diameter;

(j) be wettable (hydrophilic) by water.

As mentioned above, the surface charge density of a membrane influences the extent of electroosmotic flow. The surface charge density (at the liquid/membrane interface) derives from either dissociation of surface attached ionizable groups and/or by adsorption of ions from the liquid phase, onto a membrane surface immersed in water. Appropriate modification of surfaces to enhance this charge density will increase the net flow through such porous medium.

Adsorption of polyelectrolytes onto membrane surfaces may afford or improve some of the desirable properties described above. (It should be noted that absorption is a physical or chemical process in which atoms, molecules, or ions enter into a bulk phase—gas, liquid or solid material, i.e. the molecules are taken up by the volume, not the surface, of the bulk phase, to form a "solution." Adsorption occurs when atoms or molecules accumulate on the surface of a solid or liquid forming a layer. The processes described herein refer to adsorption of polyelectrolytes (to provide modified surfaces).

Stable adsorbates can be obtained by judicious choice of (i) the polyelectrolyte(s) (e.g. polyelectrolyte molecular weight, polyelectrolyte end-to-end distance, nature of the polyelectrolyte, nature of the counter ion to the polyelectrolyte); (ii) certain adsorption solution parameters (e.g. concentration of the polyelectrolyte, ionic strength of polyelectrolyte solution, pH, composition of support electrolyte, concentration of support electrolyte) and (iii) certain wash solution parameters (e.g. composition, concentration, pH). Some of these factors will influence the surface architecture of the adsorbate, and thus the final properties of the modified surface. It should be noted that the surface modification can be effected by adsorption of either a single monolayer of a polyanion or a polycation or by sequential adsorption of alternating monolayers of a polycation and a polyanion, with the outermost layer being charge overcompensated.

Figure 2:
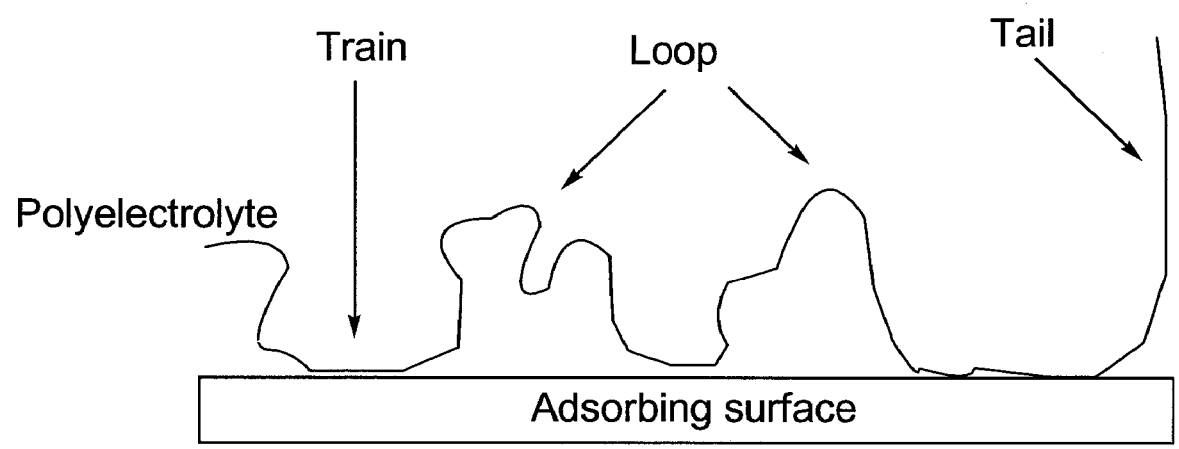
FIG. 2 presents an illustrative, non-limiting example of a schematic representation of a polyelectrolyte (in solution) in contact with a membrane surface, showing regions where the polymer is in contact with the surface (trains), connected by regions having no surface contact (loops) and having non-adsorbed chain ends (tails).
Figure 3:
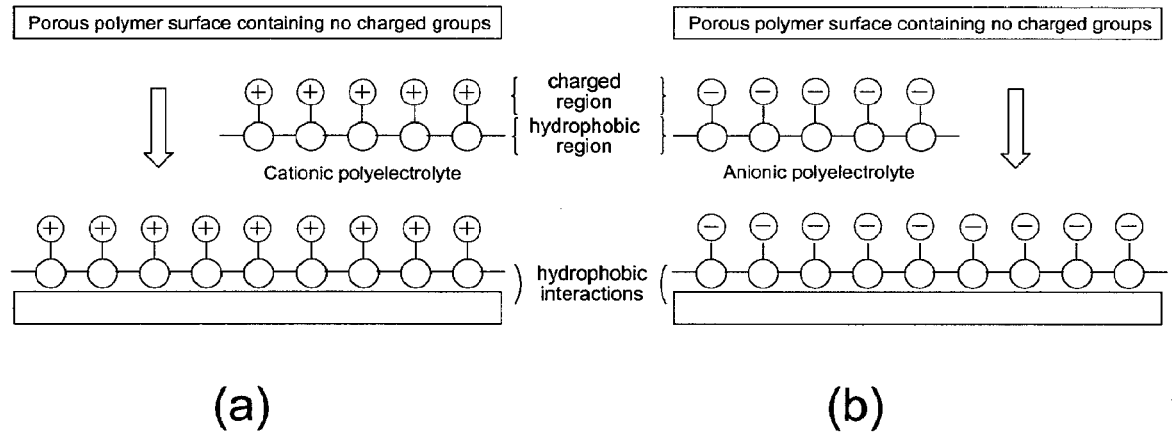
FIG. 3 presents an illustrative, non-limiting example of a method for modifying a polymeric porous membrane surface, containing no ionic surface groups, to form a monolayer, by (a) contacting with a cationic polyelectrolyte; or (b) contacting with an anionic polyelectrolyte.
Figure 4:
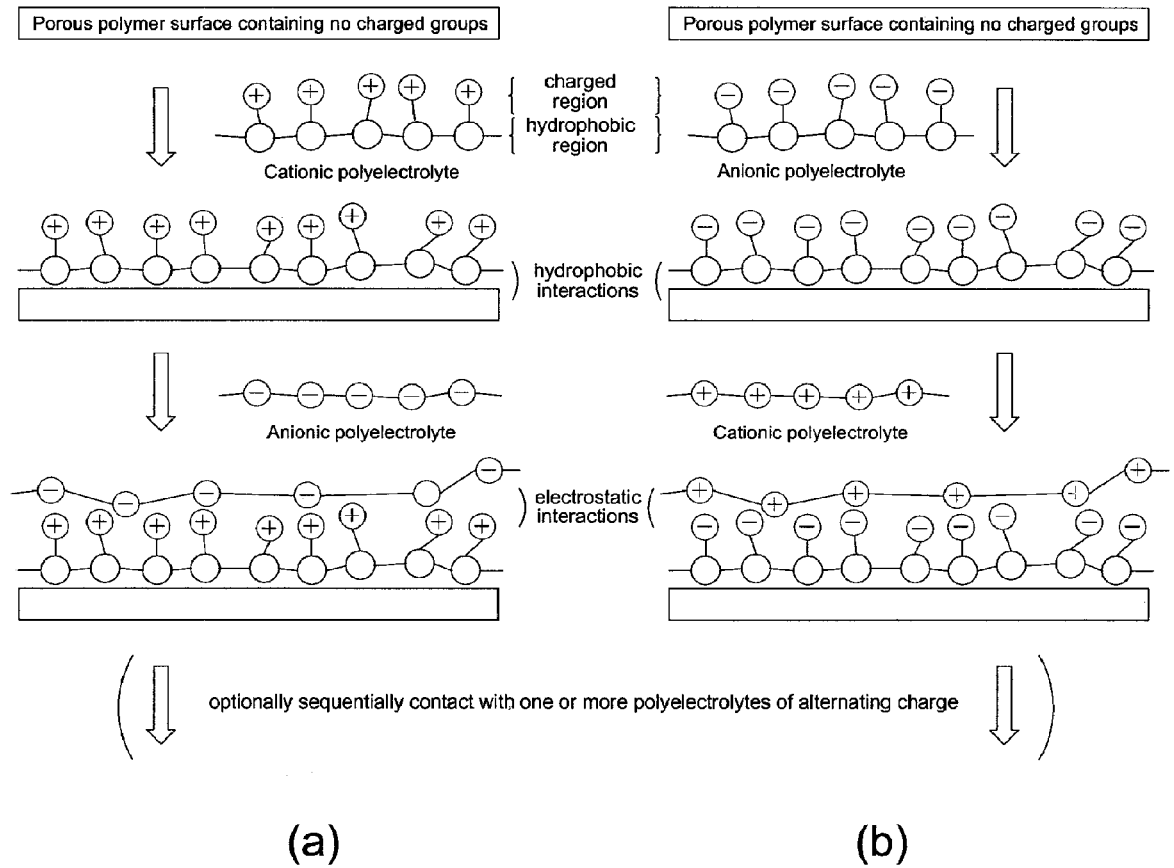
FIG. 4 presents illustrative, non-limiting examples of methods for modifying a polymeric porous membrane surface, containing no ionic surface groups, to form multilayers.
Figure 5:
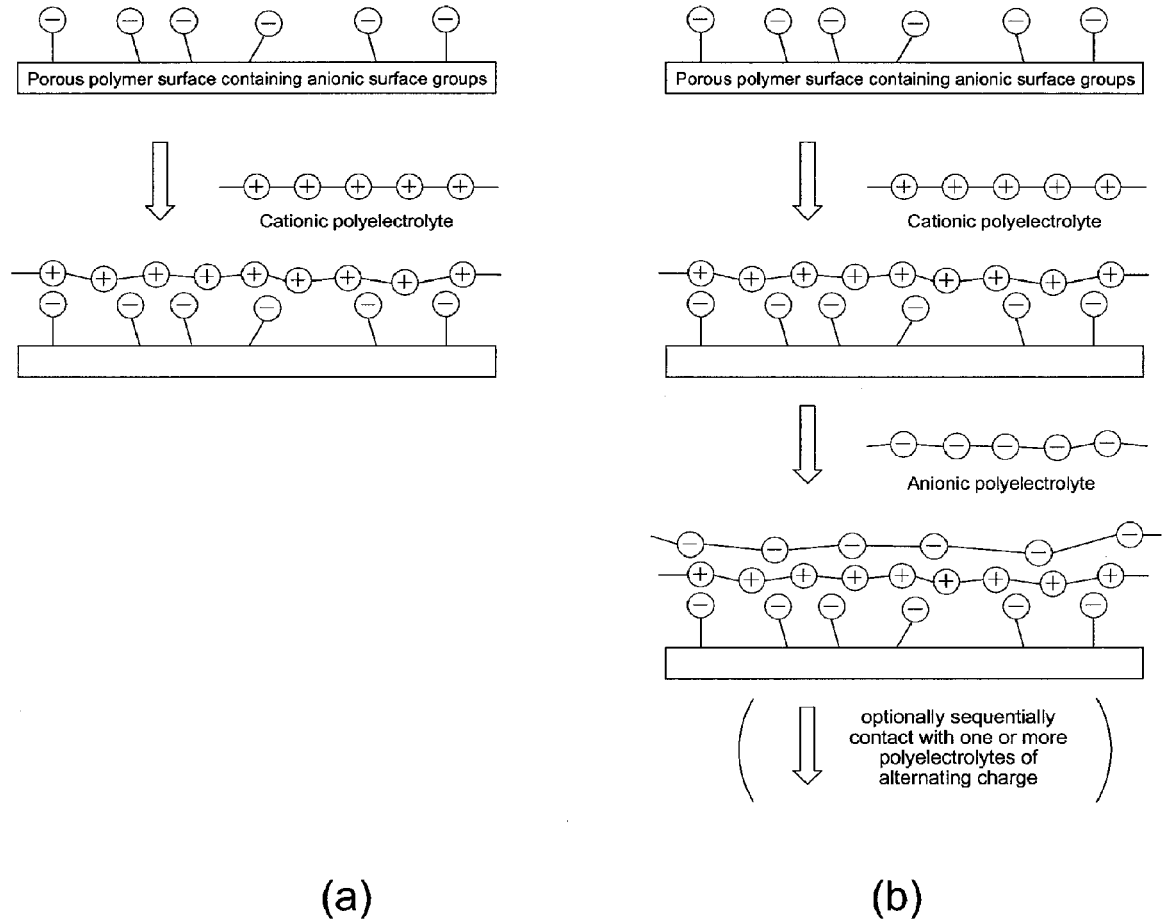
FIG. 5 presents an illustrative, non-limiting example of a method for modifying a polymeric porous membrane surface containing anionic surface groups, to form, (a) a monolayer or (b) multilayers.

If no precautions are taken, polyions generally adsorb to membrane surfaces in tail, train, and loop conformations (see FIG. 2). Tails and loops extend away from the substrate surface, while trains lie parallel to the substrate surface (Fleer et al., Polymers at Interfaces, Chapman & Hall 1993). Tails and loops do not contribute to the attachment to the substrate surface and are held there only by being covalently linked to trains, which are attached to the substrate surface. Hence, an adsorbate high in train content is thinner and flatter. Thin and flat adsorbates on porous membranes also have lower surface conductivity, which is desirable because high surface conductivity reduces the effective zeta potential. These surface architectures are affected by the structure of the polyion, the nature of its counterion, and solution parameters like pH and ionic strength. The preferred polyions are strong electrolytes that contain, for example, sulfonate or quaternary amine groups. Representative examples include, but are not limited to poly (sodium 4-styrenesulfonate) (a polyanion) and poly(diallyldimethylammonium salt) (a polycation). The anion to the latter has a more profound effect on the architecture of the adsorbate than the cation to the former. Preferred anions are carboxylates (e.g., acetate, benzoate), fluoride or sulfate that are kosmotropes in the Hofmeister series of ions. These anions give rise to thin and flat adsorbates of polyelectrolytes on membranes instead of thick and rough adsorbates that result from the use of chaotropic anions, such as bromide, chlorate or perchlorate. Such desirable counterions generally have Viscosity B Coefficient of >0 (zero) dm$^3$. mol$^{-1}$ (For a discussion see "Viscosity B-Coefficient of Ions in Solution", H. Donald et al., Chem. Rev., 1995, 95, 2695). Polyelectrolyte molecular weights of > about 100 kDa are preferred, especially for polyions used in single layer adsorbate formation, because the number of attachment points between a polyion and substrate increases with molecular weight to afford adsorbates that are more resistant towards desorption. In other embodiments, the average polyelectrolyte molecular weight is between about 50 kDa and about 1,000 kDa; in other embodiments, the average polyelectrolyte molecular weight is between about 100 kDa and about 400 kDa; in other embodiments, the average polyelectrolyte molecular weight is between about 200 kDa and about 500 kDa; in other embodiments, the average polyelectrolyte molecular weight is between about 100 kDa and about 300 kDa; in other embodiments, the average polyelectrolyte molecular weight is between about 300 kDa and about 500 kDa.

For multilayer adsorbates of alternating polycations and polyanions on membranes, charge neutralizing within the adsorbate layers occurs by macroion pair formation with only the outermost layer being charge over-compensated and charge neutralized by small counter ions. If there is a sufficiently large number of an ion pairs between two or more polyions, especially if such polyions are strong electrolytes, the resulting adsorbate is expected to resist electromigration even at high applied electric fields. Sequential adsorption of polyelectrolytes permits control of the thickness of adsorbate layers with each layer contributing from <1 to ~4 nm depending on type of polyelectrolyte used and other adsorption parameters, (see Multilayer Thin Films, Decher & Schlenoff (editors), Wiley-VCH 2003).

Further, the shape of the polyelectrolyte in solution (its conformation) can influence its conformation in the adsorbate. For the membranes described herein, an extended coil conformation or pearl-necklace as opposed to a globular one is preferred in order to maximize the number of attachment points and the flatness of the adsorbate. Attachment of the polyelectrolyte to the substrate can arise from (strong and long-range) electrostatic forces, or from (weak and short-range) Van der Waals forces, or from a combination of both. Adsorbate formation of polyelectrolytes to an uncharged (or weakly charged) surface by only Van der Waals interaction may give rise to a surface of low surface conductivity. Adsorbate formation by only (weak) Van der Waals interaction especially requires that there be many points of interaction to give an adsorbate that resists desorption. Often a combination of both electrostatic and Van der Waals forces may lead to adsorbates of high stability.

Adsorption of long chain polyelectrolytes onto surfaces of porous substrates presents constraints that are not present when polyions adsorb to more readily accessible surfaces. The end-to-end distance of a polyion depends on its molecular weight, and above a certain molecular weight that distance can exceed the diameter of the membrane pore to be surface-modified. Such polyions have to enter and then penetrate the membrane pore by reptation, (the snake-like, large-scale motion of entangled polymers; see de Gennes, Scaling Concepts in Polymer Physics, Cornell U. Press, 1979, p 223 for a more detailed description). As polyions enter the membrane pore their adsorption generally occurs faster than their transport into the pore space. This causes the walls in the entry region of the pores to become charged, creating an electrostatic barrier, which will retard subsequent entry of more polyions from the surrounding adsorption solution into the remaining pore space. This charge repulsion may reduce the uniformity and extent of adsorbate formation throughout the membrane space. To improve both, certain precautions can be taken, such as, (1) selecting an optimal molecular weight of the polyion (i.e. high enough to resist desorption and sufficiently low to allow penetration of the pore space), (2) increasing the polyion concentration in the adsorption solution, and/or (3) selecting optimal pH and ionic strength conditions that facilitate uniform penetration of the pore space by the polyions and their adsorption while still resulting in a flat adsorbate.

A strong dependence of the zeta potential on pH is undesirable in an electroosmotic pump; a membrane whose surface charge remains unchanged on varying the pH of the electroosmotic buffer solution over a broad range is preferable. For example, though not limited to, adsorbates of polyelectrolytes that contain sulfonate or quaternary amine groups meet that requirement. Both sulfonate and quaternary amines are fully dissociated over a broad pH range, which assures a constant surface charge density and zeta potential:

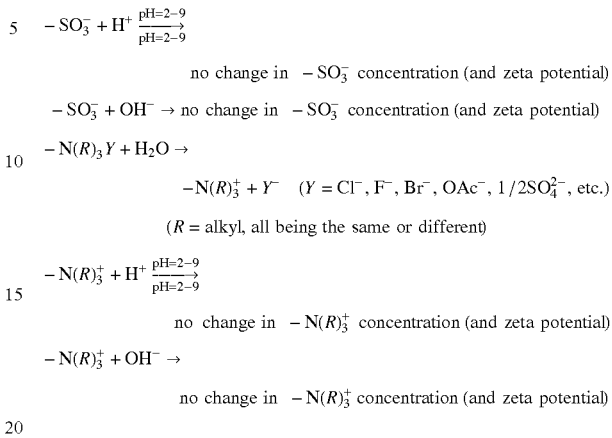

The pore diameter of a charge-modified membrane can be reduced in steps of ≧2 nm without affecting the surface charge density of the membrane or its stability (with pumping time). Thus membranes with pore diameters that afford optimal electroosmotic pumping are obtainable.

A modified polymeric membrane for use in an electroosmotic pump needs to be hydrophilic in order to be wetted by an aqueous (buffer) solution. Although hydrophobic membranes permit electroosmotic pumping if first wetted with alcohol solutions, which are subsequently replaced by aqueous solutions, this is undesirable because de-wetting of the membrane surface may occur that can cause erratic pumping action. Therefore, although membranes for electroosmotic pumping can be either naturally hydrophilic or hydrophobic, hydrophobic membranes are preferably made hydrophilic to assure reliable and sustained electroosmotic pumping. Hydrophilicity can be imparted to hydrophobic polymer membranes using membranes described herein or in the art.

Methodologies

The general method for modifying a porous polymeric surface and/or region by means of contacting with at least one polyelectrolyte, as described herein, is presented in FIG. 1. The fabricator has available a porous polymeric surface and/or region which requires modification. The porous polymeric surface and/or region may be all or part of a device or apparatus, or a component of either a device or an apparatus, or the surface and/or region may become or be incorporated into a device or apparatus. The porous polymeric surface is modified, at least in part, so that the surface region is different from the non-exposed (or bulk) portion of the porous polymer. In any case, at least a part of the porous polymeric surface is coated with at least one polyelectrolyte. Such a coating may be formed in a single step or multiple steps. The coating may occur by exposing the porous polymeric region and/or surface to one polyelectrolyte, or sequentially to a series of polyelectrolytes of alternating charge, to form the modified surface. Thus, the resulting coated region may be a partial monolayer, a complete monolayer, a partial multilayer, or it may be a multilayer, such as a bilayer, a triple layer and so forth. The polyelectrolyte(s) are physically adsorbed onto the porous polymeric surface or region, via non-covalent interactions, such as, but not limited to ionic bonding, hydrogen bonding, hydrophobic interactions, hydrophilic interactions, electrostatic interactions, Van de Waals interactions, or combinations thereof. In any case, a portion of polyelectrolyte layer(s)

interacts with the porous polymeric surface or region and at least a portion of the polyelectrolyte layer(s) is then exposed to the environment. This exposed polyelectrolyte layer may be further modified to various extents, depending upon the needs of the end user.

After contacting with a polyelectrolyte, the resulting modified surface will be charge overcompensated containing ionizable groups. Thus, by way of example only, a porous polymeric surface or region that is contacted with a cationic polyelectrolyte will result in a modified surface or region that is positively charged. Conversely, a porous polymeric surface or region that is contacted with an anionic polyelectrolyte will result in a modified surface or region that is negatively charged. The concentration of ionic charges in the charged region and/or layer may range from a low concentration to a high concentration; further, the local charge density may vary; further, the charged region and/or layer may, and most likely will, comprise non-charged moieties. The modified surface or region may optionally be contacted with a second polyelectrolyte of opposite charge to the first polyelectrolyte. This will result in a newly modified surface or region that will be electrically charged, with an opposite polarity. Thus, by way of example only, a porous polymeric surface or region that is first contacted with a cationic polyelectrolyte, and subsequently contacted with an anionic polyelectrolyte will result in a modified surface or region that is negatively charged. Conversely, a porous polymeric surface or region that is first contacted with an anionic polyelectrolyte, and subsequently contacted with a cationic polyelectrolyte will result in a modified surface or region that is positively charged. The porous polymeric surface or region may be sequentially contacted with polyelectrolytes, of alternating charge, thus each time resulting in a modified surface of similarly alternating charge.

The thickness of the modified region and/or layer should be uniform. That is to say, the thickness of each polyelectrolyte layer in a given region should vary by less than 100%, or by less than 90%, or by less than 80%, or by less than 70%, or by less than 60%, or by less than 50%, or by less than 40%, or by less than 30%, or by less than 20%, or by less than 10% in thickness. The thickness of any one polyelectrolyte layer may be the same as, substantially the same as or different to the thickness of any other polyelectrolyte layers. Sequential adsorption of polyelectrolytes permits control of the thickness of adsorbate layers with each layer contributing from about 1 to about 4 nm (depending on type of polyelectrolyte used and other adsorption parameters). Thus, the pore diameter of a modified membrane can be reduced in steps of $\geq 2$ nm.

The stability and wettability of the modified surface is derived in part from the number, type and strength of the interactions between the porous polymeric surface and the polyelectrolyte layer(s). It will also be dependant on several other factors, including, but not limited to the choice of polyelectrolyte (s) (e.g. polyelectrolyte molecular weight, polyelectrolyte end-to-end distance, nature of the polyelectrolyte, nature of the counter ion to the polyelectrolyte), the contacting conditions, including time and temperature of exposure, certain adsorption solution parameters (e.g. concentration of the polyelectrolyte, pH, composition of support electrolytes, concentration of support electrolytes) and certain wash solution parameters (e.g. composition, concentration, pH), variations in the microscopic surface of the porous polymeric surface, random fluctuations in the coating process, or may result from the designs of the fabricator.

For the sake of simplicity, the combination of a porous polymeric surface with at least one polyelectrolyte physically adsorbed thereon will be referred to as the "modified surface," although additional regions and/or layers may be added onto (at least partially) the modified surface.

Although not required for stability, further stability may be imparted to the modified surface by treating the modified surface, by means of heating, chemical reaction, (i.e. crosslinking), photochemical activation, or any other means or combination of means of treating a modified surface that is known in the art. In addition, such a treatment step may also occur by applying an additional region(s) and/or layer(s) onto or in (at least in part) the modified surface, followed (if necessary) by any of the activation methods just described. The treatment need not be uniform over the entire surface, nor does it have to cover the entire surface. Such non-uniformity of the treated region and/or layer may result from random fluctuations of the coating process or by conscious design of the fabricator or other person(s).

The treatment step need not immediately follow the formation of the modified surface process; for example additional changes to the modified surface may occur, or additional changes may occur on other portions of the device or apparatus of which the modified surface is a component, portion or feature. In addition, further changes may occur to the modified surface even after the treatment step if the modified surface is otherwise accessible to chemical and/or biological agents, light, ions, ionizing radiation, heat, ion exchange (e.g., the solubility of salicylate counterions are too low to be effectively used when adsorbing polycation polyelectrolytes, however, acetate counterions can be adsorbed with polycation polyelectrolytes and then ion exchanged off by salicylate counterions) (or other means of activation or changing a modified surface. Examples of chemical and/or biological agents include, by way of example only, fluorophores, antibodies, peptides, ligands, catalysts, reactive groups, oligonucleotides and oligonucleosides, oligosaccharides, electron donors and electron acceptors, or a combination of such chemical agents. In addition, the treated region and/or layer may undergo further processing or modification, or the device or apparatus of which the modified surface is a component, portion or feature may undergo further processing, manipulation or modification until the final device or apparatus is made.

As an additional option, the unfinished or finished device or apparatus of which the modified surface is a component, portion or feature may be appropriately stored until further needed. Preferably, such a storage step (or even storage steps) will not result in degradation of the modified surface: proper storage conditions may involve control of temperature, humidity, atmosphere, or other components that may impact degradation of the modified surface. Further, the unfinished or finished device or apparatus of which the modified surface is a component, portion or feature may be stored wet, or dry. In some embodiments, the surface modified membrane will be a component in a device in contact with an electrolyte solution while being sterilized, followed by storage and eventual use. Sterilization and subsequent storage should not alter the membrane's zeta potential and its stability under use conditions.

Finally, when needed, the device or apparatus of which the modified surface is a component, portion or feature may be used by the end user. Components, portions or features of a device or apparatus that may be coated as described herein include for example membranes for electroosmotic pumps. Preferably, the stability of the modified surface is sufficient to allow prolonged use of the device or apparatus. Also, the stability of the modified surface may be sufficient to allow more than one use of the device or apparatus, depending on the length of time for each usage. Furthermore, different components, features, or portions of a device or apparatus can have similar or different types of coatings, depending upon the needs of the user. The methods and coatings described herein are flexible enough to allow both the customization and the mass-production of a desired device or apparatus.

FIGS. 2-5 show various schematic embodiments of the methods and compositions described herein. They represent various possible configurations for at least a portion of a polymeric microporous membrane (any part of which may be modified or unmodified) that has been modified by contacting with at least one polyelectrolyte (any of which may be in part modified, functionalized, and/or unmodified). Various methods for achieving such modifications, as well as the characteristics of such modified surfaces are described herein.

Figure 23:
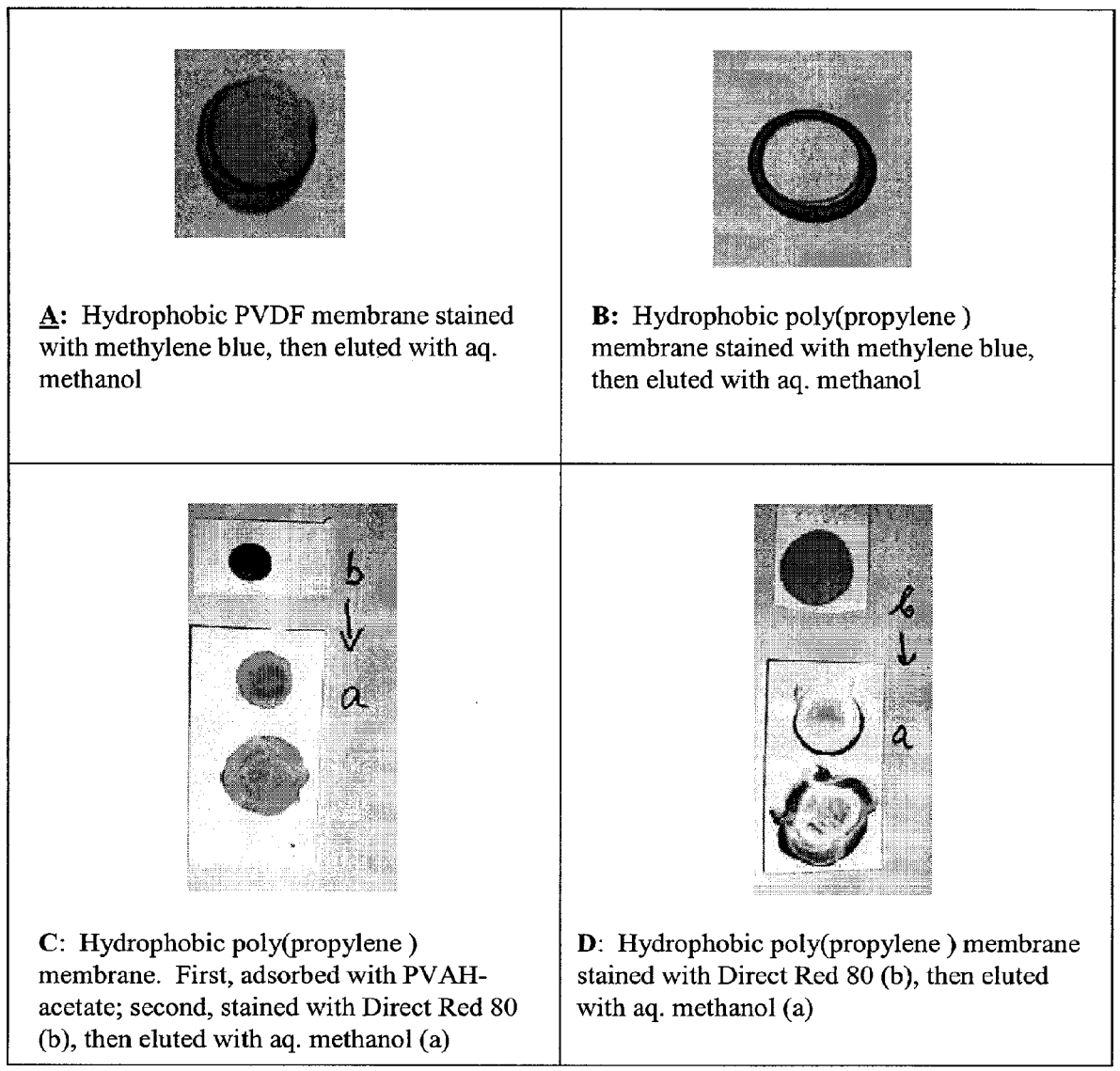
FIG. 23 shows illustrative, non-limiting examples of methylene blue stained samples of hydrophobic PVDF (A) and hydrophobic polypropylene (B); and Direct Red 80 stained samples of polypropylene with (C) and without (D) PVAH adsorbed. After dye staining, droplets of aqueous methanol were added to the stains to cause elution of the dyes.

FIG. 3(a), presents a schematic representation of a method for modifying a porous polymeric surface, containing no ionic surface groups, (i.e. is charge neutral) to form a monolayer, by contacting with a cationic polyelectrolyte to form a positively charge-modified surface. The unmodified porous polymeric membrane has an average pore diameter of from about 100 nm to about 500 nm (and in further embodiments from about 100 to about 300 nm, and in other embodiments from about 100 nm to about 200 nm) and a zeta potential of |20-40| mV. The zeta potential of the membrane surface can also be zero mV. (e.g., an unmodified polypropylene membrane that does not adsorb methylene blue or direct red 80 (indicting such a membrane surface is ~ charge neutral); however, after adsorbing a polycation onto the polypropylene membrane, direct red 80 (an anionic dye) was strongly adsorbed as shown in FIG. 23 and described in Example 23.) The low molecular weight counterion to the high molecular weight polyelectrolyte ion preferably has a Jones Dole viscosity coefficient of >0 (zero) $dm^3$ $mol^{-1}$, and the ionic strength of the adsorption solutions should be adjusted with support electrolyte to the range of 0 (zero) and <500 mM. Such adjustments will favor the formation of flat (not rough) and coherent adsorbate with low surface conductivity. The polyelectrolyte is physically adsorbed onto the polymeric porous membrane surface via hydrophobic interactions, and the resulting modified surface has a zeta potential of |≧50| mV. An analogous procedure may be used for any smaller portion of the surface or for any other forms of surfaces, including recessed, curved, twisted or other possible configurations, including the inner surface or outer surface of a tube, channel or chamber. All that is required is the desired polyelectrolytes can access by some means (including pressure, percolation and diffusion) the desired surface or region. Various methods exist in the art for coating portions of a surface, including the use of masks. The cationic polyelectrolyte is comprised of a hydrophobic portion and positively charged polar or ionic groups. The hydrophobic portion forms non-covalent interactions with the charge-neutral, hydrophobic surface; the polar or ionic groups may also interact with the hydrophobic surface, however, the predominant (at the least, the plurality of interactions) is an attractive interaction between the hydrophobic components of the cationic polyelectrolyte and the charge-neutral, hydrophobic surface. Ionic surfactants, preferably with two or more long hydrophobic chains covalently linked to the polar site, can be used in place of a polyelectrolyte. While many methods are available for contacting the polyelectrolyte with the porous polymeric surface, (e.g. spin coating, techniques involving aerosols), the preferred method involves simply exposing the porous polymeric surface to a solution of the polyelectrolyte. In particularly preferred embodiments, the polyelectrolyte is in an aqueous solution. The method of simply exposing the porous polymeric surface to a solution of the polyelectrolyte allows for molecular organization of the charged polyelectrolyte as it interacts with the porous polymeric surface. Furthermore, these aforementioned deposition methods can be undertaken at room temperature, or elevated temperature. An additional rinsing step may be utilized to remove excess polyelectrolyte or other materials. A drying step (accomplished by heat, vacuum, use of drying agents or any combination of these procedures) may also be included to remove excess solvent or other materials from the modified surface.

FIG. 3(b), presents a schematic representation of a method for modifying a porous polymeric surface, containing no ionic surface groups, (i.e. is charge neutral) to form a monolayer, by contacting with an anionic polyelectrolyte to form a negatively charged modified surface. The unmodified porous polymeric surface has an average pore diameter of from about 100 nm to about 500 nm (and in further embodiments from about 100 to about 300 nm, and in other embodiments from about 100 nm to about 200 nm). The polyelectrolyte is physically adsorbed onto the polymeric porous membrane surface via hydrophobic interactions, and the resulting modified surface has a zeta potential of |≧50| mV. An analogous procedure may be used for any smaller portion of the surface or for any other forms of surfaces, including recessed, curved, twisted or other possible configurations, including the inner surface or outer surface of a tube, channel or chamber. All that is required is the desired polyelectrolytes can access by some means (including pressure, percolation and diffusion) the desired surface or region. Various methods exist in the art for coating portions of a surface, including the use of masks. The anionic polyelectrolyte is comprised of a hydrophobic portion and negatively charged polar or ionic groups. The hydrophobic portion forms non-covalent interactions with the charge-neutral, hydrophobic surface; the polar or ionic groups may also interact with the hydrophobic surface, however, the predominant (at the least, the plurality of interactions) is an attractive interaction between the hydrophobic components of the anionic polyelectrolyte and the charge-neutral, hydrophobic surface. While many methods are available for contacting the polyelectrolyte with the porous polymeric surface, (e.g. spin coating, techniques involving aerosols, and application of the pure polyelectrolyte onto the surface), the preferred method involves simply exposing the polymeric membrane surface to a solution of the polyelectrolyte. In particularly preferred embodiments, the polyelectrolyte is in an aqueous solution. The method of simply exposing the porous polymeric surface to a solution of the polyelectrolyte allows for molecular organization of the charged polyelectrolyte as it interacts with the porous polymeric surface. Furthermore, these aforementioned deposition methods can be undertaken at room temperature, or elevated temperature. An additional rinsing step may be utilized to remove excess polyelectrolyte or other materials. A drying step (accomplished by heat, vacuum, use of drying agents or any combination of these procedures) may also be included to remove excess solvent or other materials from the modified surface.

FIG. 4(a), presents a schematic representation of a method for modifying the surface of a porous polymeric surface, containing no ionic surface groups, (i.e. is charge neutral) to form multilayers, by sequentially contacting the porous surface with (i) a cationic polyelectrolyte to form a positively charged modified surface, followed by (ii) an anionic polyelectrolyte, optionally followed by (iii) additional polyelectrolytes of alternating charge (i.e. polycation-polyanion-polycation, etc). The unmodified porous polymeric substrate has an average pore diameter of from about 100 nm to about 500 nm (and in further embodiments from about 100 to about 300 nm, and in other embodiments from about 100 nm to about 200 nm). The cationic polyelectrolyte is physically adsorbed onto the polymeric porous membrane surface via hydrophobic interactions, while the subsequent anionic polyelectrolyte is physically adsorbed via electrostatic interactions. The low molecular weight counterion to the high molecular weight polyelectrolyte ion should preferably have a Jones Dole viscosity coefficient of >0 (zero) dm$^3$ mol$^{-1}$, and the ionic strength of the adsorption solutions should be adjusted with support electrolyte to the range of 0 (zero) to <500 mM. Such adjustments will favor the formation of flat (not rough) and coherent adsorbate with low surface conductivity. In an alternating fashion, this adsorption sequence can be continued with polycations, polyanions, and so on. The final, resulting modified surface has a zeta potential of |≧50| mV. An analogous procedure may be used for any smaller portion of the surface or for any other forms of surfaces, including recessed, curved, twisted or other possible configurations, including the inner surface or outer surface of a tube, channel or chamber. All that is required is the desired polyelectrolytes can access by some means (including pressure, percolation and diffusion) the desired surface or region. Various methods exist in the art for coating portions of a surface, including the use of masks. The first, or priming, adsorbate on a hydrophobic substrate can also consist of a cationic or anionic surfactant. Such surfactant is comprised of a hydrophobic portion and a charged polar or ionic group. The hydrophobic portion forms non-covalent interactions with the charge-neutral, hydrophobic substrate surface; the polar or ionic groups may also interact with the hydrophobic surface, however, the predominant (at the least, the plurality of interactions) is an attractive interaction between the hydrophobic components of the ionic surfactant and the charge-neutral, hydrophobic surface. The positively charged polar or ionic groups of the adsorbed surfactant bond electrostatically to an anionic polyelectrolyte to which they are exposed. The hydrophobic portion of the priming cationic surfactant may also interact with the subsequent anionic polyelectrolyte layer; however, the predominant (at the least, the plurality of interactions) is an electrostatic interaction between the positively charged groups of the cationic priming adsorbate and the negatively charged groups of the anionic polyelectrolyte. While many methods are available for contacting the polyelectrolytes with the porous polymeric surface, (e.g. spin coating, techniques involving aerosols), the preferred method involves simply exposing the porous polymeric surface to a solution of the polyelectrolyte. In particularly preferred embodiments, the polyelectrolyte is in an aqueous solution. The method of simply exposing the porous polymeric surface to a solution of the polyelectrolyte further allows for molecular organization of the charged polyelectrolyte as it interacts with the porous polymeric surface. Furthermore, these aforementioned deposition methods can be undertaken at room temperature, or elevated temperature. A rinsing step (or steps) and/or a drying step (or steps) may be utilized in between any or all of the contacting steps involving the polyelectrolytes, to remove excess polyelectrolyte, excess solvent or other materials counteranion in the polyelectrolyte poly(diallyldimethylammonium sulfate) affords an adsorbate with a high zeta potential only after all of the sulfate ions in the adsorbate have been exchanged by acetate ions). A final rinsing step may be utilized to remove excess polyelectrolyte or other materials. A final drying step (accomplished by heat, vacuum, use of drying agents or any combination of these procedures) may also be included to remove excess solvent or other materials from the modified surface.

FIG. 4(b), presents a schematic representation of a method for modifying a porous polymeric surface, containing no ionic surface groups, (i.e. is charge neutral) to form multilayers, by sequentially contacting the porous surface with (i) an anionic and hydrophobic polyelectrolyte to form a negatively charged modified surface, followed by (ii) a cationic polyelectrolyte, optionally followed by (iii) additional polyelectrolytes of alternating charge (i.e. polyanion-polycation-polyanion, etc). The unmodified porous polymeric surface has an average pore diameter of from about 100 nm to about 500 nm (and in further embodiments from about 100 to about 300 nm, and in other embodiments from about 100 nm to about 200 nm). The hydrophobic polyelectrolyte is physically adsorbed onto the polymeric porous membrane surface via hydrophobic interactions, while the subsequent polyelectrolyte(s) are physically adsorbed via electrostatic interactions. The low molecular weight counterion to the high molecular weight polyelectrolyte ion preferably has a Jones Dole viscosity coefficient of >0 (zero) dm$^3$ mol$^{-1}$, and the ionic strength of the adsorption solutions should be adjusted with support electrolyte to the range of 0 (zero) to <500 mM. Such adjustments will favor the formation of flat (not rough) and coherent adsorbate with low surface conductivity. The final, resulting modified surface has a zeta potential of |≧50| mV. An analogous procedure may be used for any smaller portion of the surface or for any other forms of surfaces, including recessed, curved, twisted or other possible configurations, including the inner surface or outer surface of a tube, channel or chamber. All that is required is the desired priming polyelectrolyte (or ionic surfactant) and subsequent polyelectrolytes can access by some means (including pressure, percolation and diffusion) the desired surface or region. Various methods exist in the art for coating portions of a surface, including the use of masks. The anionic polyelectrolyte is comprised of a hydrophobic portion and negatively charged polar or ionic groups. The hydrophobic portion forms non-covalent interactions with the charge-neutral, hydrophobic surface; the polar or ionic groups may also interact with the hydrophobic surface, however, the predominant (at the least, the plurality of interactions) is an attractive interaction between the hydrophobic components of the cationic polyelectrolyte and the charge-neutral, hydrophobic surface. The negatively charged polar or ionic groups of the anionic surfactant (or polyelectrolyte) form electrostatic interactions with the cationic polyelectrolyte. The hydrophobic portion of the anionic polyelectrolyte (or surfactant) may also interact with the subsequent cationic polyelectrolyte layer; however, the predominant (at the least, the plurality of interactions) is an electrostatic interaction between the negatively charged groups of the anionic priming adsorbate and the positively charged groups of the subsequent cationic polyelectrolyte adsorbate. While many methods are available for contacting the polyelectrolytes with the porous polymeric surface, (e.g. spin coating, techniques involving aerosols), the preferred method involves simply exposing the porous polymeric surface to a solution of the polyelectrolyte. In particularly preferred embodiments, the polyelectrolyte is in an aqueous solution. The method of simply exposing the porous polymeric surface to a solution of the polyelectrolyte further allows for molecular organization by self assembly, of the charged polyelectrolyte as it interacts with the porous polymeric surface. Furthermore, these aforementioned deposition methods can be undertaken at room temperature, or elevated temperature. A rinsing step (or steps) and/or a drying step (or steps) may be utilized in between any or all of the contacting steps involving the polyelectrolytes, to remove excess polyelectrolyte, excess solvent or other materials from the intermediate modified surface. A final rinsing step may be utilized to remove excess polyelectrolyte or other materials. A final drying step (accomplished by heat, vacuum, use of drying agents or any combination of these procedures) may also be included to remove excess solvent or other materials from the modified surface.

FIG. 5(a) presents a schematic representation of a method for modifying the surface of a porous polymeric substrate, that is hydrophobic and contains anionic surface groups, (i.e. is negatively charged) to form a monolayer, by contacting with a cationic polyelectrolyte to form a positively charged modified surface. The unmodified porous polymeric substrate has an average pore diameter of from about 100 nm to about 500 nm (and in further embodiments from about 100 to about 300 nm, and in other embodiments from about 100 nm to about 200 nm) and a zeta potential of |20-40| mV. The polyelectrolyte is physically adsorbed onto the polymeric porous membrane surface via electrostatic interactions, and the resulting modified surface has a zeta potential of $|\geqq 50|$ mV. The low molecular weight counterion to the high molecular weight polyelectrolyte ion preferably has a Jones Dole viscosity coefficient of >0 (zero) $dm^3$ $mol^{-1}$, and the ionic strength of the adsorption solutions should be adjusted with support electrolyte to the range of 0 (zero) and <500 mM. Such adjustments will favor the formation of flat (not rough) and coherent adsorbate with low surface conductivity. An analogous procedure may be used for any smaller portion of the surface or for any other forms of surfaces, including recessed, curved, twisted or other possible configurations, including the inner surface or outer surface of a tube, channel or chamber. All that is required is the desired polyelectrolyte can access by some means (including pressure, percolation and diffusion) the desired surface or region. Various methods exist in the art for coating portions of a surface, including the use of masks. The polyelectrolyte comprises charged polar or ionic groups which form non-covalent, electrostatic interactions with the charged polymeric surface; any surface hydrophobic groups may also interact with the polyelectrolyte, however, the predominant (at the least, the plurality of interactions) is an electrostatic interaction between the polar components of the polyelectrolyte and the charged surface. While many methods are available for contacting the polyelectrolyte with the porous polymeric surface, (e.g. spin coating, techniques involving aerosols), the preferred method involves simply exposing the porous polymeric surface to a polyelectrolyte. In particularly preferred embodiments, the polyelectrolyte is in an aqueous solution. The method of simply exposing the porous polymeric surface to a solution of the polyelectrolyte allows for molecular organization by self-assembly of the charged polyelectrolyte as it interacts with the porous polymeric surface. Furthermore, these aforementioned deposition methods can be undertaken at room temperature, or elevated temperature. An additional rinsing step may be utilized to remove excess polyelectrolyte or other materials. A drying step (accomplished by heat, vacuum, use of drying agents or any combination of these procedures) may also be included to remove excess solvent or other materials from the modified surface.

FIG. 5(b), presents a schematic representation of a method for modifying the surface of a porous polymeric substrate that is hydrophilic and contains anionic surface groups, (i.e. is negatively charged) to form a monolayer, by contacting with a cationic polyelectrolyte to form a positively charged modified surface. The unmodified porous polymeric substrate has an average pore diameter of from about 100 nm to about 500 nm (and in further embodiments from about 100 to about 300 nm, and in other embodiments from about 100 nm to about 200 nm) and a zeta potential of |20-25| mV. The polyelectrolyte is physically adsorbed onto the polymeric porous membrane surface via electrostatic interactions, and the resulting modified surface is hydrophilic and has a zeta potential of $|\geqq 50|$ mV. The low molecular weight counterion to the high molecular weight polyelectrolyte ion preferably has a Jones Dole viscosity coefficient of >0 (zero) $dm^3$ $mol^{-1}$, and the ionic strength of the adsorption solutions should be adjusted with support electrolyte to the range of 0 (zero) to <500 mM. Such adjustments will favor the formation of flat (not rough) and coherent adsorbate with low surface conductivity. An analogous procedure may be used for any smaller portion of the surface or for any other forms of surfaces, including recessed, curved, twisted or other possible configurations, including the inner surface or outer surface of a tube, channel or chamber. All that is required is that the desired polyelectrolyte can access by some means (including pressure, percolation and diffusion) the desired surface or region. Various methods exist in the art for coating portions of a surface, including the use of masks. The polyelectrolyte comprises charged polar or ionic groups which form non-covalent, electrostatic interactions with the charged polymeric surface; any surface hydrophobic groups may also interact with the polyelectrolyte, however, the predominant (at the least, the plurality of interactions) is an electrostatic interaction between the polar components of the polyelectrolyte and the charged surface. While many methods are available for contacting the polyelectrolyte with the porous polymeric surface, (e.g. spin coating, techniques involving aerosols), the preferred method involves simply exposing the porous polymeric surface to a solution of the polyelectrolyte. In particularly preferred embodiments, the polyelectrolyte is in an aqueous solution. The method of simply exposing the porous polymeric surface to a solution of the polyelectrolyte allows for molecular organization by self assembly of the charged polyelectrolyte as it interacts with the porous polymeric surface. Furthermore, these aforementioned deposition methods can be undertaken at room temperature, or elevated temperature. An additional rinsing step may be utilized to remove excess polyelectrolyte or other materials. A drying step (accomplished by heat, vacuum, use of drying agents or any combination of these procedures) may also be included to remove excess solvent or other materials from the modified surface.

Figure 6:
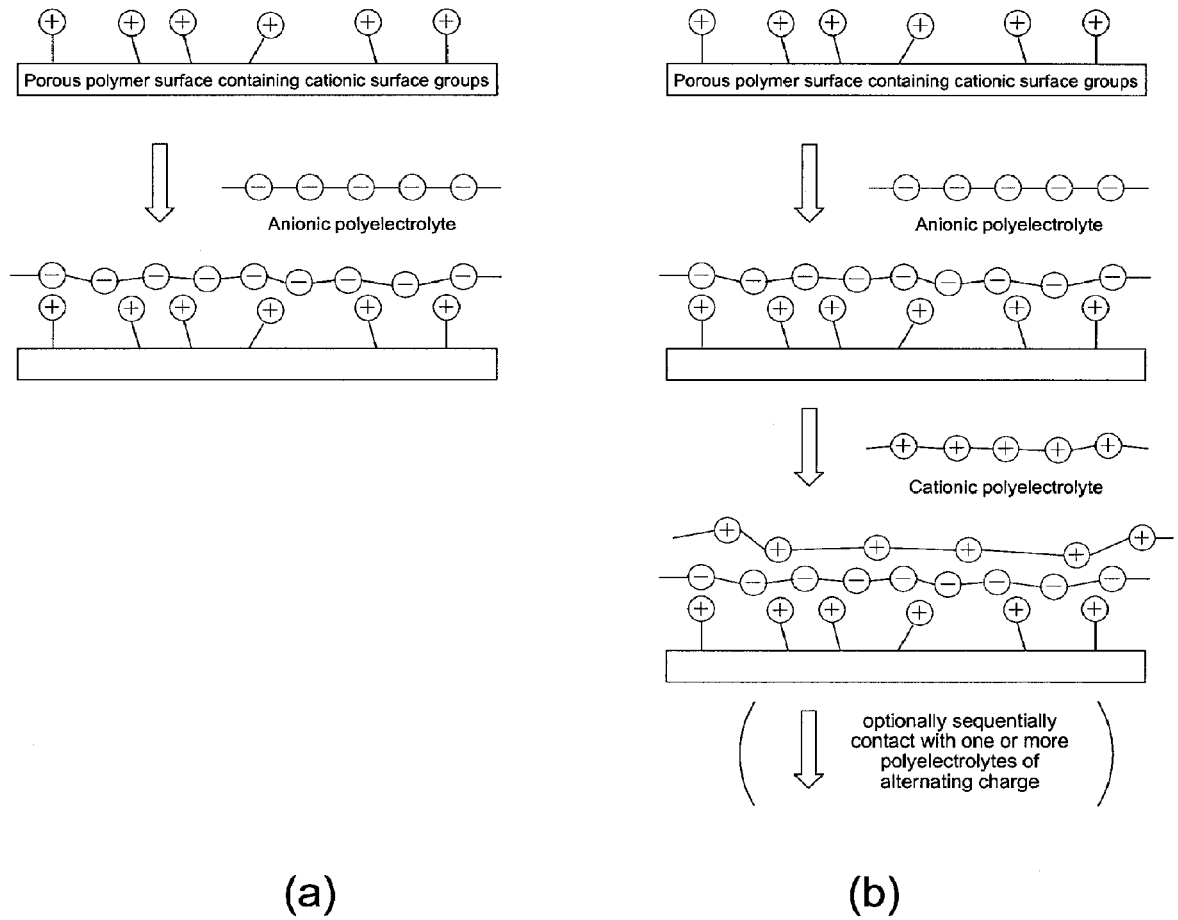
FIG. 6 presents an illustrative, non-limiting example of a method for modifying a polymeric porous membrane surface containing cationic surface groups, to form, (a) a monolayer or (b) multilayers.
Figure 7:
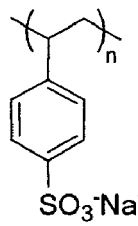
FIG. 7 presents the structures, names and abbreviations of non-limiting examples of polyelectrolytes that may be used to coat membranes.
Figure 7:
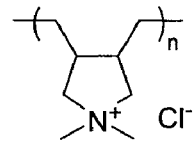
Figure 7:
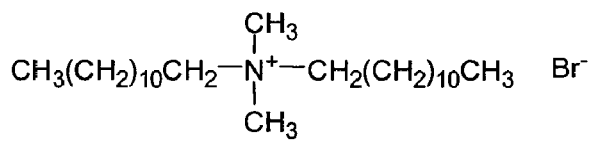
Figure 7:
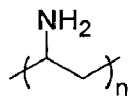
Figure 7:
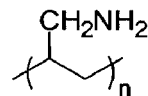

FIG. 6(a), presents a schematic representation of a method for modifying a porous polymeric surface, that is hydrophilic and contains cationic surface groups, (i.e. is positively charged) to form a monolayer adsorbate, by contacting with an anionic polyelectrolyte. The unmodified porous polymeric substrate has an average pore diameter of from about 100 nm to about 500 nm (and in further embodiments from about 100 to about 300 nm, and in other embodiments from about 100 nm to about 200 nm) and a zeta potential of |20-25| mV. The low molecular weight counterion to the high molecular weight polyelectrolyte ion preferably has a Jones Dole viscosity coefficient of >0 (zero) $dm^3$ $mol^{-1}$, and the ionic strength of the adsorption solutions should be adjusted with support electrolyte to the range of 0 (zero) to <500 mM. Such adjustments will favor the formation of flat (not rough) and coherent adsorbate with low surface conductivity. The polyelectrolyte is physically adsorbed onto the polymeric porous membrane surface via electrostatic interactions, and the resulting modified surface has a zeta potential of $|\geqq 50|$ mV. An analogous procedure may be used for any smaller portion of the surface or for any other forms of surfaces, including recessed, curved, twisted or other possible configurations, including the inner surface or outer surface of a tube, channel or chamber. All that is required is the desired polyelectrolyte can access by some means (including pressure, percolation and diffusion) the desired surface or region. Various methods exist in the art for coating portions of a surface, including the use of masks. The polyelectrolyte comprises charged polar or ionic groups which form non-covalent, electrostatic interactions with the charged polymeric surface; any surface hydrophobic groups may also interact with the polyelectrolyte, however, the predominant (at the least, the plurality of interactions) is an electrostatic interaction between the polar components of the polyelectrolyte and the charged surface. While many methods are available for contacting the polyelectrolyte with the porous polymeric surface, (e.g. spin coating, techniques involving aerosols), the preferred method involves simply exposing the porous polymeric surface to a solution of the polyelectrolyte. In particularly preferred embodiments, the polyelectrolyte is in an aqueous solution. The method of simply exposing the porous polymeric surface to a solution of the polyelectrolyte allows for molecular organization by self assembly of the charged polyelectrolyte as it interacts with the porous polymeric surface. Furthermore, these aforementioned deposition methods can be undertaken at room temperature, or elevated temperature. A rinsing step (or steps) and/or a drying step (or steps) may be utilized in between any or all of the contacting steps involving the polyelectrolytes, to remove excess polyelectrolyte, excess solvent or other materials from the intermediate modified surface. A final rinsing step may be utilized to remove excess polyelectrolyte or other materials. A final drying step (accomplished by heat, vacuum, use of drying agents or any combination of these procedures) may also be included to remove excess solvent or other materials from the modified surface.

FIG. 6(b) presents a schematic representation of a method for modifying a hydrophilic porous polymeric surface, containing cationic surface groups, (i.e. is positively charged) to form multilayers, by sequentially contacting with (i) an anionic polyelectrolyte, (ii) a cationic polyelectrolyte, optionally followed by (iii) additional polyelectrolytes of alternating charge (i.e. polyanion-polycation-polyanion, etc). The unmodified porous polymeric substrate has an average pore diameter of from about 100 nm to about 500 nm (and in further embodiments from about 100 to about 300 nm, and in other embodiments from about 100 nm to about 200 nm) and a zeta potential of |20-25| mV. The low molecular weight counterion to the high molecular weight polyelectrolyte ion preferably has a Jones Dole viscosity coefficient of >0 (zero) $dm^3\ mol^{-1}$, and the ionic strength of the adsorption solutions should be adjusted with support electrolyte to the range of 0 (zero) to <500 mM. Such adjustments will favor the formation of flat (not rough) and coherent adsorbate with low surface conductivity. The polyelectrolytes are physically adsorbed onto the polymeric porous membrane surface via electrostatic interactions, and the resulting modified surface has a zeta potential of |≧50| mV. An analogous procedure may be used for any smaller portion of the surface or for any other forms of surfaces, including recessed, curved, twisted or other possible configurations, including the inner surface or outer surface of a tube, channel or chamber. All that is required is the desired polyelectrolyte can access by some means (including pressure, percolation and diffusion) the desired surface or region. Various methods exist in the art for coating portions of a surface, including the use of masks. The polyelectrolyte comprises charged polar or ionic groups which form non-covalent, electrostatic interactions with the charged polymeric surface; any surface hydrophobic groups may also interact with the polyelectrolyte, however, the predominant (at the least, the plurality of interactions) is an electrostatic interaction between the polar components of the polyelectrolyte and the charged surface. While many methods are available for contacting the polyelectrolyte with the porous polymeric surface, (e.g. spin coating, techniques involving aerosols, and application of the pure polyelectrolyte solution onto the surface), the preferred method involves simply exposing the porous polymeric surface to a solution of the polyelectrolyte. In particularly preferred embodiments, the polyelectrolyte is in an aqueous solution. The method of simply exposing the porous polymeric surface to a solution of the polyelectrolyte allows for molecular organization of the charged polyelectrolyte as it interacts with the porous polymeric surface. Furthermore, these aforementioned deposition methods can be undertaken at room temperature, or elevated temperature. A rinsing step (or steps) and/or a drying step (or steps) may be utilized in between any or all of the contacting steps involving the polyelectrolytes, to remove excess polyelectrolyte, excess solvent or other materials from the intermediate modified surface. A final rinsing step may be utilized to remove excess polyelectrolyte or other materials. A final drying step (accomplished by heat, vacuum, use of drying agents or any combination of these procedures) may also be included to remove excess solvent or other materials from the modified surface.

It should be noted that rinsing an adsorbate with pure water may remove the shielding properties of low molecular weight support electrolyte from the aqueous medium between the adsorbed macroions. Thus, the adsorbed macroions will experience an increased repulsion force, which can lead to desorption of the macroions thereby reducing the coherency of the adsorbate, its mechanical integrity and zeta potential; washing with pure water may even lead to the formation of islands of adsorbate surrounded by bare substrate. Rinsing the adsorbate with an aqueous solution of low mol weight electrolyte (ionic strength in the range 10 mM-500 mM) minimizes that complication. The modified surfaces described herein may be unwashed, washed with pure water, washed with an aqueous solution of low ionic strength, washed with an aqueous solution of high ionic strength or a combination or series of washing steps may be employed.

For each of the methods described herein and depicted in FIGS. 3, 4, 5 and 6, the resulting modified surface demonstrates a zeta potential of |≧50| mV. The zeta potential should remain at |≧50| mV for at least one day, preferably for at least two days, more preferably for at least three days, and most preferably for at least seven days. Further, for each of the methods described above and depicted in FIGS. 3, 4, 5 and 6, the resulting modified surface demonstrates a zeta potential of |≧50| mV, while pumping is continuously applied across the surface. The zeta potential should remain at |≧50| mV for at least one day, preferably for at least two days, more preferably for at least three days, and most preferably for at least seven days, while pumping is continuously applied across the surface.

EXAMPLES

The following examples are provided to further illustrate our devices, compositions and methods and are not provided to limit the scope of the current invention in any way.

(i) Substrate Membranes

Experiments were carried out with symmetrical microfiltration membranes cast from poly(vinylidene fluoride) (—($CH_2$—$CF_2$)$_n$—; PVDF) (Durapore membranes, pore diameter ranging from 100 to 450 nm; Millipore Corp., Billerica, Mass.). Typically, hydrophilic GVWP and hydrophobic GVHP Durapore membranes of pore diameter 220 nm were used. (Herein these membranes will be referred to as GVWP and GVHP, respectively.) Other membranes are available from Millipore and suppliers such as, though not limited, to Pall Corp., East Hills, N.Y.; Schleicher and Schuell, now Whatman plc, Brentford, Middlesex, UK and GE-Osmonics, now GE Water & Process Technologies, Trevose, Pa.

Many membranes, including inorganic ones, can be charge-modified by the techniques described herein.

(ii) Polyelectrolytes and Surfactants

The chemicals used are inexpensive and available in a range of molecular weights (for the polymers). Many other polyelectrolytes can be used (see for example Polyelectrolytes, Formation, Characterization and Application, H. Dautzenberg et al., Hanser Publishers, 1994), many of which, however, are weak polyelectrolytes, or strong polyelectrolytes that are of undesirably low molecular weight.

Exemplary polyelectrolytes for charge modification are poly(sodium 4-styrenesulfonate) (NaPSS) and poly(diallyldimethylammonium chloride) (PDADMA-Cl), where $Cl^-$ can be exchanged by other anions, such as $Br^-$, $F^-$, $OAc^-$, pivalate, benzoate, toluate, $citrate^{-1\ to\ -2}$, $HCO_3^-$, $SO_4^{-2}$, or $H_2PO_4^-$.

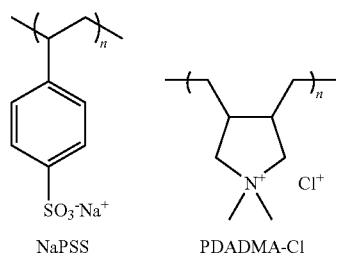

NaPSS        PDADMA-Cl

Various ionic surfactants (see J. B Rosen, Surfactants and Interfacial Phenomena, $2^{nd}$ Ed., Wiley-Interscience, 2004) were also examined, for example didodecyldimethylammonium bromide (DDDMA-Br), a double chained cationic surfactant, obtained from Sigma Aldrich.

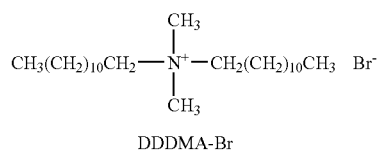

DDDMA-Br

Poly(vinylamine) (PVAH, MW ~340 kDa), available from BASF AG as "Lupamin 9095" and poly(allylamine) (PAH, MW ~65 kDa), available from Sigma Aldrich, were used as examples of weak polyelectrolytes.

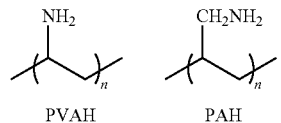

PVAH        PAH

All of the above polyelectrolytes were used as received or after dialysis (and in some instances ion exchange) using Spectra/Por membrane tubes available from VWR International, West Chester, Pa.

(iii) Zeta Potential Determination

Figure 8:
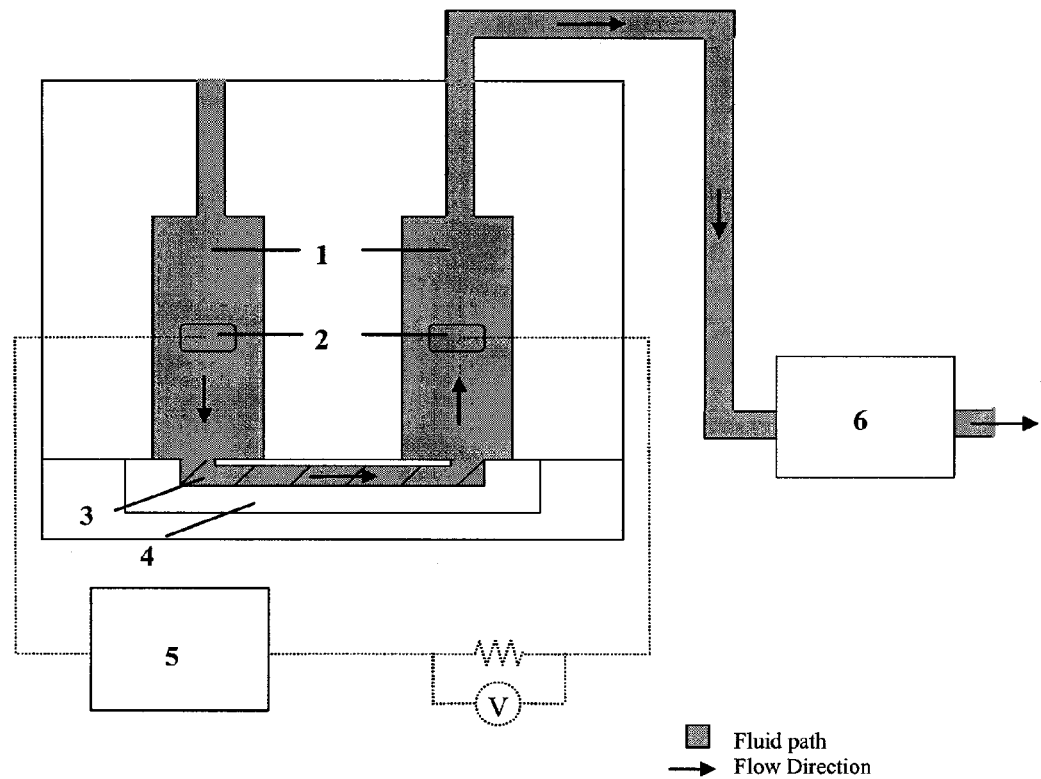
FIG. 8 depicts an illustrative, non-limiting example of a fixture A, used to evaluate the zeta potential of the membranes described herein, wherein the areas labeled 1 represents buffer reservoirs; 2 represents capacitive electrodes; 3 represents the test membrane; 4 is the test laminate; 5 is a Keithley 2400 Source Meter—100 VDC; and 6 is a Sensirion Liquid Mass Flow Meter SLG1430-025.
Figure 8:
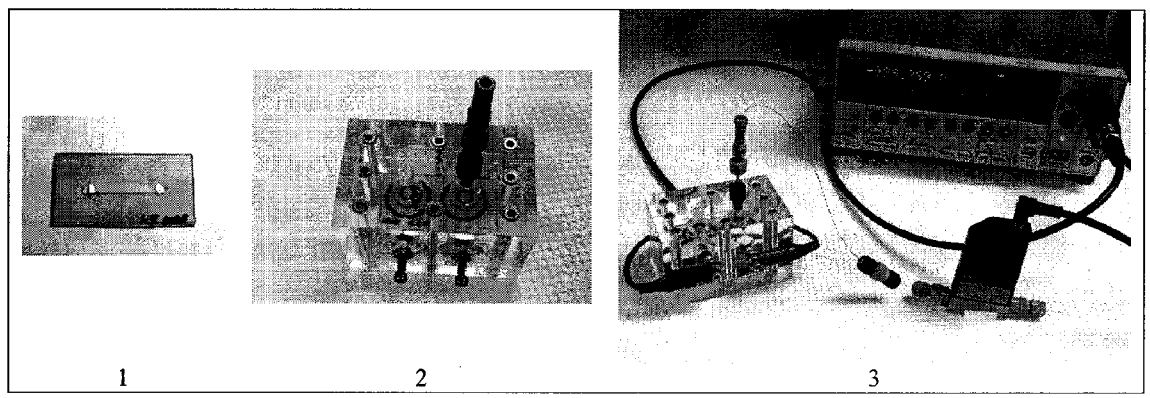
Figure 9:
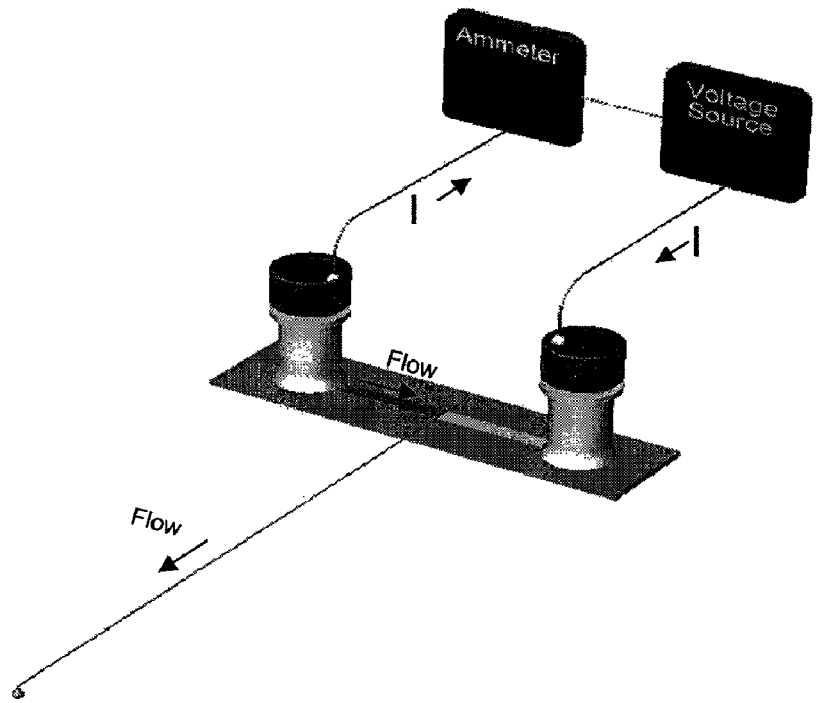
FIG. 9 depicts an illustrative, non-limiting example of a fixture B, also used to evaluate the zeta potential of the membranes described herein, wherein the direction of liquid and current flow is shown for a membrane with a negative zeta potential.

The zeta potentials of the various membranes were determined after being laminated between sheets of poly(etherimide) (Ultem®, part #655-546-12, available from Goodfellow Corp, Devon, Pa.). (See US 2004/0011648, herein incorporated by reference, for details.), using the test fixtures, A and B, as shown in FIGS. 8 and 9 respectively.

Using fixture A (FIG. 8): a drop of buffer solution was placed into the porthole of the test laminate, which was then covered with a Petri dish (to minimize water evaporation), and the buffer was allowed to wick across the membrane to wet it. The test membrane strip for fixture A is ~25 mm long, ~3 mm wide and ~0.1 mm thick.

The laminated membrane specimens were mounted in Fixture A and the reservoirs were filled with buffer. A syringe was placed on the exit side to suck the aqueous buffer through cell and the membrane, which removed air bubbles.

A potential of 100 V DC (to give a field strength across the membrane of ~40 V/cm) was applied to capacitive carbon electrodes, initiating electroosmotic flow. The flow rate was measured with a Sensirion flow meter.

The test laminate in Fixture B (FIG. 9) consisted of the test membrane and a salt bridge membrane each 25 mm long, 3 mm wide and 0.1 mm thick that abutted at a center porthole into which was inserted a capillary to permit the exit of the fluid pumped. The salt bridge membrane had a pore diameter of <<100 nm. The test laminate was assembled with two buffer reservoirs, which included platinum electrodes. Buffer solution was added to the reservoir on the (left) side of the test membrane and allowed to wick close to the insertion point of the capillary. The buffer solution was then added to other (right) reservoir allowed to wick through the salt bridge membrane to the insertion point of the capillary. A syringe was attached to the exit side of the capillary to suck out any remaining air bubbles.

When the test membranes were hydrophobic they were first pre-wetted with aqueous ethanol (for both Fixtures A and B), which was then replaced with an all aqueous buffer.

A potential of 200 V (=40 V/cm field strength across the test membrane) (for Fixture B, FIG. 8) was applied to Pt wire electrodes, initiating electroosmotic flow. To measure flow rate the advancing liquid column (in a tube of known inner diameter, attached to the outlet of the capillary) was measured with a ruler as a function of time.

Simultaneously the current passing through the membrane was measured. Stable liquid and current flows were usually achieved after about 10 to 15 min of pumping. Pumping was continued for 200 to 450 min and the data after 30 min of pumping were averaged.

(iv) Staining: Evaluation of Membranes for Presence of Ionic Surface Sites

Membranes were stained with either of two dyes. The first dye, methylene blue, was used to assay for the presence of anionic surface sites. Methylene blue is a quaternary ammonium salt that forms water insoluble salts with anionic sites bound to membranes, which cannot be eluted with water at room temperature.

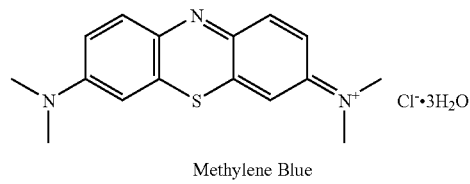

Methylene Blue

The second dye, Direct Red 80, assays for the presence of cationic surface sites. Direct Red 80 is a negatively charged sulfonate salt.

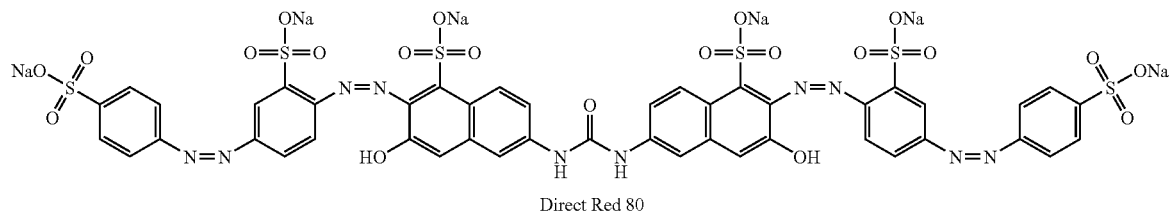

Direct Red 80

This staining with the ionic dyes was used throughout the following investigations to determine qualitatively whether the membranes contained ionic surface sites.

Example 1

Staining of GVWP

GVWP was stained with:

(a) an aqueous solution of 0.5 mg/mL of methylene blue, and, separately, (b) an aqueous solution of 2 mg/mL of Direct Red 80.

Membrane pieces with a stain diameter of ~5 mm were washed with cold water and then placed in 5 mL of water and held at 50° C. for 2 h. The samples were cooled to RT and the color intensity of the membrane stain and that of the supernatant water solution was assessed.

For the methylene blue stain, there was no reduction in stain intensity compared with its intensity before the heating, and the supernatant water was colorless. For the Direct Red 80 stain, there remained no color on the membrane, and the supernatant water solution was pink. This indicates that the GVWP membrane contains anionic surface groups, probably carboxylic acid groups that are covalently linked to the PVDF polymer chain, and that are not subject to the hydrophobic recovery effect. (See Tusek et al., Colloids and Surfaces A 2001, 195, 81; Xu et al., Langmuir 2003, 19, 6869; and Prucker et al., Creative Advances in Coating Technology (Nuremberg Congress 2003))

Example 2

Staining of GVHP

GVHP was stained with:

(a) a 75% aqueous methanol solution of 0.5 mg/mL of methylene blue, and, separately, (b) a 75% aqueous methanol solution of 2 mg/mL of Direct Red 80.

Membrane pieces were eluted with 75% aqueous methanol. (Note, 75% methanol was used to wet the GVHP membrane, which is hydrophobic.)

The GVHP showed a more intense stain with methylene blue than the GVWP membrane, otherwise it performed identically. The GVHP membrane was not stained by Direct Red 80 as in the case of the hydrophilic GVWP membrane. This indicates that the GVHP membrane contains anionic surface groups, probably carboxylic acid groups that are covalently linked to the PVDF polymer chain, and that are not subject to the hydrophobic recovery effect, (see above.)

Example 3

Staining of Heat Treated GVHP

GVHP was heated at T~100° C. (T>$T_g$ of PVDF) for several hours.

The heated membrane was stained with methylene blue, as in the previous example. The stain intensity was the same as that of the un-annealed sample.

Example 4

Electroosmotic Evaluation of GVWP Membrane: Effect of Buffer Concentration

Test laminates of the untreated GVWP membrane were prepared and tested as described above using Fixture A. Buffer concentrations were varied from 0.5-10 mM sodium hydroxide, and 1-20 mM acetic acid, respectively. The results of this study are shown in the table below:

| Ref# | Test Buffer Conditions | Current (μA) | Zeta Potential (mV) | Flow Rate (nL/min) | Pumping Efficiency[1] (nL/sec)/(μA) |
|---|---|---|---|---|---|
| 195-190a | 0.5 mM NaOH<br>1.0 mM HOAc<br>pH = 4.68<br>σ = 56.6 μS/cm<br>T = 23.4° C. | 3.5 ± 0.3 | −19.8 ± 2.4 | 561.6 ± 14.7 | 2.674 |
| 195-164b | 0.625 mM NaOH<br>1.25 mM HOAc<br>pH = 4.70,<br>σ = 61 μS/cm<br>T = 20.7° C. | 2.7 ± 0.1 | −24.3 ± 0.9 | 498.0 ± 3.7 | 3.073 |
| 195-192a | 1.0 mM NaOH<br>2.0 mM HOAc<br>pH = 4.67<br>σ = 101.8 μS/cm<br>T = 24.1° C. | 4.3 ± 0.1 | −29.2 ± 0.2 | 575.7 ± 7.6 | 2.231 |

-continued

| Ref# | Test Buffer Conditions | Current (µA) | Zeta Potential (mV) | Flow Rate (nL/min) | Pumping Efficiency[1] (nL/sec)/(µA) |
|---|---|---|---|---|---|
| 195-164a | 1.25 mM NaOH 2.5 mM HOAc pH = 4.68 σ = 114 µS/cm T = 20.8° C. | 4.1 ± 0.1 | −28.8 ± 1.0 | 487.1 ± 3.6 | 1.980 |
| 195-191a | 1.5 mM NaOH 3.0 mM HOAc pH = 4.64 σ = 139.8 µS/cm T = 20.9° C. | 5.2 ± 0.1 | −27.7 ± 0.7 | 482.6 ± 8.4 | 1.547 |
| 195-149b | 2.5 mM NaOH 5 mM HOAc pH = 4.64, σ = 226 µS/cm T = 20.7° C. | 8.4 ± 0.1 | −28.0 ± 0.3 | 486.4 ± 2.8 | 0.965 |
| 195-191b | 3.75 mM NaOH 7.5 mM HOAc pH = 4.63 σ = 323 µS/cm T = 20.7° C. | 10.5 ± 0.1 | −27.5 ± 0.6 | 415.7 ± 6.5 | 0.660 |
| 195-149a | 5 mM NaOH 10 mM HOAc pH = 4.60 σ = 437 µS/cm T = 20.7° C. | 13.4 ± 0.2 | −26.4 ± 0.2 | 377.5 ± 3.3 | 0.470 |
| 195-192b | 6.25 mM NaOH 12.5 mM HOAc pH = 4.57 σ = 610 µS/cm T = 23.6° C. | 18.1 ± 0.4 | −25.5 ± 0.8 | 351.6 ± 4.0 | 0.324 |
| 195-166a | 10 mM NaOH 20 mM HOAc pH = 4.57 σ = 903 µS/cm T = 20.3° C. | 26.2 ± 0.4 | −19.2 ± 0.5 | 259.1 ± 3.8 | 0.165 |

[1]Pumping Efficiency calculated as Flow Rate (nL/sec)/Current (µA)

Figure 10:
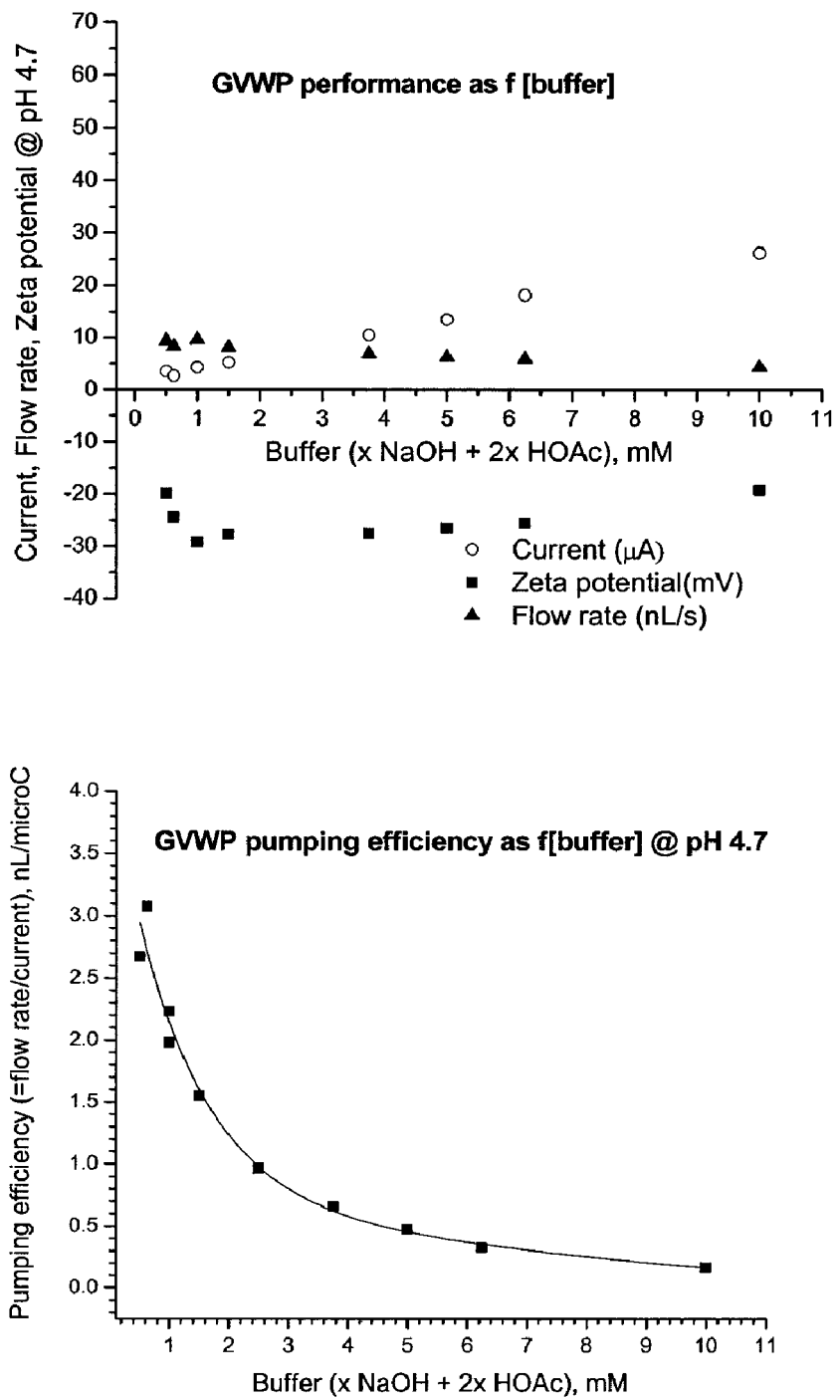
FIG. 10 shows illustrative, non-limiting examples of graphical plots of current, flow rate and zeta potential against buffer concentration, at pH 4.7 (top) and pumping efficiency against buffer concentration, also at pH 4.7 (bottom), for an untreated hydrophilic membrane-poly(vinylidene fluoride) [PVDF]-membrane, Durapore GVWP from Millipore Corp of pore diameter 220 nm.

Graphical plots of current, flow rate and zeta potential against buffer concentration and pumping efficiency against buffer concentration are shown in FIG. 10, which show that pumping efficiency decreases with increasing buffer concentration. Low buffer conductivity (<300 µS/cm) is desirable as it extends the life of the buffer and that of the capacitive electrodes.

Example 5

Electroosmotic Evaluation of Hydrophilic Durapore Membrane: Effect of Pore Diameter Untreated hydrophilic Durapore membranes of varying pore diameter were laminated and evaluated as described above in section (iii). The results of this study are shown in the table below:

| Test # | Membrane | Test Buffer Conditions | Current (µA) | Zeta Potential (mV) | Flow Rate (nL/min.) | FR/I |
|---|---|---|---|---|---|---|
| 202-17b | Hydrophilic Durapore VVLP (100 nm pore diameter) | 1.25 mM NaOH 2.5 mM HOAc pH = 4.60 σ = 119.8 µS/cm T = 22.8° C. | 3.4 ± 0.1 | −32.0 ± 1.3 | 421.2 ± 15.2 | 2.065 |
| 202-16b | Hydrophilic Durapore VVLP (100 nm pore diameter) | 2.5 mM NaOH 5 mM HOAc pH = 4.61 σ = 235 µS/cm T = 22.3° C. | 5.5 ± 0.1 | −32.9 ± 0.7 | 359.9 ± 4.3 | 1.091 |
| 202-7a | Hydrophilic Durapore VVLP (100 nm pore diameter) | 5 mM NaOH 10 mM HOAc pH = 4.59 σ = 451 µS/cm T = 22.3° C. | 10.7 ± 0.1 | −28.3 ± 0.6 | 311.3 ± 5.7 | 0.485 |

-continued

| Test # | Membrane | Test Buffer Conditions | Current (μA) | Zeta Potential (mV) | Flow Rate (nL/min.) | FR/I |
|---|---|---|---|---|---|---|
| 195-164a | Hydrophilic Durapore GVWP (220 nm pore diameter) | 1.25 mM NaOH 2.5 mM HOAc pH = 4.68 σ = 114 μS/cm T = 20.8° C. | 4.1 ± 0.1 | −28.8 ± 1.0 | 487.1 ± 3.6 | 1.980 |
| 195-149b | Hydrophilic Durapore GVWP (220 nm pore diameter) | 2.5 mM NaOH 5 mM HOAc pH = 4.64 σ = 226 μS/cm T = 20.7° C. | 8.4 ± 0.1 | −28.0 ± 0.3 | 486.4 ± 2.8 | 0.965 |
| 195-149a | Hydrophilic Durapore GVWP (220 nm pore diameter) | 5 mM NaOH 10 mM HOAc pH = 4.60 σ = 437 μS/cm T = 20.7° C. | 13.4 ± 0.2 | −26.4 ± 0.2 | 377.5 ± 3.3 | 0.470 |
| 202-17a | Hydrophilic Durapore HVLP (450 nm pore diameter) | 1.25 mM NaOH 2.5 mM HOAc pH = 4.60 σ = 119.8 μS/cm T = 22.8° C. | 4.5 ± 0.1 | −25.2 ± 1.1 | 443.2 ± 12.1 | 1.641 |
| 202-16a | Hydrophilic Durapore HVLP (450 nm pore diameter) | 2.5 mM NaOH 5 mM HOAc pH = 4.61 σ = 235 μS/cm T = 22.3° C. | 8.5 ± 0.2 | −21.6 ± 0.6 | 362.1 ± 3.4 | 0.710 |
| 202-7b | Hydrophilic Durapore HVLP (450 nm pore diameter) | 5 mM NaOH 10 mM HOAc pH = 4.59 σ = 451 μS/cm T = 22.3° C. | 15.6 ± 0.3 | −18.1 ± 0.6 | 290.9 ± 3.3 | 0.311 |

Figure 11:
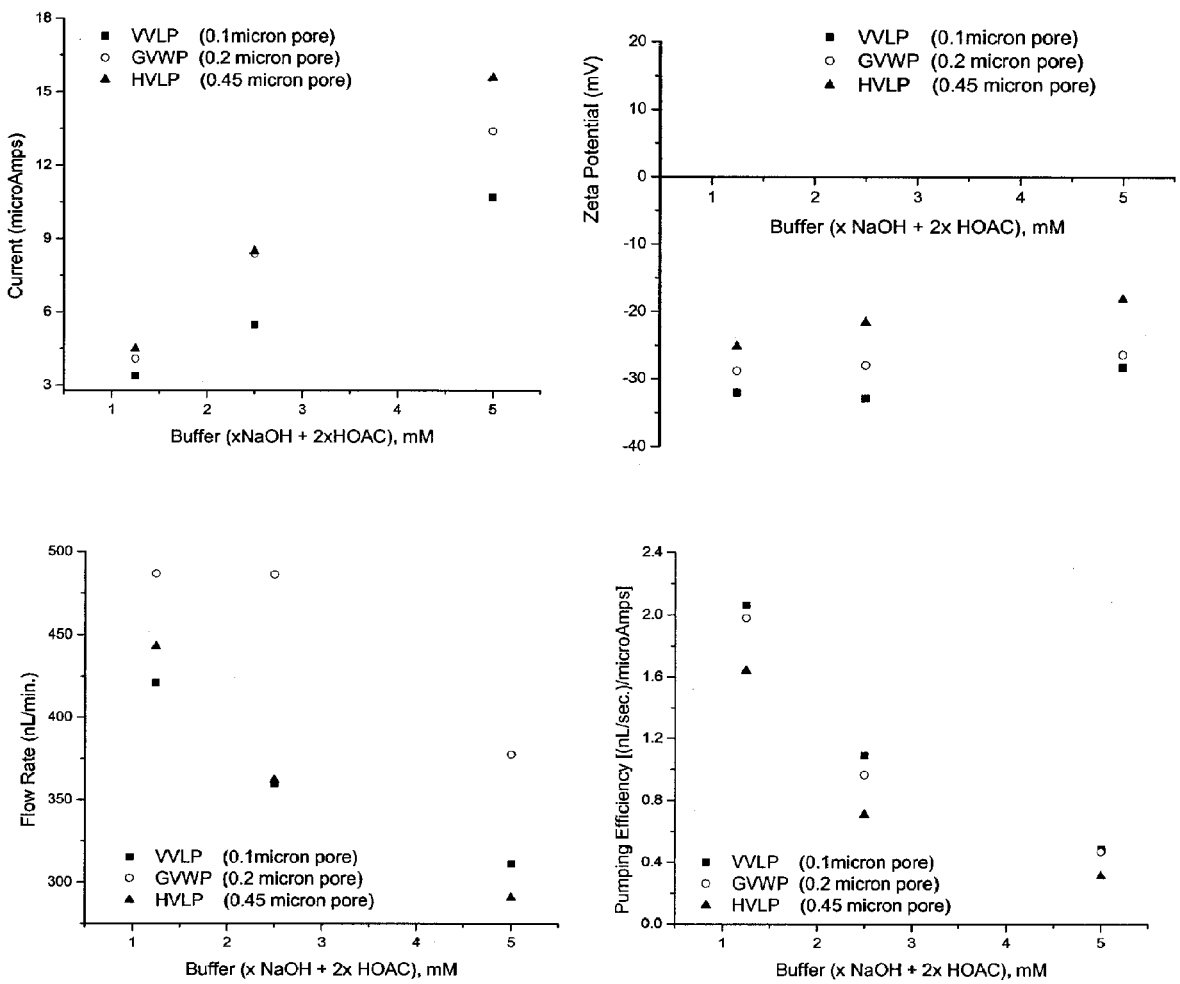
FIG. 11 shows illustrative, non-limiting examples of graphical plots of current vs. buffer concentration; zeta potential vs. buffer concentration; flow rate vs. buffer concentration and pumping efficiency vs. buffer concentration for hydrophilic membranes (poly(vinylidene fluoride) membranes, Durapore VVLP, GVWP and HVLP from Millipore Corp.) of pore size ranging from 100 to 450 nm.

FIG. 11 shows graphical plots of current vs. buffer concentration; zeta potential vs. buffer concentration; flow rate vs. buffer concentration and pumping efficiency vs. buffer concentration. These experiments show that pumping efficiency increases with decreasing buffer concentration and increases with decreasing membrane pore diameter.

Example 6

GVHP Adsorbed with Didodecyldimethylammonium Bromide (DDDMA-Br)

The GVHP membrane was wetted with aqueous 90% EtOH, which was then replaced with water. The water logged membrane was placed into a 0.5 mM aqueous solution of DDDMA-Br for about 16 h at room temperature, then washed with water and dried at RT in a vacuum.

Staining with Direct Red 80, as described above in section (iv) demonstrated that the membrane had a cationic charge. The stained membrane was then heated in water (after wetting with aqueous methanol) for 16 h at 50° C., after which time the stain intensity was lost.

Figure 12:
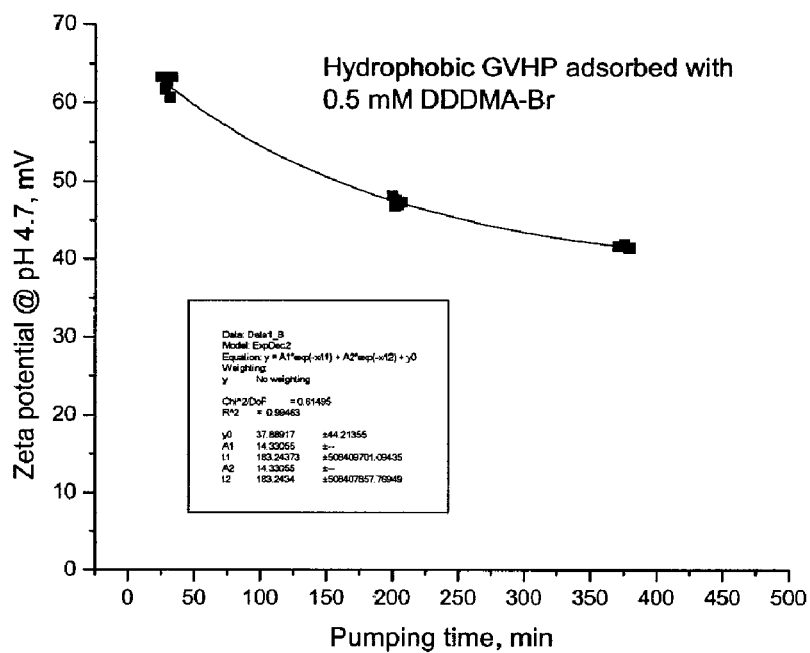
FIG. 12 shows illustrative, non-limiting examples of graphical plots of zeta potential vs. pumping time (400 minutes) for a hydrophobic membrane (poly(vinylidene fluoride) membrane, Durapore GVHP from Millipore Corp.) adsorbed with didodecyldimethylammonium bromide (DDDMA-Br), for two separate experiments, where the membrane wetting conditions had not been controlled.
Figure 12:
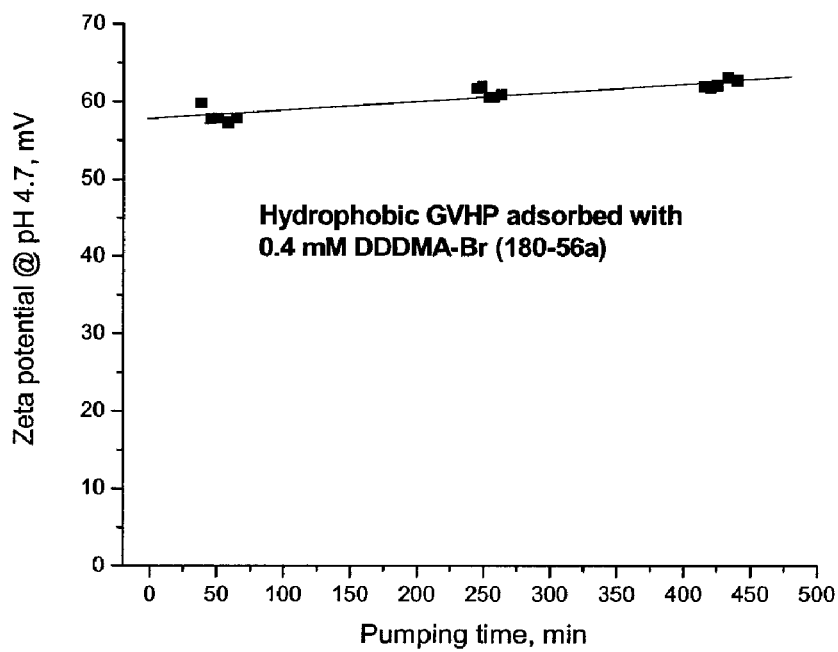

The membrane adsorbed with DDDMA-Br was hydrophobic, and after wetting with aqueous 75% methanol, was tested in Fixture B for its zeta potential to give the data shown at the top of FIG. 12. The test was repeated and gave the result shown at the bottom of FIG. 12. It should be noted that for both experiments, the wetting time with aqueous 75% methanol was not controlled.

Example 7

GVHP Adsorbed with Didodecyldimethylammonium Bromide (DDDMA-Br)

Poly(diallyldimethylammonium-chloride) (MW 400 to 500 kDa) was dialyzed through a Spectra/Por 6 membrane [MWCO=50 kDa] against a $Na_2SO_4$ solution, which also caused chloride-to-sulfate exchange to give PDADMA-sulfate.

Figure 13:
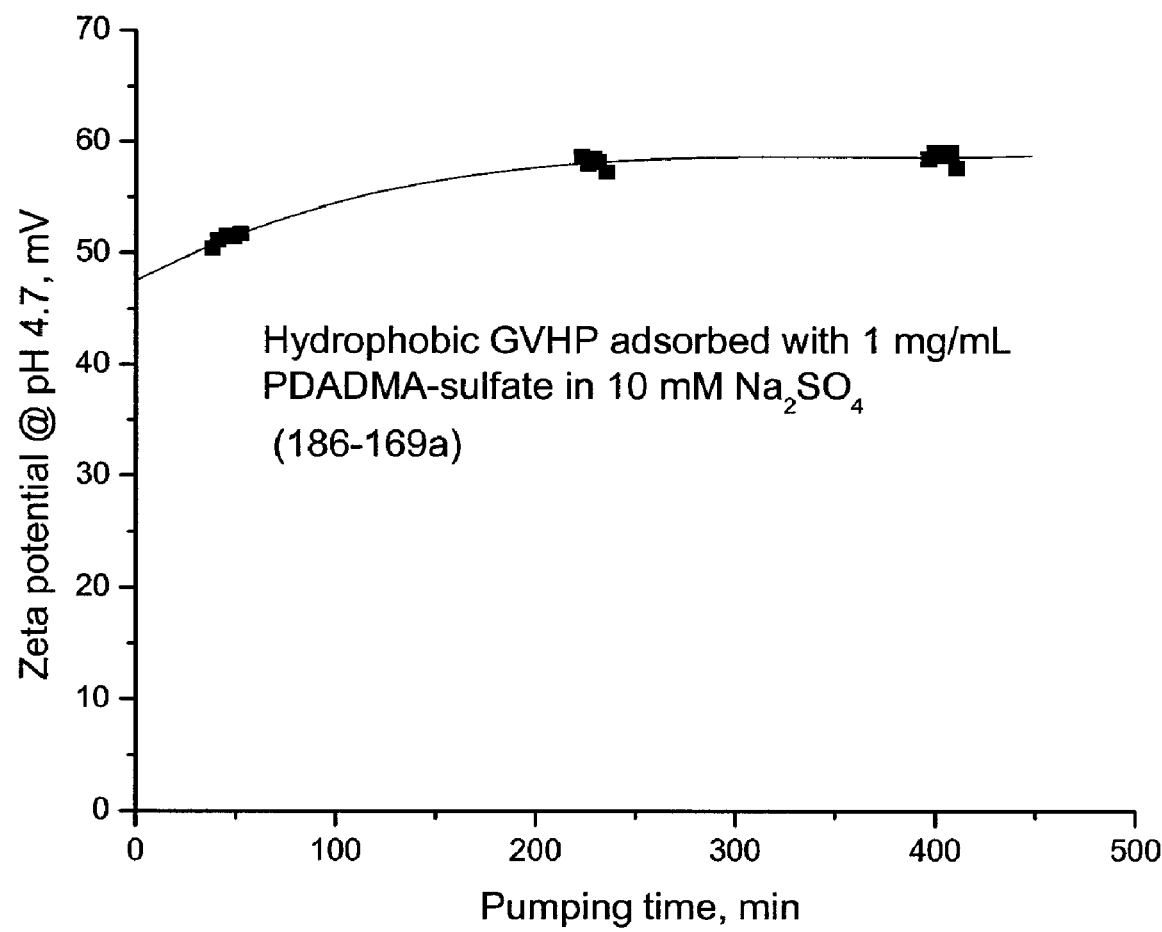
FIG. 13 shows an illustrative, non-limiting example of a graphical plot of zeta potential vs. pumping time (400 minutes) for GVHP adsorbed with a solution of 1 mg/mL (=5.74 mM in terms of repeat units) of poly(diallyldimethylammonium sulfate) (PDADMA-sulfate) that was also 10 mM in $Na_2SO_4$.

A solution of 1 mg/mL of PDADMA-sulfate in 10 mM $Na_2SO_4$ (ionic strength) was adsorbed onto GVHP as described in example 6 and the zeta potential was determined as function of pumping time. FIG. 13 shows a graphical plot of zeta potential vs. pumping time demonstrating a more stable performance than the adsorbate derived from DDDMA-Br. The PDADMA-sulfate experiment was repeated and the result was found to be reproducible.

Staining with Direct Red 80 (2 mg/mL), as described above in section (iv) demonstrated that the membrane had a cationic charge. The stained membrane was then heated in water (after wetting with aqueous methanol) for 16 h at 50° C., after which time the membrane retained its stain intensity. This suggests that the PDADMA-sulfate adsorbate is significantly more resistant towards desorption than the DDDMA-Br adsorbate of the previous example; this observation is consistent with the zeta potential data vs. pumping time for the two membranes. Both the surfactant and the polyelectrolyte-adsorbed membranes were hydrophobic.

Example 8

GVWP Adsorbed with Poly(Vinylammonium Acetate (PVAH-OAc): Effect of PVAH-OAc Concentration Poly(vinylamine) (Lupamin 9095, MW 340 kDa, 20% solids, BASF) was dialyzed with a Spectra/Por 6 membrane (MWCO=50 kDa) against a sodium acetate/acetic acid solution of pH 4.7 to give PVAH-OAc. GVWP was adsorbed with aqueous solutions of this polyelectrolyte ranging in concentration from 0 to 6 mg/mL. The zeta potentials (in a pH 4.7 buffer solution of 5 mM NaOH and 10 mM HOAc) of the resulting coated membranes were determined, summarized in the table below.

| Membrane | PVAH-OAc (mg/mL) | Current ($\mu$A) | Zeta Potential (mV) | Flow Rate (nL/min) |
|---|---|---|---|---|
| 195-149a | 0 | 13.4 ± 0.2 | −26.4 ± 0.2 | 377.5 ± 3.3 |
| 187-202a | 0.5 | 13.9 ± 0.3 | 6.5 ± 0.5 | 105.1 ± 6.8 |
| 188-138-2C | 1 | 15.1 ± 0.5 | 15.1 ± 1.7 | 265.7 ± 21.7 |
| 187-202b | 2 | 13.5 ± 0.3 | 36.0 ± 1.4 | 565.9 ± 7.4 |
| 187-202c | 3 | 11.9 ± 0.2 | 49.1 ± 1.0 | 681.9 ± 3.0 |
| 187-158a | 3 | 12.1 ± 0.1 | 51.8 ± 0.3 | 699.8 ± 2.9 |
| 195-21a | 3.5 | 15.3 ± 0.4 | 46.3 ± 1.0 | 828.4 ± 7.8 |
| 195-21b | 4 | 14.5 ± 0.3 | 47.2 ± 0.4 | 800.1 ± 7.8 |
| 195-21c | 5 | 18.6 ± 0.2 | 34.2 ± 0.2 | 747.3 ± 7.4 |
| 187-202d | 6 | 17.7 ± 0.1 | 26.9 ± 0.4 | 558.9 ± 8.6 |

Figure 14:
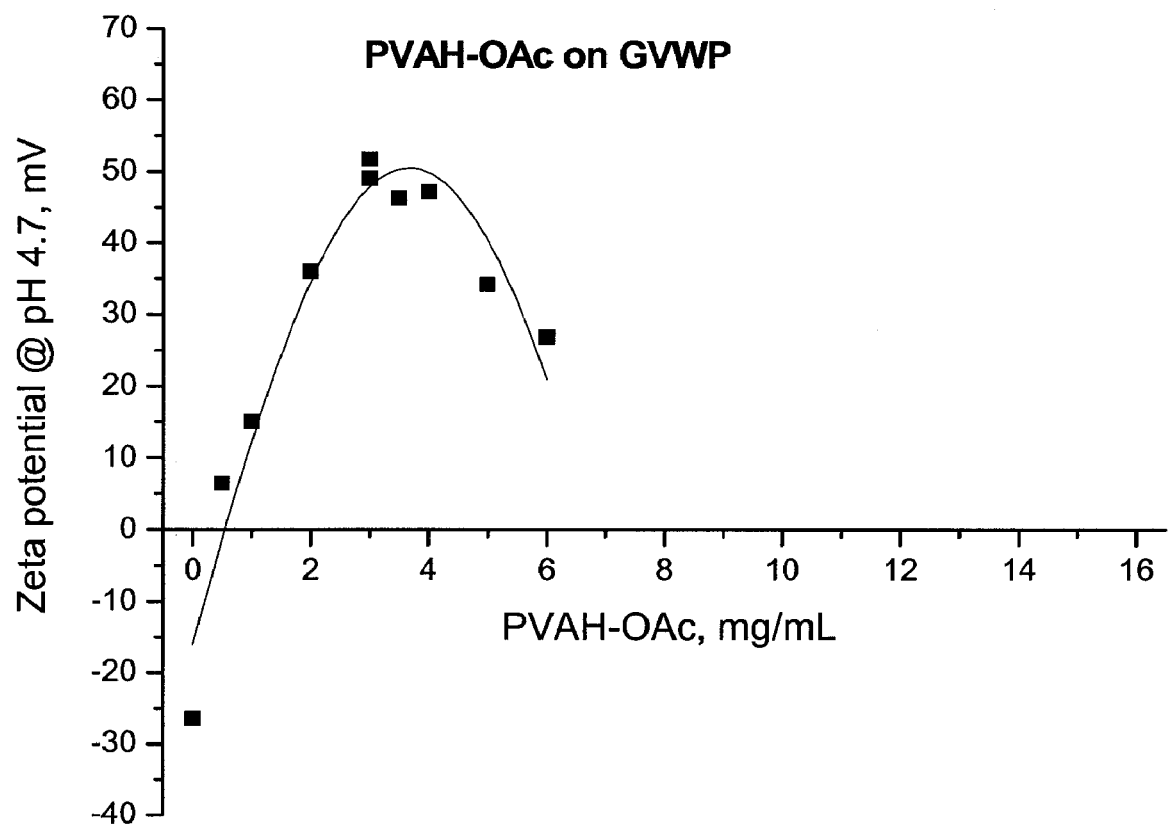
FIG. 14 shows an illustrative, non-limiting example of a graphical plot of zeta potential vs. poly(vinylammonium acetate) (PVAH-acetate) concentration (0-6 mg/mL) for PVAH-acetate adsorbed GVWP.

FIG. 14 shows a graphical plot of zeta potential vs. polyelectrolyte concentration, demonstrating the existence of an optimal polyelectrolyte concentration.

Example 9

GVWP Adsorbed with PDADMA-OAc: Effect of PDADMA-OAc Concentration

Figure 15:
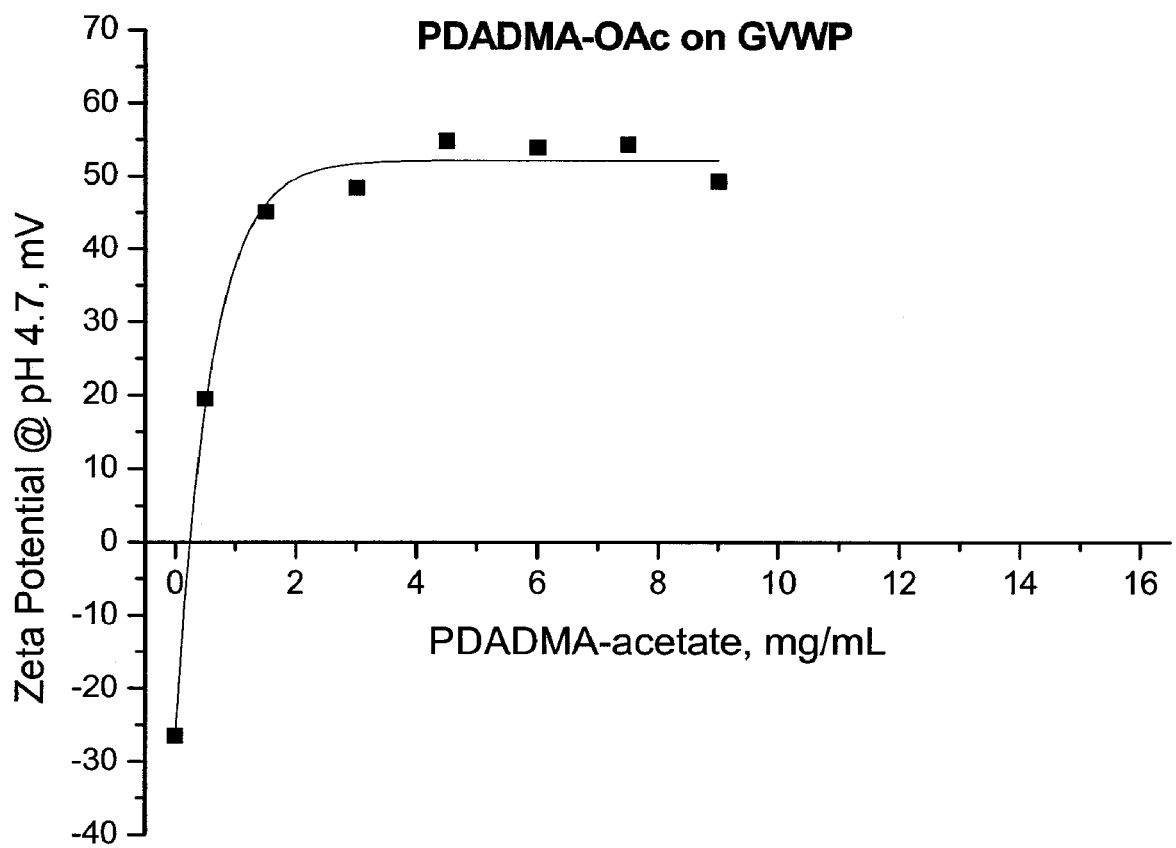
FIG. 15 shows an illustrative, non-limiting example of a graphical plot of zeta potential vs. poly(diallyldimethylammonium acetate) (PDADMA-acetate) concentration (0-9 mg/mL) for PDADMA-acetate adsorbed GVWP.

Poly(diallyldimethylammonium chloride) (MW 400 to 500 kDa, 20% solids, Sigma-Aldrich) was dialyzed with a Spectra/Por 6 membrane (MWCO=50 kDa) against a sodium acetate solution to give PDADMA-OAc. GVWP was adsorbed with an aqueous solution of this polyelectrolyte ranging in concentration from 0 to 9 mg/mL and zeta potentials of the adsorbed membranes were measured. The results are shown in the graph in FIG. 15.

Example 10

GVWP Adsorbed with PVAH-OAc: Effect of the pH of the PVAH-OAc Solution

Figure 16:
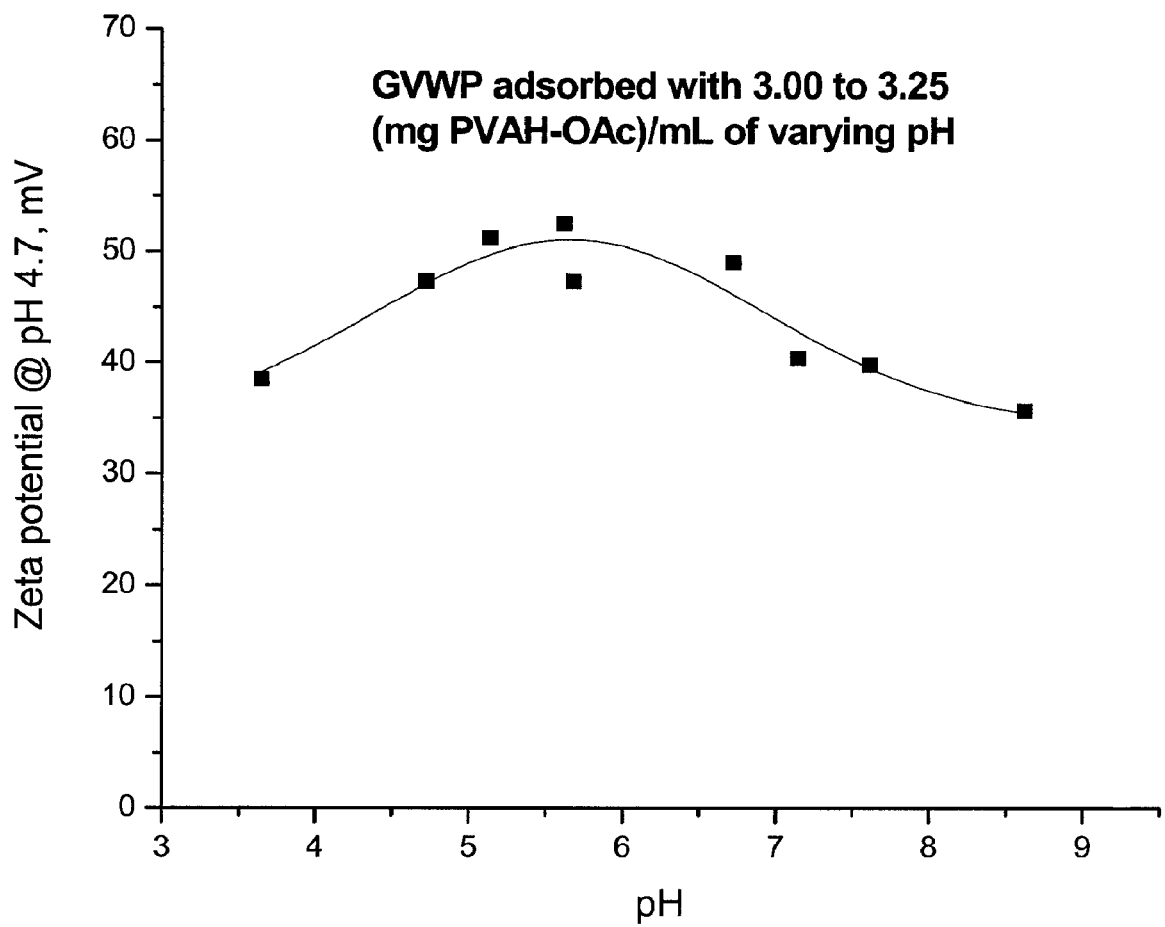
FIG. 16 shows an illustrative, non-limiting example of a graphical plot of zeta potential vs. the PVAH-acetate adsorbed GVWP adsorbed with PVAH-acetate (3.00 to 3.25 mg/mL) in the pH range of 3.5 to 8.5.

The pH of adsorption solutions containing 3 to 3.25 mg/mL of PVAH-OAc was adjusted with NaOH or HOAc to the range from 3.5 to 8.5. These solutions were used to adsorb PVAH-OAc onto GVWP. A dependence of the zeta potential on the pH of the adsorption solution was found, as shown in the graph in FIG. 16. A maximum zeta potential was achieved at pH 5.7.

Example 11

GVWP Adsorbed with PDADMA-OAc: Effect of the pH of the PDADMA-OAc Solution

Figure 17:
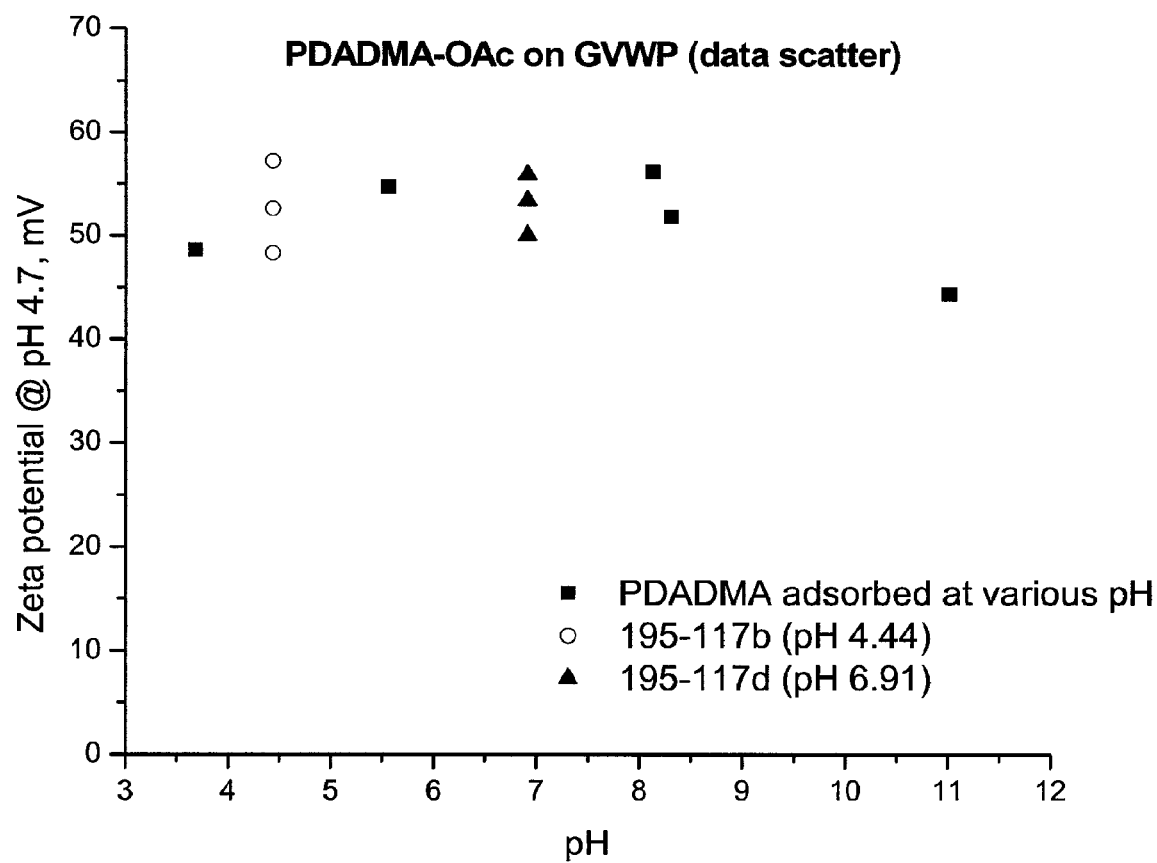
FIG. 17 shows an illustrative, non-limiting example of a graphical plot of zeta potential vs. PDADMA-acetate adsorbed GVWP from PDADMA-acetate solutions ranging in pH from 3.5 to 11.0. The experiments at pH 4.44 and 6.91 were run in triplicate, and gave significant data scatter

The pH of adsorption solutions containing 5 mg/mL PDADMA-OAc was adjusted with NaOH or HOAc to the range of 3.5 to 11. These solutions were used to adsorb PDADMA-OAc onto GVWP. The zeta potentials for these adsorbates were determined and are shown in the graph in FIG. 17. The experiments at pH 4.44 and 6.91 were run in triplicate, and gave significant data scatter.

Example 12

GVHP Adsorbed with PDADMA-Sulfate; Effect of PDADMA-Sulfate Concentration

Figure 18:
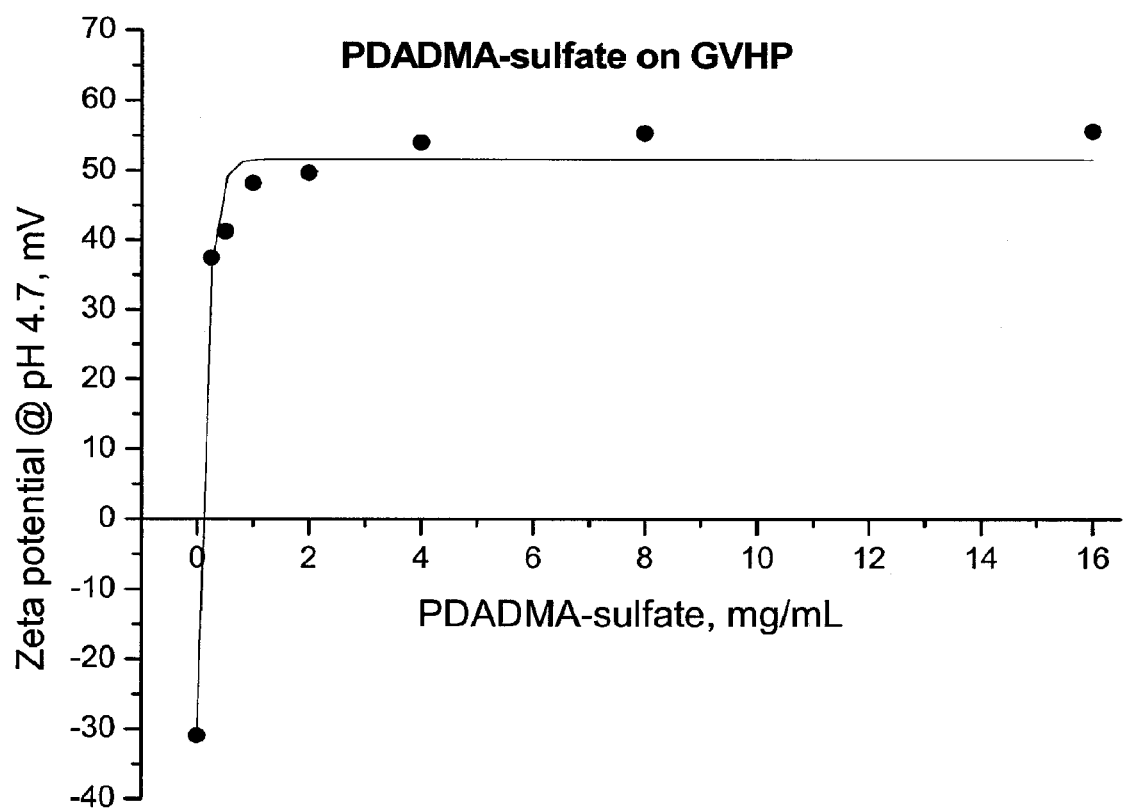
FIG. 18 shows an illustrative, non-limiting example of a graphical plot of zeta potential vs. PDADMA-sulfate concentration (0-16 mg/nL) for GVHP adsorbed with PDADMA-sulfate.

Poly(diallyldimethylammonium chloride) (MW 400 to 500 kDa, 20% solids) was dialyzed with a Spectra/Por 6 membrane (MWCO=50 kDa) against a sodium sulfate solution to give PDADMA-sulfate. The hydrophobic membrane GVHP was adsorbed with an aqueous solution of this polyelectrolyte ranging in concentration from 0 to 16 mg/mL. These adsorbates were still hydrophobic but their hydrophobicity decreased with increasing PDADMA-sulfate concentration in the adsorption solution (as determined by wetting experiment with water containing increasing amounts of ethanol). For the zeta potential measurements, the membranes were wetted with aqueous ethanol, which was then replaced by aqueous buffer solution (5 mM NaOH/10 mM HOAc). The zeta potentials for these adsorbates are shown in the graph in FIG. 18.

Example 13

GVWP Adsorbed with PDADMA-X: Effect of PDADMA Counter Anion

GVWP was absorbed with poly(diallyldimethylammonium-X), where X=acetate, sulfate, bromide, chloride, and bicarbonate (PDADMA-acetate, PDADMA-sulfate, PDADMA-bromide, PDADMA-chloride, and PDADMA-bicarbonate). The PDADMA-X salts were obtained by dialysis of PDADMA-Cl of MW 400 to 500 kDa using a Spectr/Por 6 membrane (MWCO=50 kDa) against solutions of sodium acetate, sodium sulfate, sodium bromide, sodium chloride and sodium bicarbonate, respectively. Adsorptions were done at the polyelectrolyte concentrations indicated without added salt for $\geq$16 h. The adsorbed membranes were washed with pure water and dried at room temperature in a vacuum (0.1 mm Hg).

Figure 19:
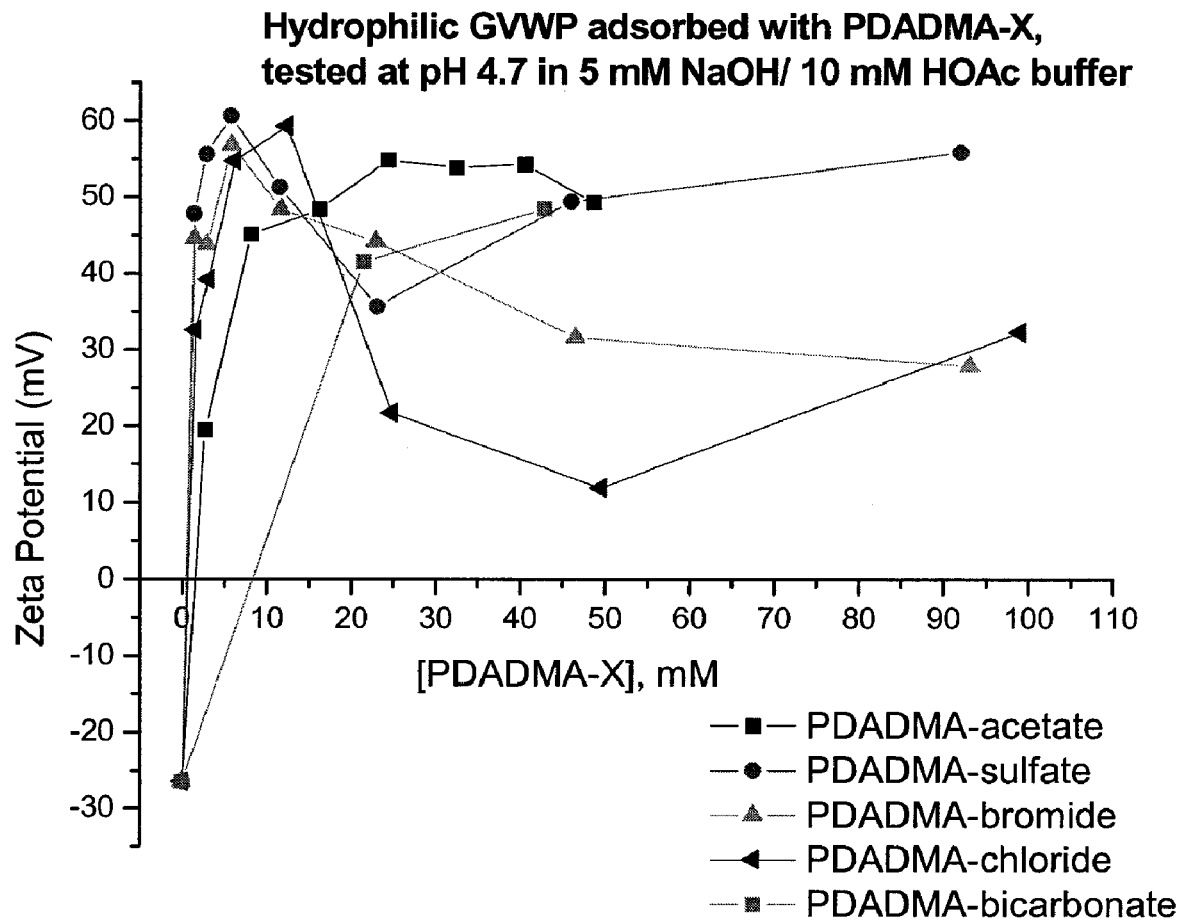
FIG. 19 shows an illustrative, non-limiting example of a graphical plot of zeta potential vs. PDADMA-X concentration, wherein X is acetate, sulfate, bromide, chloride and bicarbonate, for PDADMA-X adsorbed GVWP membranes.

The zeta potentials of the resulting membranes were determined, using 5 mM NaOH/10 nM HOAc; pH 4.68; $\sigma$=348 $\mu$S/cm @T=22.7° C. buffer, with fixture A, and are shown in FIG. 19, which shows bromide and chloride counter anions give the lowest, and sulfate and acetate the highest zeta potentials.

The thickness and surface roughness of multilayer polyelectrolyte adsorbates is counter anion dependent; this dependency follows the Hofmeister series of anions: fluoride gives a flat and thin adsorbate and bromide a thick and "loopy" (rough) adsorbate. A "loopy" adsorbate is expected to support an increased amount of surface current through the adsorbate, which should reduce the electroosmotic flow (and therefore lower the effective zeta potential).

Example 14

Stability of Starting Membranes and their Adsorbates

Figure 20:
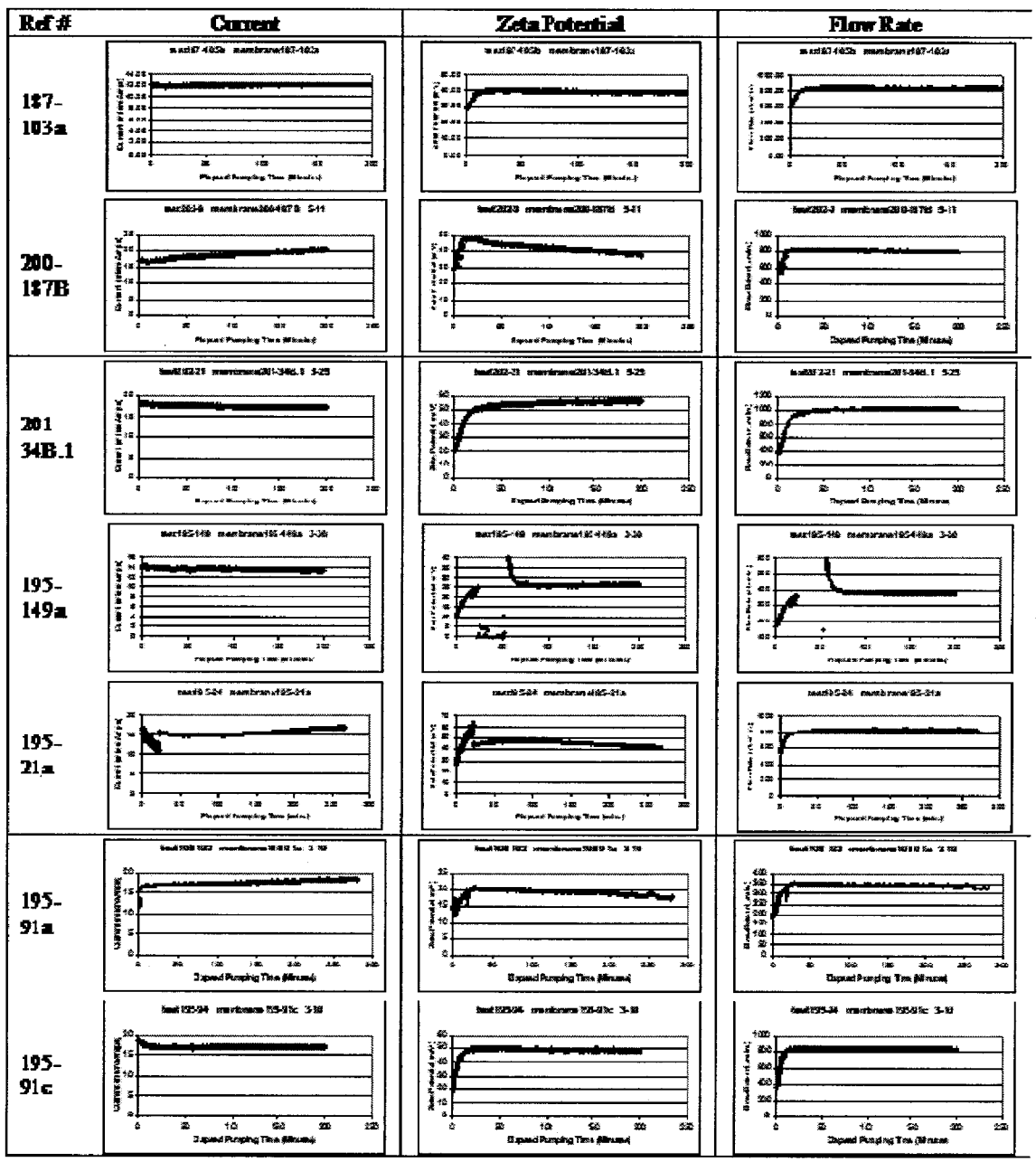
FIG. 20 shows illustrative, non-limiting examples of graphical plots of current, zeta potential and flow rate vs. pumping time for GVHP (no adsorbate; 187-103a); GVHP adsorbed with 0.5 mg/nL PDADMA-sulfate (200-187B); GVHP adsorbed with 16 mg/mL PDADMA-sulfate (201-34B.1); GVWP (no adsorbate; 195-149a); GVWP adsorbed with 3.5 mg/mL PVAH-acetate (195-21a); GVWP adsorbed with 0.5 mg/mL PDADMA-acetate (195-91a); and GVWP adsorbed with 9.0 mg/mL PDADMA-acetate (195-91c).

Various membranes were evaluated with different electrolytes and buffer solutions to evaluate the stability of the pumping performance. Pumping was maintained for 200 minutes for each experiment. The results are summarized in the table below; some of the corresponding graphs are shown in FIG. 20.

The adsorbates derived from adsorption solutions of high polycation concentration on both the hydrophilic and hydrophobic membranes produced high and constant pumping performance. Significantly reduced polycation concentration in the adsorption solutions led to decreased and less stable pump performance.

Example 15

Stability of a Charge-Modified Nylon Membrane

Figure 21:
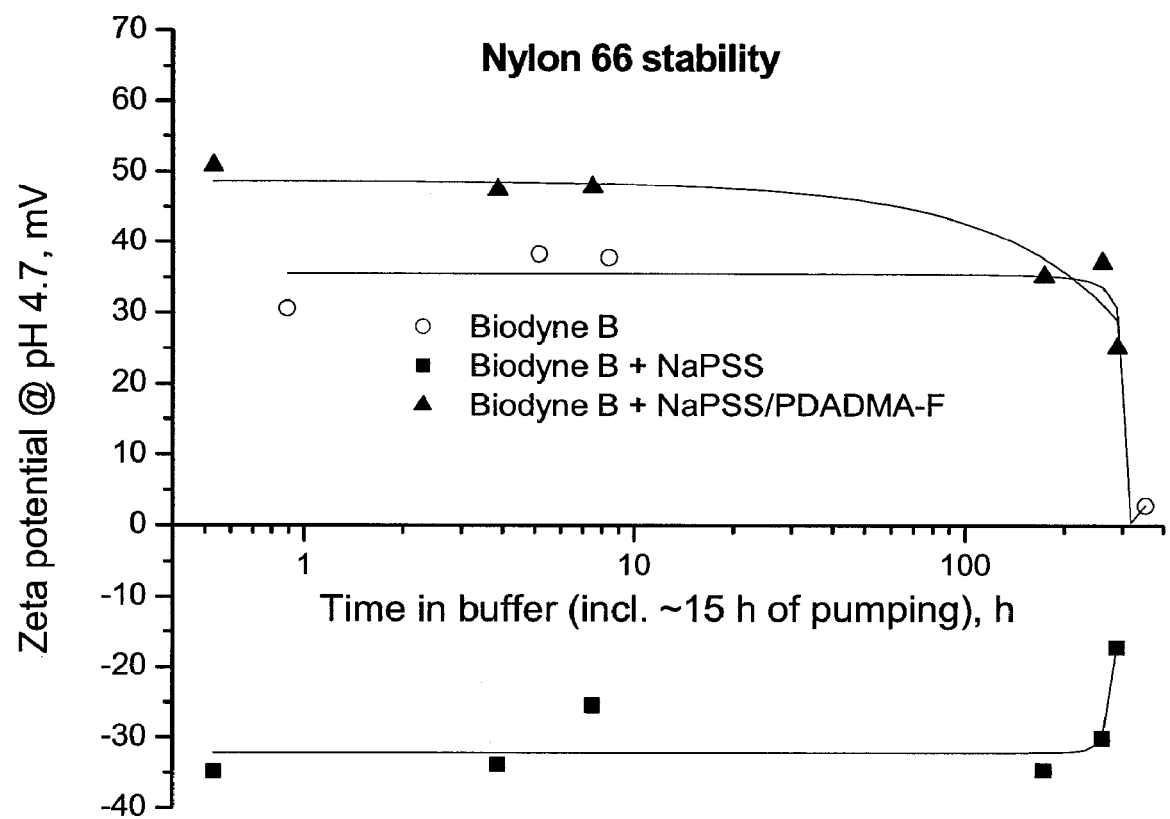
FIG. 21 shows an illustrative, non-limiting example of a graphical plot of zeta potential vs. time in buffer (including ~15 hours of pumping), for Biodyne B nylon as received, with a monolayer adsorbate of poly(sodium 4-styrenesulfonate) (NaPSS) (negative zeta potential) and with a bilayer adsorbate of NaPSS and PDADMA-F (positive zeta potential).

A cationic nylon 66 membrane (Pall Corp., Biodyne B, 200 nm pore diameter, with $-NR'_3{}^+X^-$ and $-NR_2$ surface groups, R', R=alkyl or H) was pumped with a buffer solution of pH 4.67 as received (to give a positive zeta potential), with a monolayer adsorbate of NaPSS (to give a negative zeta potential) and a bilayer adsorbate of NaPSS and PDADMA-F (to give a positive zeta potential). All of these nylon membranes were tested in Fixture B and began to fail after about 300 h of buffer exposure, including 15 h of pumping, as can be seen in FIG. 21.

| Ref # | Substrate | Adsorbate | Test Buffer Conditions | Current ($\mu A$) | Zeta Potential (mV) | Flow Rate (nL/min) | FR/I (nL/$\mu C$) |
|---|---|---|---|---|---|---|---|
| 187-103a | GVHP | No adsorbate | 10 mM Tris[1]/ 5 mM Sorbic acid pH = 8.29 $\sigma$ = 264 $\mu$S/cm T = 21.1° C. | 12.1 ± 0.1 | −39.2 ± 0.4 | 836.5 ± 1.6 | 1.15 |
| 200-187B | GVHP | PDADMA-sulfate 0.5 mg/mL | 5 mM NaOH/ 10 mM HOAc pH = 4.60 $\sigma$ = 437 $\mu$S/cm T = 20.7° C. | 18.9 ± 0.7 | 41.2 ± 1.8 | 804.7 ± 7.6 | 0.71 |
| 201-34B.1 | GVHP | PDADMA-sulfate 16 mg/mL | 5 mM NaOH/ 10 mM HOAc pH = 4.60 $\sigma$ = 437 $\mu$S/cm T = 20.7° C. | 17.3 ± 0.2 | 55.7 ± 1.2 | 1020.5 ± 11.6 | 0.98 |
| 195-149a | GVWP | No adsorbate | 5 mM NaOH/ 10 mM HOAc pH = 4.60 $\sigma$ = 437 $\mu$S/cm T = 20.7° C. | 13.4 ± 0.2 | −26.4 ± 0.2 | 377.5 ± 3.3 | 0.470 |
| 195-21a | GVWP | PVAH-OAc 3.5 mg/mL | 5 mM NaOH/ 10 mM HOAc pH = 4.6 | 15.3 ± 0.4 | 46.3 ± 1.0 | 828.4 ± 7.8 | 0.90 |
| 195-91a | GVWP | PDADMA-OAc 0.5 mg/mL | 5 mM NaOH/ 10 mM HOAc pH = 4.6 | 17.6 ± 0.3 | 19.5 ± 0.4 | 348.5 ± 2.5 | 0.33 |
| 195-91c | GVWP | PDADMA-OAc 9.0 mg/mL | 5 mM NaOH/ 10 mM HOAc pH = 4.6 | 16.8 ± 0.1 | 49.3 ± 0.5 | 837.1 ± 4.2 | 0.83 |

[1]tris(hydroxymethyl)aminomethane

Example 16

Stability of Nylon 66 Membrane on Heat Aging in pH 4.7 Buffer Solution

A nylon 66 (Millipore GN) was placed into 5 mM NaOH/10 mM HOAC (pH 4.7) buffer at 50° C. The membrane was completely embrittled after 13 days of buffer exposure.

Example 17

Stability of PVDF Membrane on Heat Aging in pH 4.7 Buffer Solution

A PVDF membrane (Millipore GVWP) was placed into 5 mM NaOH/10 mM HOAc buffer at 50° C. for 13 days. The membrane showed no change in flexibility or zeta potential after this treatment.

Example 18

Stability of PVDF Membranes on Heat Aging in a pH 8.2 Buffer Solution

The cationic membrane "Durapore Z" (a charge-modified cationic PVDF membrane taken from a filter cartridge) is often used in prototype electroosmotic pumps. Such pumps are usually operated with a tris(hydroxymethyl)aminomethane (TRIS)/SORBIC ACID buffer @pH 8.2. The operational life of these pumps, amongst other parameters, will depend on the stability of the Durapore Z membrane in the TRIS/SORBIC ACID buffer. This operational life was evaluated by heat aging the membrane in TRIS/SORBIC ACID buffer at 50° C. together with a nominally uncharged PVDF membrane (Millipore VVLP, 100 nm pore diameter). The zeta potentials were monitored in fixture B. The aging results are shown in the table below, demonstrating that no degradation in membrane performance was detected. This nominally cationic Durapore Z membrane behaved like an anionic membrane at pH 8.2: it gave a negative zeta potential.

| Time in pH 8.2 buffer @ 50 C. (days) | Zeta potential ± SD (mV) @ pH 8.2 | |
| --- | --- | --- |
| | Durapore control, VVLP, hydrophilic, 100 nm pore diameter | Durapore Z/Cartridge, cationic, hydrophilic, 220 nm pore diameter |
| 0 | −29.3 ± 1.3 | −22.7 ± 2.1 |
| 13 | −32.5 ± 1.1 | −28.5 ± 1.4 |
| 27 | −34.9 ± 2.8 | −28.6 ± 3.4 |
| 61 | −32.6 ± 1.1 | −23.5 ± 5.3 |

Example 19

GVHP Adsorbed with the Polyelectrolytes PDADMA-Br, -F, -Sulfate Stained with Direct Red 80 Staining The adsorbates of (cationic) poly(diallyldimethylammonium-bromide, -fluoride and -sulfate) (PDADMA-Br, PDADMA-F and PDADMA-sulfate) on GVHP membranes were stained with the (anionic) dye Direct Red 80, as described herein. The stains were comparably intense for the fluoride and sulfate adsorbates and less intense for the bromide adsorbate. The stain intensity remained unchanged after exposure to MeOH/water (75/25) at 65° C. for 3.5 d (no elution). GVHP adsorbed with PDADMA-sulfate had a zeta potential of +52 mV (@pH 4.6; Fixture A with capacitive carbon electrodes).

Example 20

GVHP Adsorbed with the Surfactants DDDAM-Br, -F, and -Sulfate Stained with Direct Red 80

The adsorbates of (cationic surfactant) didodecyldimethylammonium-bromide, -fluoride and -sulfate (DDDMA-Br, DDDMA-F and DDDMA-sulfate) on GVHP membranes were stained with the (anionic) dye Direct Red 80, as described herein. The stain intensity of the surfactant adsorbates was lower than that of the polyelectrolyte adsorbates, described in example 19. The stain intensities remained unchanged after exposure to MeOH/water (75/25) at room temperature. However, the stains were fully removed after exposure to MeOH/water (75/25) at 65° C. within less than 3 h.

Example 21

Stability of Various Adsorbates in Aqueous Alcohols

Charge modification of GVHP with
(1) didodecyldimethylammonium bromide (DDDMA-Br)
(2) poly(diallyldimethylammonium sulfate) (PDADMA-sulfate) or
(3) poly(allylammonium fluoride)

gives the highest and most stable zeta potentials, measured at pH 4.6.

Other than the multilayer adsorbates (polycation on top of polyanion in an alternating fashion), all the charge-modified membranes with polyelectrolyte monolayers prepared on GVHP were hydrophobic and required wetting with aqueous methanol or ethanol before measuring the zeta potential with an aqueous buffer solution. Wetting with a 75% methanolic buffer tended to be slow and data scatter was observed, attributed to incomplete wetting or desorption (dissolution) of the charge-modifying adsorbate. The hydrophobic membranes wetted fastest and most completely in pure methanol. As the water content in the methanol increased, the rate of wetting decreased. At 50% MeOH, the rate of wetting was slow and possibly incomplete. In order to facilitate the wetting process, the methanol content of the buffer was increased from 75 to 82%, and such buffer was sucked through the membranes for 16 h (overnight). This process reduced the measured zeta potential for the PDADMA-sulfate adsorbate from +56 to +40 mV, and for the DDDMA-Br adsorbate from +60 mV to +20 mV. When the experiment with an older sample of a DDDMA-Br adsorbate on GVHP (180-56a) was repeated (zeta=+60 mV), the zeta potential of the membrane was found to have reversed and had become negative. It was concluded that wetting with methanolic buffer desorbs the charge-modifier from the membrane surface at rates which depend on the methanol content in the wetting solution and the duration of exposure. A polyelectrolyte adsorbate (PDADMA-sulfate) resists desorption more than that of a double-chained surfactant, and an adsorbate based on a single chained surfactant probably desorbs more readily still. Therefore, wetting with aqueous methanol solutions of high methanol content should be avoided; the charge-modified membrane surfaces should be hydrophilized to achieve wetting with solutions that do not cause desorption, preferably all aqueous solutions.

Aqueous 0.5 mM DDDMA-Br wets DDDMA-Br-adsorbed GVHP and does not remove DDDMA-Br adsorbate/ DR 80 stain on heating. However, 0.5 mM DDDMA-Br in a 5 mM NaOAc buffer reduces the zeta potential of a membrane and its pumping efficiencies to half of the value observed with a buffer that does not contain the surfactant.

Example 22

Pumping Efficiency of Hydrophilic Vs. Hydrophobic Durapore Membranes

Figure 22:
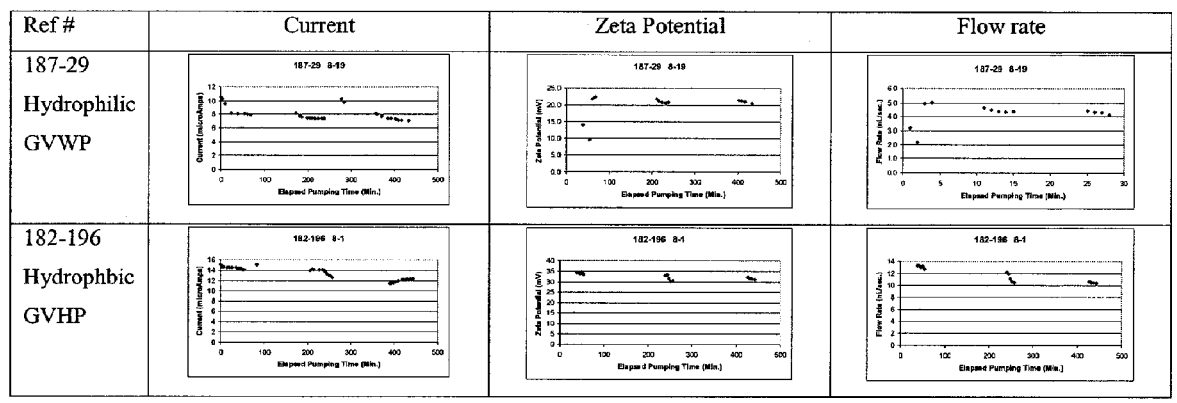
FIG. 22 shows illustrative, non-limiting examples of graphical plots of current, zeta potential and flow rate vs. pumping time for untreated hydrophilic GVWP and hydrophobic GVHP membranes.

Using buffer solutions of differing compositions and pH indicates a higher pumping efficiency for untreated GVWP and GVHP membranes at a more basic pH (8.2) than at a more acidic one (pH ~4.7). This supports the suggestion that the charges on the membrane surface arise from carboxylic acid groups, as such groups are more highly dissociated (charged) at a higher pH. This is shown in the table below, and the graphs in FIG. 22 (for reference #187-29 and 182-196).

| Test # | Durapore Membranes (pore diameter 220 nm) | Buffer | Fixture | Zeta Potential (mV) | Current (µA) | Flow Rate (nL/min) | FR/I (nL/µC) |
|---|---|---|---|---|---|---|---|
| 182-196 | Hydrophobic GVHP, wetted with 75% MeOH/ 25% 5 mM NaOAc buffer | 10 mM TRIS/ 5 mM Sorbic acid pH = 8.3 $\sigma$ = 264 µS/cm | B | −32.4 ± 1.4 | 13.2 ± 0.9 | 696 | 0.9 |
| 187-103a | Hydrophobic GVHP, wetted with 82% MeOH/ 18% test buffer | 10 mM TRIS/ 5 mM Sorbic acid pH = 8.3 $\sigma$ = 264 µS/cm | A | −39.1 ± 0.4 | 12.0 ± 0.1 | 837 | 1.2 |
| 187-103b | Hydrophobic GVHP, wetted with 82% MeOH/18% test buffer | 10 mM TRIS/ 5 mM Sorbic acid pH = 8.3 $\sigma$ = 264 µS/cm | A | −41.5 ± 0.9 | 11.3 ± 0.2 | 828 | 1.2 |
| 187-103c | Hydrophobic GVHP, wetted with 82% MeOH/ 18% test buffer | 10 mM TRIS/ 5 mM Sorbic acid pH = 8.3 $\sigma$ = 264 µS/cm | A | −39.6 ± 0.4 | 12.1 ± 0.3 | 835 | 1.2 |
| 187-144b | Hydrophilic GVWP | 10 mM TRIS/ 5 mM Sorbic acid pH = 8.3 $\sigma$ = 252 µS/cm | A | −26.0 ± 0.7 | 7.0 ± 0.1 | 334 | 0.8 |
| 187-179a | Hydrophilic GVWP | 10 mM TRIS/ 5 mM Sorbic acid pH = 8.3 $\sigma$ = 256 µS/cm | A | −25.3 ± 0.4 | 8.0 ± 0.1 | 370 | 0.8 |
| 187-179b | Hydrophilic GVWP | 10 mM TRIS/ 5 mM Sorbic acid pH 8.2 | A | −24.3 ± 0.6 | 8.1 ± 0.2 | 356 | 0.7 |
| 187-182a | Hydrophilic GVWP | 5 mM NaOH/ 10 mM Acetic acid pH 4.7 $\sigma$ = 398 µS/cm | A | −21.6 ± 0.3 | 13.9 ± 0.1 | 352 | 0.4 |
| 187-186a | Hydrophilic GVWP | 5 mM TRIS/ 10 mM Sorbic acid pH 4.7, $\sigma$ = 255 µS/cm | A | −17.2 ± 0.4 | 10.0 ± 0.1 | 314 | 0.5 |
| 187-186b | Hydrophilic GVWP | 10 mM TRIS/ 5 mM Sorbic acid pH 8.2 | A | −19.5 ± 0.4 | 9.1 ± 0.1 | 323 | 0.6 |
| 187-29 | Hydrophilic GVWP | 10 mM TRIS/ 5 mM Sorbic acid pH 8.2 | B | −21.2 ± 0.6 | 7.5 ± 0.4 | 270 | 0.6 |
| 200-200a | Hydrophilic GVWP | 10 mM TRIS/ 5 mM Sorbic acid pH = 8.3 $\sigma$ = 264 µS/cm | A | −26.2 ± 0.5 | 8.3 ± 0.2 | 387 | 0.8 |

-continued

| Test # | Durapore Membranes (pore diameter 220 nm) | Buffer | Fixture | Zeta Potential (mV) | Current (µA) | Flow Rate (nL/min) | FR/I (nL/µC) |
|---|---|---|---|---|---|---|---|
| 202-32a 5-26 | Hydrophobic GVHP, wetted with 80% EtOH/ 20% test buffer | 5 mM NaOH/10 mM HOAc pH = 4.6, σ = 428 µS/cm | A | −14.2 ± 0.4 | 15.6 ± 0.2 | 241 | 0.3 |
| 202-32b 5-26 | Hydrophobic GVHP, wetted with 80% EtOH/ 20% test buffer | 10 mM TRIS/ 5 mM Sorbic acid pH 8.2 | A | −30.9 ± 1.5 | 13.9 ± 0.1 | 468 | 0.6 |
| 202-85a 6-29 | Hydrophobic GVHP, wetted with 75% MeOH/ 25% test buffer | 5 mM NaOH/10 mM HOAc pH = 4.7, σ = 433 µS/cm | A | −20.7 ± 0.6 | 15.3 ± 0.1 | 342 | 0.4 |
| 202-85b 6-29 | Hydrophobic GVHP, wetted with 75% MeOH/ 25% test buffer | dto | A | −19.3 ± 1.1 | 14.5 ± 0.1 | 300 | 0.4 |

It is surmised that the charge-modifying moieties on the membrane surface are carboxylic acid groups, which, for the hydrophilic membrane, are overlaid by a charge neutral hydrophilic poly(hydroxyacrylate) layer. Such overlay should reduce the effective zeta potential. The data above also suggest that the zeta potentials and pumping efficiencies of a given membrane may also depend on the composition of the buffer solution: TRIS vs. Na cations and sorbate vs. acetate anions. For example, a cesium hydroxide/sorbic acid buffer (pH 4.7) with PDADMA-sorbate surface affords zeta potentials and pumping efficiencies approximately double those achieved with a sodium hydroxide/acetic acid buffer (pH 4.7).

Example 23

Polypropylene Adsorbed with a Polycation via Hydrophobic Bonding

Samples of hydrophobic PVDF and hydrophobic polypropylene were exposed to Direct Red 80 and methylene blue dye. Polypropylene samples with and without PVAH-acetate adsorbed were exposed to Direct Red 80 and methylene blue dye. Images of the stained membranes can be seen in FIG. 23.

The structures of hydrophobic poly(vinylidene fluoride) (PVDF) and poly(propylene) are given below; it should be noted that polypropylene contains no ionic surface groups, while hydrophobic PVDF contains anionic surface —COOH groups.

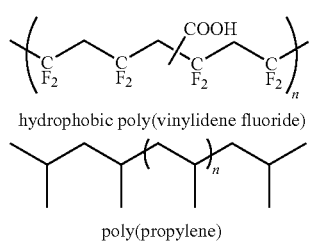

FIG. 23 (top left) shows cationic methylene blue bonds to the anionic carboxylate groups present on PVDF and does not elute with aqueous alcohol. FIG. 23 (top right) shows cationic methylene blue can not bond to polypropylene (which contains no anionic carboxylate groups) and therefore elutes with aqueous alcohol. FIG. 23 (bottom left) shows PVAH-acetate adsorbed hydrophobically to polypropylene. Anionic Direct Red 80 bonds ionically to the ammonium sites on the PVAH-acetate adsorbate and does not elute with aqueous alcohol. FIG. 23 (bottom right) shows anionic Direct Red 80 can not bond to untreated polypropylene (which contains no anionic carboxylate groups) and therefore elutes with aqueous alcohol. Hydrophobic bonding of polyelectrolytes to hydrophobic surfaces is discussed by Hammond et al., Macromolecules 2005, 38, 10542.

Example 24

Sequential Adsorption of Polyelectrolytes

Figure 24:
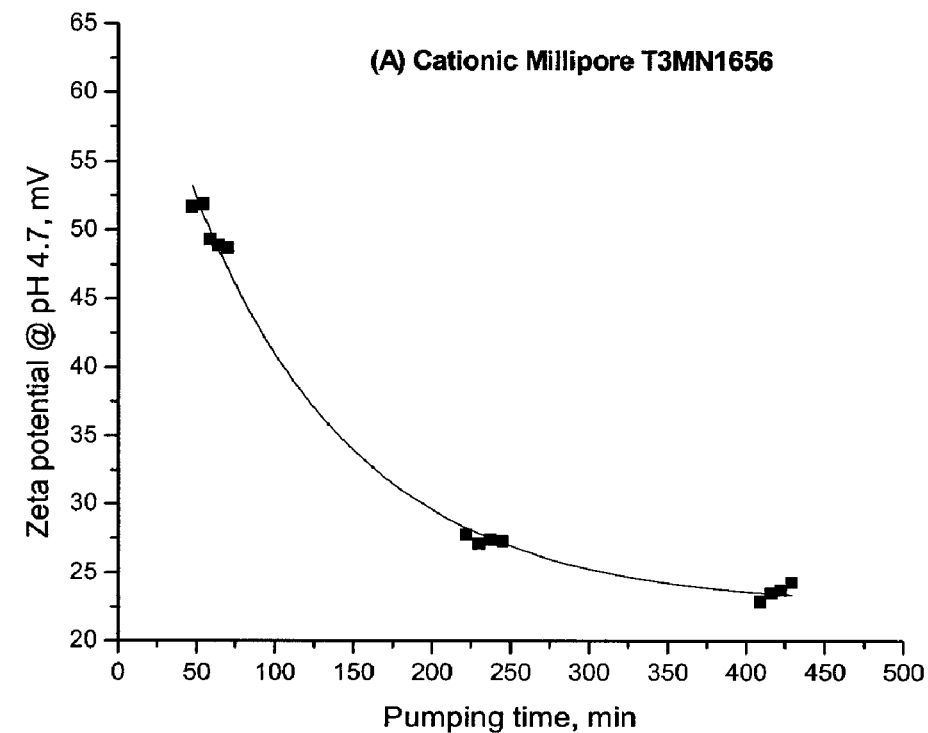
FIG. 24 shows illustrative, non-limiting examples of graphical plots of zeta potential vs. pumping time, determined in 5 mM NaOH/10 mM HOAc buffer at pH 4.7 using Fixture B, for an untreated, hydrophilic and cationic Durapore membrane (A) [Millipore T3MN1656], and the same membrane after sequential adsorption of NaPSS and PDADMA-F (B).
Figure 24:
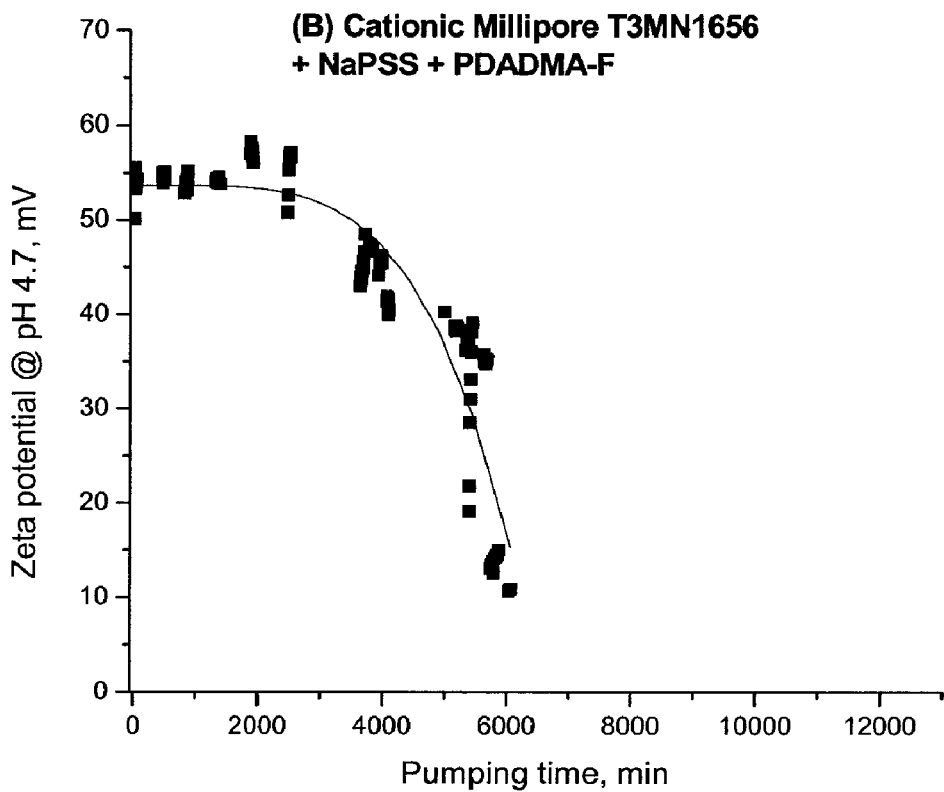

A cationic hydrophilic membrane from Millipore Corp (0.22 µm pore diameter, #T3MN1656) was evaluated for its zeta potential at pH 4.7 with a buffer of 5 mM NaOH/10 mM HOAc using Fixture B. The graph in FIG. 24 (top) shows a decrease in zeta potential from ~+55 mV to +23 mV after pumping for ~425 min, which is attributed to the electromigration of charge-modifying cationic molecules from the membrane coating into the buffer under the influence of the applied electrical field. In order to prevent this electromigration, a polyelectrolyte of opposite charge was adsorbed onto the surface of this membrane, as follows.

Two polyelectrolyte solutions were prepared. (1) NaPSS (MW, 1,000 kDa; Alfa Aesar) was dialyzed against water with a Spectra/Por 2 membrane (MWCO 12 to 14 kDa). The dialysate (0.77% solids) was diluted with a solution of 5 mM NaOH and 10 mM HOAc to give a solution of concentration 1 mg NaPSS/mL. (2) Poly(diallydimethylammonium chloride of MW 400 to 500 kDa was dialyzed through a Spectra/ Por 6 membrane [MWCO=50 kDa] against a NaF solution, which effected fluoride-to-chloride exchange to give PDADMA-F. NaPSS was adsorbed onto the cationic hydrophilic membrane used above for 3 d at RT. The membrane was then washed free of dissolved NaPSS with water and immersed into a solution of 1 mg PDADMA-F/mL containing 10 mM KF, and the adsorption was allowed to proceed for 3 d at RT. The membrane was washed with water and dried at RT.

The resulting hydrophilic membrane (ref #176-173) was evaluated for its zeta potential @pH 4.7 using a 5 mM NaOH/ 10 mM HOAc buffer over a pumping period of ~6,000 min. The buffer solution was replaced every few hours to maintain a constant pH in the electrode chambers of Fixture B. As can be seen on the graph in FIG. 24 (bottom), the membrane began to fail (decrease in zeta potential) after about 2,000 min of pumping.

Example 25

Multiple Sequential Polyelectrolyte Adsorption

GVHP was first wetted with aqueous ethanol, which was then replaced with water. This water-logged membrane was placed into an aqueous solution of 0.4 mM didodecyldimethylammonium-bromide (DDDMA-Br) and 10 mM KF. Adsorption was allowed to proceed for 2 h (180-56b). The membrane was washed with water and then placed into a 1 mg/mL NaPSS solution (prepared from dialyzed [MWCO 12 to 14 kDa] NaPSS (MW 1,000 kDa; Alfa Aesar)) in 10 mM KF, and adsorption was allowed to proceed for 2 h at RT (180-56bb). This membrane was washed with water and then placed into 1 mg PDADMA-F/mL solution in 10 mM KF and adsorption was allowed to proceed overnight (180-56bbb). Then the NaPSS adsorption was repeated, and after washing with water (180-56bbbb), it was followed by final adsorption of PDADMA-F. This membrane, 180-56 bbbbb, was washed with water and dried at RT. Using Fixture B and a pH 4.7 buffer (NaOH/acetic acid), these membranes were evaluated for their electroosmotic pumping behavior over ~450 min, after every adsorption step to give the results shown in the table below.

| Membrane # | Adsorption in 10 mM KF | Zeta potential (mV) | Current (µA) | Flow rate (nL/sec) | Flow rate/current (nL/µC) |
|---|---|---|---|---|---|
| 180-56b | GVHP + DDDMA-Br | +48.5 ± 5.5 | 8.5 ± 0.1 | 7.9 ± 0.2 | 0.93 |
| 180-56bb | 180-56b + NaPSS | −51.1 ± 1.4 | 12.0 ± 1.9 | 11.9 ± 2.7 | 0.99 |
| 180-56bbb | 180-56bb + PDADMA-F | +23.9 ± 2.4 | 7.0 ± 0.4 | 3.4 ± 0.3 | 0.46 |
| 180-56bbbb | 180-56bbb + NaPSS | −26.4 ± 7.4 | 10.8 ± 1.0 | 5.5 ± 1.4 | 0.51 |
| 180-56bbbbb | 180-56bbbb + PDADMA-F | +56.0 ± 9.4 | 12.1 ± 1.7 | 13.4 ± 1.5 | 1.11 |

Figure 25:
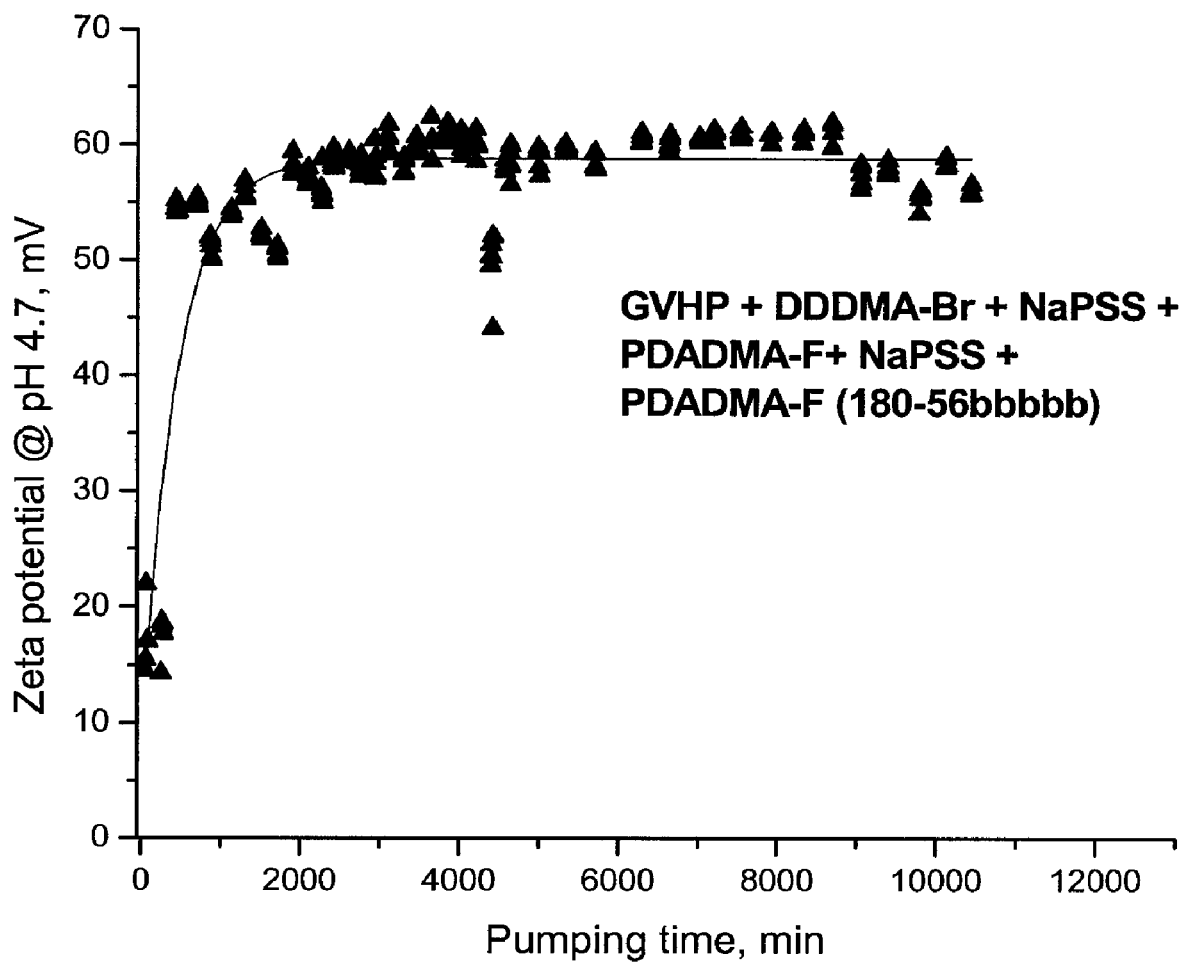
FIG. 25 shows an illustrative, non-limiting example of a graphical plot of zeta potential vs. pumping time for sequentially adsorbed GVHP (DDDMA-Br/NaPSS/PDADMA-F/NaPSS/PDADMA-F).

The final membrane, 180-56bbbbb, was hydrophobic. It was evaluated for its long-term electroosmotic pumping behavior @pH 4.7 using a 5 mM NaOH/10 mM HOAc buffer. The buffer solution was replaced every few hours to maintain a constant pH in the electrode chambers of Fixture B. This membrane showed a constant zeta potential for about 10,000 min or ~7 days of pumping (when the test was terminated), as shown in the graph in FIG. 25. The alternating polyelectrolyte adsorption does not generally afford a layered morphology for the adsorbate. Rather, the polymeric components interdiffusion to give a macromolecular complex of infinite molecular weight whose surface (facing the buffer solution) is charge-overcompensated (See Schlenoff et al., Macromolecules 2002, 34, 592 and Lösche et al., Macromolecules 1998, 31, 8893).

Example 26

Sequential NAPSS/PAH-F Adsorption onto a Cationic Durapore Membrane

Two solutions of NaPSS and PAH-F respectively were prepared as follows.
(a) NaPSS: Poly(sodium 4-styrenesulfonate) (MW, 1,000 kDa; Alfa Aesar) was dialyzed against water with a Spectra/Por 2 membrane (MWCO 12 to 14 kDa). The dialysate (0.77% solids) was diluted with a solution of 5 mM NaOH and 10 mM HOAc to give a concentration of 1 mg NaPSS/mL.
(b) PAH-F: An aqueous solution of 20% poly(allylamine) (MW ~65 kDa; Sigma Aldrich) was diluted with 10 mM KF and the pH was adjusted with aqueous HF to give a 1 mg/mL poly(allylammonium fluoride) solution of pH 4.7.

The NaPSS solution was adsorbed onto several pieces (1.5×3 cm) of the cationic hydrophilic membrane from Millipore Corp (0.22 µm pore diameter, #T3MN1656) for ~16 h at RT. The membrane specimens were washed in order to remove dissolved NaPSS.

Figure 26:
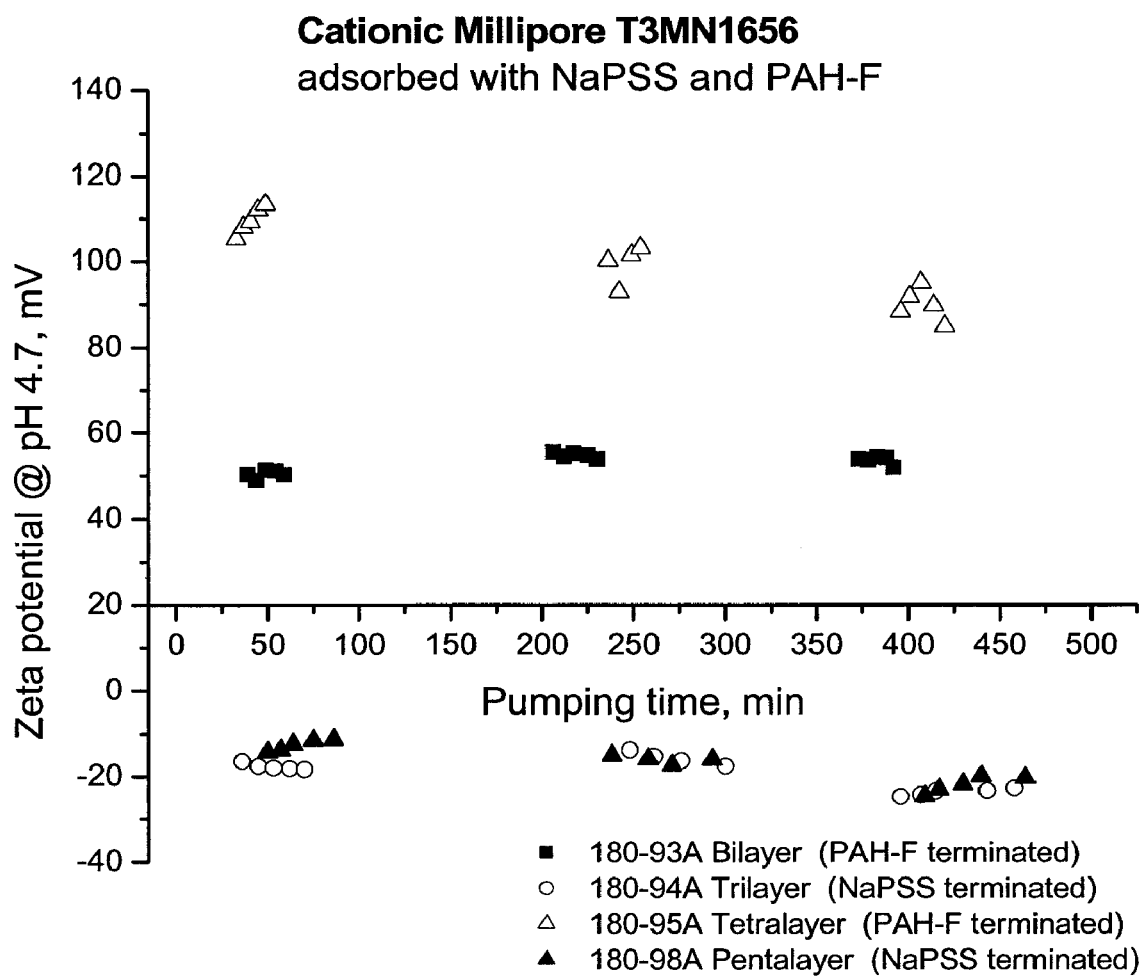
FIG. 26 shows an illustrative, non-limiting example of a graphical plot of zeta potential vs. pumping time for cationic Durapore Membrane (Millipore) #T3MN1656, sequentially adsorbed with NaPSS/poly(allylammonium fluoride) (PAH-F), (bilayer); NaPSS/PAH-F/NaPSS, (trilayer); NaPSS/PAH-F/NaPSS/PAH-F, (tetralayer); and NaPSS/PAH-F/NaPSS/PAH-F/NaPSS, (pentalayer).

The membranes were then immersed into the PAH-F solution overnight (~16 h), and washed with DI water to remove adsorption solution. One specimen was removed, air-dried and its zeta potential measured (180-93A; PAH-F outermost layer). The remaining wet membranes were then placed into fresh NaPSS solution overnight followed by washing with water. One membrane specimen was removed, air-dried and its zeta potential measured (180-94A, NaPSS outermost layer). The remaining wet membrane specimens were then adsorbed with PAH-F, as described above, washed with water and one specimen was removed, air-dried, and its zeta potential measured (180-95A, PAH-F outermost layer). The remaining wet membranes were then once more adsorbed with NaPSS, as described, washed with water and air-dried (180-95A, NaPSS outermost layer). The zeta potentials of all membranes were measured at pH 4.7 using Fixture B, for various pumping times. The results can be seen in FIG. 26.

The currents flowing through the pump were measured and given below.

| Bilayer: | membrane + NaPSS + PAH-F | I = 9.5 ± 0.9 µA |
| Trilayer: | membrane + NaPSS + PAH-F + NaPSS | I = 8.3 ± 2 µA |
| Tetralayer: | membrane + NaPSS + PAH-F + NaPSS + PAH-F | I = 5.4 ± 0.2 µA |
| Pentalayer: | membrane + NaPSS + PAH-F + NaPSS + PAH-F + NaPSS | I = 9.0 ± 3 µA |

As can be seen, the current flowing through the pump appears to be independent of the number of adsorbate layers deposited. The relatively low MW of the PAH-F, (~65 kDa)

and its (flexible chain) structure may have facilitated uniform pore penetration and formation of a coherent adsorbate throughout the membrane, accounting for the high zeta potential observed. When the outermost adsorbate layer is cationic (PAH-F), acetate anions are causing the electroosmotic flow; when the outermost layer is anionic (NaPSS), sodium cations perform this function. As can be seen the water transporting effect is dependent on the combination of outermost adsorbate and its cloud of mobile counterions, with the cationic adsorbate/Na acetate buffer combination giving the higher zeta potential.

The NaPSS/PAH-F sequential adsorbates with NaPSS as outermost adsorbate gave lower zeta potentials and pumping efficiencies than the PAH-F as outermost layer. By contrast, Caruso et al. (Macromolecules, 1999, 32, 2317), who used the electrophoretic method for the determination of the zeta potential on a non-membrane surface, showed zeta potentials of the same magnitude for the polyanion and polycation adsorbates.

Sequential adsorption onto the hydrophilic membrane GVWP of poly(vinylammonium-OAc) and polyacrylic acid (PAA), with PAA being the outermost layer (6 adsorbate layers total), gave a zeta potential of −4.5 mV and a high current flow (37 microA). The electroosmotic behavior of soft (diffuse) interfaces may not follow fully the rules established for hard interfaces (Poisson-Boltzmann/Smoluchowski relationship). Gel layers whose thickness exceeds the Debye length show electroosmotic flow that decreases as the gel layer thickness increases. (See Yesek, Langmuir 2005, 21, 10054). The gel layer has higher conductivity than the solution in the pore. This may cause current flow through that gel layer, which does not contribute to electroosmotic flow.

In order to maintain surface conductivity of the charge-modified membrane at a minimum, wettability (by water) and minimal swelling (in water) are required. High surface conductivity reduces the effective zeta potential (R Schweiss et al., Langmuir 2001, 17, 4304), and thus pumping efficiencies.

Sequential multilayer adsorption of polyelectrolytes not only gives stable and high zeta potentials, but also reduces the pore size of a membrane in a controlled manner (in increments of $\sim \geq 2$ nm). There exists an optimum pore size for a membrane that affords a maximum of electroosmotic flow. This pore diameter can be realized by sequential adsorption of polyanions and polycations onto pore walls of membranes with pore diameter larger than the optimum diameter.

What is claimed is:

1. A membrane comprising:
   a porous polymeric layer, wherein the porous polymeric layer has an average pore diameter of from about 100 nm to about 500 nm, and wherein the porous polymeric layer comprises a material that has a zeta potential of |20-25| mV, or is essentially charge neutral; and
   a polyelectrolyte layer physically adsorbed on the porous polymeric layer, wherein the polyelectrolyte layer comprises at least one polyelectrolyte that has a molecular weight between about 50 kDa to about 1,000 kDa and a counterion to the polyelectrolyte has a positive Jones-Dole B viscosity coefficient;
   wherein the membrane has a zeta potential of $|\geq 50|$ mV.

2. The membrane of claim 1, wherein the polyelectrolyte layer forms a monolayer on the porous polymeric layer.

3. The membrane of claim 1, wherein the polyelectrolyte layer includes alternating monolayers of cationic and anionic polyelectrolytes physically adsorbed on the porous polymeric membrane.

4. The membrane of claim 3, wherein the alternating monolayers of cationic and anionic polyelectrolytes are formed by contacting an adsorbed cationic polyelectrolyte monolayer with an aqueous solution of an anionic polyelectrolyte or contacting an adsorbed anionic polyelectrolyte monolayer with an aqueous solution of a cationic polyelectrolyte.

5. The membrane of claim 4, wherein each solution comprises a polyelectrolyte at a concentration of at least 2 mM in terms of repeat unit of the polyelectrolyte.

6. The membrane of claim 4, wherein each solution has a pH from about 3.5 to about 8.5.

7. The membrane of claim 4, wherein each solution is a buffered solution with an ionic strength between about 25 to about 250 mM.

8. The membrane of claim 4, wherein the average thickness of each monolayer is between about 1 nm to about 6 nm.

9. The membrane of claim 4, wherein the zeta potential of the membrane shows less than 25% variation after heating at 50° C., at pH 8.2 for at least 10 days.

10. The membrane of claim 1, wherein the zeta potential of the membrane is $|\geq 50|$ mV for at least seven days during which pumping is continuously applied across the surface.

11. The membrane of claim 1, wherein the material of the porous polymeric layer is selected from the group consisting of poly(olefins), halogenated poly(olefins), poly(cylco olefins), halogenated poly(cylco olefins), poly(styrenes), halogenated poly(styrenes), poly(propylenes), poly(ethylenes), halogenated poly(ethylenes), poly(tetrafluoroethylenes), poly(sulfones), poly(ether sulfones), poly(arylsulfones), poly(phenylene ether sulfones), poly(imides), poly(etherimides), poly(vinylidene fluorides), poly(esters), halogenated poly(esters), poly(ethylene terephthalates), polybutylene terephthalates), poly(carbonates), poly(vinyl halides), poly (acrylics), poly(acrylates), halogenated poly(acrylates), poly (methacrylics), poly(methacrylates), poly(anhydrides), poly (acrylonitriles), poly(ethers), poly(arylene ether ketones), poly(phenylene sulfides), poly(arylene oxides), poly(siloxanes), cellulose acetates, cellulose nitrates, poly(amides), nylon, ceramics and mixtures and co-polymers thereof.

12. The membrane of claim 11, wherein the porous polymeric layer is polyvinylidene fluoride (PVDF) or nylon.

13. The membrane of claim 1, wherein the at least one polyelectrolyte is a weak polyelectrolyte.

14. The membrane of claim 1, wherein the at least one polyelectrolyte is a strong polyelectrolyte.

15. The membrane of claim 1, wherein the at least one polyelectrolyte is a cationic polyelectrolyte.

16. The membrane of claim 15, wherein the cationic polyelectrolyte is a polyamine, an alkylated polyamine, a polyammonium salt, a poly(quaternary ammonium salt), a poly(alkylenimine) or mixtures thereof.

17. The membrane of claim 15 wherein the cationic polyelectrolyte is selected from Poly(diallyldimethylammonium chloride) (PDADMA-Cl); Poly(N,N-dimethyl-3,5-dimethylene piperidinium chloride); Poly(ethylenimine) (PEI); Poly (vinylamine) (PVAH); Poly(N-methyl vinylamine); Poly(allylamine) (PAH); Poly(4-vinyl-1-methylpyridinium bromide); Poly(allylammonium fluoride); Poly(dimethylamine-co-epichlorohydrin), quaternized; Poly(lysine); Poly (N,N,N',N'-tetramethyl-N-trimethylenehexamethylenediammonium dibromide); Poly(2-(Dimethylamino-ethyl) methacrylate); Poly(2-methacryloyloxy-ethyl-trimethylammonium chloride); Poly(2-hydroxy-3-methacryloxypropyl-trimethylammonium chloride); Poly(3-chloro-2-hydroxypropyl-2-methacryloxyethyl-dimethylammonium chloride) (PCHPMEDMAC); Poly(N-[3-(dimethylamino)-propyl methacrylamide]); and Poly([3-methacryloylamino-propyl]-trimethylammonium chloride).

18. The membrane of claim 15, wherein the counterion to the cationic polyelectrolyte is selected from the group consisting of aliphatic, aromatic or heteroaromatic carboxylates, chromate, bicarbonate, sulfate, phosphate, and fluoride.

19. The membrane of claim, wherein 15 the counterion to the cationic polyelectrolyte is univalent.

20. The membrane of claim 1, wherein the at least one polyelectrolyte is an anionic polyelectrolyte.

21. The membrane of claim 20, wherein the anionic polyelectrolyte is a polycarboxylic acid or a polysulfonic acid.

22. The membrane of claim 20, wherein the anionic polyelectrolyte is selected from the group consisting of Poly(acrylic acid) (PAA); Poly(methacrylic acid) (PMA); Poly(itaconic acid); Poly(4-styrenesulfonic acid) (PSS); Poly(vinylphosphonic acid); Poly(vinylsulphonic acid); Poly(aspartic acid); Poly(glutamic acid); Poly(sodium 4-styrenesulfonate) (NaPSS); Poly(anetholesulfonic acid); Poly(3-sulfopropyl methacrylate); Poly(1,4-phenylene ethersulfone sulfonic acid); and Poly(1,4-phenylene ether ether ketone sulfonic acid).

23. The membrane of claim 20, wherein the counterion to the anionic polyelectrolyte is $Li^+$, $Na^+$, tris(hydroxymethyl)methyl ammonium or bis(2-hydroxyethyl)ammonium-tris(hydroxymethyl)methane.

24. The membrane of claim 20, wherein the counterion to the anionic polyelectrolyte is univalent.

25. The membrane of claim 1, wherein the polyelectrolyte layer includes at least one cationic polyelectrolyte and at least one anionic polyelectrolyte.

26. The membrane of claim 1 wherein the average pore diameter of the porous polymeric layer is between about 100 nm to about 300 nm.

27. The membrane of claim 1, wherein the membrane is a component in an electroosmotic pump.

* * * * *

UNITED STATES PATENT AND TRADEMARK OFFICE
CERTIFICATE OF CORRECTION

Page 1 of 3

PATENT NO. : 7,867,592 B2
APPLICATION NO. : 11/669022
DATED : January 11, 2011
INVENTOR(S) : Darcee Deschamp Nelson and Klaus Joachim Dahl It is certified that error appears in the above-identified patent and that said Letters Patent is hereby corrected as shown below:

Title Page;
Under (75) Inventors
After "Klaus Joachim Dahl", delete "Dublin, CA (US)" and insert --Dublin, CA (CA)--.

Column 5, line 17
After "thereon has a zeta potential of", delete "|50| mV." and insert --|≥50| mV.--.

Column 10, line 14
Before "where R is", delete "—COOR," and insert -- -COOR,--.

Column 13, line 15
After significant data, delete "data scatter" and insert --data scatter.--.

Column 17, line 27
Delete "Poly(vinylamino)(PVAH)" and insert --Poly(vinylamine(PVAH)--.

Column 27, line 45
Delete "(Me3N+—O⁻)," and insert --(Me3N+-O⁻),--.

Column 32, line 26
Delete "(see US 2004/007478)." and insert --(see US 2004/0074784).--.

Column 32, line 64
Delete

"—NH$_2$+H⁺ < —NH$_3$⁺
—COOH+OH⁻ < —COO⁻ + H$_2$O"

and insert

Signed and Sealed this
Twenty-sixth Day of July, 2011

David J. Kappos
*Director of the United States Patent and Trademark Office*

CERTIFICATE OF CORRECTION (continued)
U.S. Pat. No. 7,867,592 B2

-- -NH$_2$ + H$^+$ <===> -NH$_3^+$
-COOH + OH$^-$ <===> -COO$^-$ + H$_2$O--.

Column 36, line 1
Delete $$-SO_3X + H_2O \rightarrow -SO_3^- + X^- \quad (X = H^+, Na^+, Li^+, \text{etc})$$

$$-SO_3^- + H^+ \frac{pH = 2-9}{pH = 2-9} \rightarrow$$

no change in $-SO_3^-$ concentration (and zeta potential)

$-SO_3^- + OH^- \rightarrow$ no change in $-SO_3^-$ concentration (and zeta potential)

$-N(R)_3Y + H_2O \rightarrow$ $\quad -N(R)_3^+ + Y^- \quad ( Y = Cl^-, F^-, Br^-, OAc^-, 1/2SO_4^{2-}, etc.)$ (R = alkyl, all being the same or different)

$$-N(R)_3^+ + H^+ \frac{pH = 2-9}{pH = 2-9} \rightarrow$$

no change in $-N(R)_3^+$ concentration (and zeta potential)

$-N(R)_3^+ + OH^- \rightarrow$ no change in $-N(R)_3^+$ concentration (and zeta potential)

" "

and insert

-SO$_3$X + H$_2$O → -SO$_3^-$ + X$^-$      (X = H$^+$, Na$^+$, Li$^+$, etc)

pH=2-9
-SO$_3^-$ + H$^+$ →   no change in -SO$_3^-$ concentration (and zeta potential)

pH=2-9
-SO$_3^-$ + OH$^-$ →  no change in -SO$_3^-$ concentration (and zeta potential)

-N(R)$_3$Y + H$_2$O → -N(R)$_3^+$ + Y$^-$        ( Y = Cl$^-$, F$^-$, Br$^-$, OAc$^-$, ½SO$_4^{2-}$, etc)

(R = alkyl, all being the same or different)

pH=2-9
-N(R)$_3^+$ + H$^+$ → no change in –N(R)$_3^+$ concentration (and zeta potential)

pH=2-9
-N(R)$_3^+$ + OH$^-$ → no change in –N(R)$_3^+$ concentration (and zeta potential)

-- --.

Column 37, line 46
After "on typo of", delete "polyclectrolyte" and insert --polyelectrolyte--.

CERTIFICATE OF CORRECTION (continued)
U.S. Pat. No. 7,867,592 B2

Column 39, line 33
After "on typo of", delete "polyclectrolyte" and insert --polyelectrolyte--.

Column 52, line 41
Before "Effect", delete "Membrane:" and insert --Membranes:--.

Column 54, line 38
Delete "Didodecyldimethylammonium Bromide (DDDMA-Br)" and insert --Poly(Diallyldimethylammonium-Sulfate)(PDADMA-Sulfate--.

Column 60, line 12
Delete "DDDAM-Br," and insert --DDDMA-Br,--.

Claim 11, column 68, lines 30-31
Delete "polybutyleneterephthalates)," and insert --poly(butyleneterephthalates),--.

Claim 19, column 69, line 5
Delete "claim, wherein 15" and insert --claim 15, wherein--.

UNITED STATES PATENT AND TRADEMARK OFFICE
CERTIFICATE OF CORRECTION

| | | |
|---|---|---|
| PATENT NO. | : 7,867,592 B2 | Page 1 of 1 |
| APPLICATION NO. | : 11/669022 | |
| DATED | : January 11, 2011 | |
| INVENTOR(S) | : Darcee Deschamp Nelson and Klaus Joachim Dahl | |

It is certified that error appears in the above-identified patent and that said Letters Patent is hereby corrected as shown below:

Column 27, line 59
Delete "$(BrO_{3\text{-}})$," and insert --$(BrO_3^-)$--.

Signed and Sealed this
Tenth Day of April, 2012

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,867,592 B2 | Page 1 of 1 |
| APPLICATION NO. | : 11/669022 | |
| DATED | : January 11, 2011 | |
| INVENTOR(S) | : Darcee Deschamp Nelson et al. | |

It is certified that error appears in the above-identified patent and that said Letters Patent is hereby corrected as shown below:

Title page, item [73] assignee: should read as following: Eksigent Technologies, LLC, Dublin, CA (US)

Signed and Sealed this
Twenty-fourth Day of April, 2012

David J. Kappos
*Director of the United States Patent and Trademark Office*